US 11,179,879 B2

(12) United States Patent
Vidavsky et al.

(10) Patent No.: US 11,179,879 B2
(45) Date of Patent: Nov. 23, 2021

(54) THREE-DIMENSIONAL PRINTING COMBINING RING-OPENING METATHESIS POLYMERIZATION AND FREE RADICAL POLYMERIZATION

(71) Applicant: Stratasys Ltd., Rehovot (IL)

(72) Inventors: Yuval Vidavsky, Moshav Sitriya (IL); Asher Razlan, Rehovot (IL); Ira Yudovin-Farber, Rehovot (IL); Renata Drozdzak-Matusiak, Wasquehal (FR); Mathieu Charret, Frelinghien (FR)

(73) Assignee: Stratasys Ltd., Rehovot (IL)

( * ) Notice: Subject to any disclaimer, the term of this patent is extended or adjusted under 35 U.S.C. 154(b) by 600 days.

(21) Appl. No.: 16/075,996

(22) PCT Filed: Feb. 5, 2017

(86) PCT No.: PCT/IL2017/050137
§ 371 (c)(1),
(2) Date: Aug. 7, 2018

(87) PCT Pub. No.: WO2017/134673
PCT Pub. Date: Aug. 10, 2017

(65) Prior Publication Data
US 2020/0346397 A1   Nov. 5, 2020

Related U.S. Application Data

(60) Provisional application No. 62/292,334, filed on Feb. 7, 2016.

(51) Int. Cl.
*B29C 64/112*   (2017.01)
*B33Y 10/00*   (2015.01)
(Continued)

(52) U.S. Cl.
CPC .......... *B29C 64/112* (2017.08); *B29C 64/209* (2017.08); *B29C 64/295* (2017.08);
(Continued)

(58) Field of Classification Search
CPC ................................................... B29C 64/112
See application file for complete search history.

(56) References Cited

U.S. PATENT DOCUMENTS

| 5,059,266 A | 10/1991 | Yamane et al. |
| 5,312,940 A | 5/1994 | Grubbs et al. |

(Continued)

FOREIGN PATENT DOCUMENTS

| CN | 103338864 | 10/2013 |
| EP | 1498256 | 1/2005 |

(Continued)

OTHER PUBLICATIONS

Notification of Reasons for Rejection dated Jul. 2, 2019 From the Japan Patent Office Re. Application No. 2017-521539 and Its Translation Into English. (7 Pages).

(Continued)

*Primary Examiner* — Larry W Thrower

(57) ABSTRACT

Methods for fabricating three-dimensional objects by 3D-inkjet printing technology are provided. The methods utilize a combination of curable materials that polymerize via ring-opening metathesis polymerization (ROMP) and curable materials that polymerize via free-radical polymerization (FRP) for fabricating the object. Systems suitable for performing these methods, kits containing modeling material formulations usable in the methods and objects obtained thereby are also provided.

9 Claims, 4 Drawing Sheets

(51) Int. Cl.
  *B33Y 30/00* (2015.01)
  *B33Y 50/02* (2015.01)
  *B33Y 70/00* (2020.01)
  *B29C 64/295* (2017.01)
  *B29C 64/209* (2017.01)
  *B29C 64/393* (2017.01)
  *C08G 61/08* (2006.01)
  *C08K 5/14* (2006.01)

(52) U.S. Cl.
  CPC ............ *B29C 64/393* (2017.08); *B33Y 10/00* (2014.12); *B33Y 30/00* (2014.12); *B33Y 50/02* (2014.12); *B33Y 70/00* (2014.12); *C08G 61/08* (2013.01); *C08K 5/14* (2013.01); *C08G 2261/418* (2013.01); *C08G 2261/74* (2013.01); *C08G 2261/76* (2013.01)

(56) References Cited

U.S. PATENT DOCUMENTS

| | | |
|---|---|---|
| 5,342,909 A | 8/1994 | Grubbs et al. |
| 5,491,200 A | 2/1996 | Harris et al. |
| 5,710,298 A | 1/1998 | Grubbs et al. |
| 5,728,917 A | 3/1998 | Grubbs et al. |
| 5,831,108 A | 11/1998 | Grubbs et al. |
| 6,001,909 A | 12/1999 | Setiabudi |
| 6,259,962 B1 | 7/2001 | Gothait |
| 6,569,373 B2 | 5/2003 | Napadensky |
| 6,658,314 B1 | 12/2003 | Gothait |
| 6,850,334 B1 | 2/2005 | Gothait |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,962,237 B2 | 6/2011 | Kritchman |
| 8,487,046 B2 | 7/2013 | Recher et al. |
| 8,519,069 B2 | 8/2013 | Drozdzak |
| 8,703,888 B2 | 4/2014 | Drozdzak et al. |
| 8,927,670 B2 | 1/2015 | Schaubroeck et al. |
| 9,139,752 B2 | 9/2015 | Desbois et al. |
| 10,259,210 B2 | 4/2019 | Vidavsky et al. |
| 10,589,511 B2 | 3/2020 | Vidavsky et al. |
| 2002/0055598 A1 | 5/2002 | Lynn et al. |
| 2002/0111707 A1 | 8/2002 | Li et al. |
| 2003/0032758 A1 | 2/2003 | Harris et al. |
| 2004/0256754 A1 | 12/2004 | Koguchi |
| 2005/0040564 A1* | 2/2005 | Oliver .................. C08G 61/12 264/494 |
| 2005/0255253 A1 | 11/2005 | White et al. |
| 2006/0111807 A1 | 5/2006 | Gothait et al. |
| 2007/0168815 A1 | 7/2007 | Napadensky et al. |
| 2008/0023884 A1 | 1/2008 | Konze et al. |
| 2009/0156766 A1 | 6/2009 | Lemcoff et al. |
| 2010/0029801 A1 | 2/2010 | Moszner et al. |
| 2011/0171147 A1 | 7/2011 | Samorski et al. |
| 2012/0065755 A1 | 3/2012 | Steingart et al. |
| 2012/0283406 A1 | 11/2012 | Klitschke et al. |
| 2013/0065466 A1 | 3/2013 | Desbois et al. |
| 2013/0073068 A1 | 3/2013 | Napadensky |
| 2013/0128452 A1 | 5/2013 | Baquiano et al. |
| 2013/0183519 A1 | 7/2013 | Maeda |
| 2014/0312535 A1 | 10/2014 | Dikovsky et al. |
| 2017/0251713 A1 | 9/2017 | Warner et al. |
| 2017/0306171 A1 | 10/2017 | Vidavsky et al. |
| 2017/0341296 A1 | 11/2017 | Fenn et al. |
| 2018/0029291 A1 | 2/2018 | Matzner et al. |
| 2019/0009338 A1 | 1/2019 | McMurtry et al. |
| 2019/0039321 A1 | 2/2019 | Matzner et al. |
| 2019/0048217 A1 | 2/2019 | Vidavsky et al. |
| 2019/0127517 A1 | 5/2019 | Vidavsky et al. |
| 2019/0176387 A1 | 6/2019 | Kuno et al. |
| 2019/0210354 A1 | 7/2019 | Vidavsky et al. |
| 2020/0207070 A1 | 7/2020 | Vidavsky et al. |

FOREIGN PATENT DOCUMENTS

| | | |
|---|---|---|
| EP | 1757613 | 2/2007 |
| EP | 2280017 | 2/2011 |
| EP | 2452958 | 5/2012 |
| EP | 2460587 | 6/2012 |
| EP | 2801588 | 11/2014 |
| GB | 2382798 | 6/2003 |
| JP | 2002-264221 | 9/2002 |
| JP | 2005-254583 | 9/2005 |
| JP | 2010-095706 | 4/2010 |
| JP | 2010-214858 | 9/2010 |
| JP | 2014-506260 | 3/2014 |
| WO | WO 97/20865 | 6/1997 |
| WO | WO 97/29135 | 8/1997 |
| WO | WO 99/51344 | 10/1999 |
| WO | WO 2009/013751 | 1/2009 |
| WO | WO 2013/072874 | 5/2013 |
| WO | WO 2013/128452 | 9/2013 |
| WO | WO 2014/144634 | 9/2014 |
| WO | WO 2016/063282 | 4/2016 |
| WO | WO 2016/125170 | 8/2016 |
| WO | WO 2017/068590 | 4/2017 |
| WO | WO 2017/134672 | 8/2017 |
| WO | WO 2017/134673 | 8/2017 |
| WO | WO 2017/134674 | 8/2017 |
| WO | WO 2017/134676 | 8/2017 |
| WO | WO 2017/187434 | 11/2017 |

OTHER PUBLICATIONS

Supplementary European Search Report and the European Opinion dated Jun. 24, 2019 From the European Patent Office Re. Application No. 17747123.2. (6 Pages).

Final Official Action dated Jan. 29, 2021 From the US Patent and Trademark Office Re. U.S. Appl. No. 16/095,384. (23 Pages).

Communication Pursuant to Article 94(3) EPC dated Feb. 22, 2019 From the European Patent Office Re. Application No. 15852577.4. (5 Pages).

Notification of Office Action dated Mar. 28, 2019 From the State Intellectual Property Office of the People's Republic of China Re. Application No. 201580069912.7. (11 Pages).

Applicant-Initiated Interview Summary dated May 14, 2018 From the US Patent and Trademark Office Re. U.S. Appl. No. 15/520,458. (2 pages).

International Preliminary Report on Patentability dated May 4, 2017 From the International Bureau of WIPO Re. Application No. PCT/IL2015/051038. (7 Pages).

International Preliminary Report on Patentability dated Nov. 8, 2018 From the International Bureau of WIPO Re. Application No. PCT/IL2017/050141. (7 Pages).

International Preliminary Report on Patentability dated Aug. 16, 2018 From the International Bureau of WIPO Re. Application No. PCT/IL2017/050136. (14 Pages).

International Preliminary Report on Patentability dated Aug. 16, 2018 From the International Bureau of WIPO Re. Application No. PCT/IL2017/050137. (8 Pages).

International Preliminary Report on Patentability dated Aug. 16, 2018 From the International Bureau of WIPO Re. Application No. PCT/IL2017/050138. (12 Pages).

International Preliminary Report on Patentability dated Aug. 16, 2018 From the International Bureau of WIPO Re. Application No. PCT/IL2017/050140. (10 Pages).

International Preliminary Report on Patentability dated Aug. 17, 2017 From the International Bureau of WIPO Re. Application No. PCT/IL2016/050135. (7 Pages).

International Search Report and the Written Opinion dated Apr. 3, 2017 From the International Searching Authority Re. Application No. PCT/IL2017/050141. (12 Pages).

International Search Report and the Written Opinion dated May 8, 2016 From the International Searching Authority Re. Application No. PCT/IL2016/050135.

International Search Report and the Written Opinion dated Apr. 10, 2017 From the International Searching Authority Re. Application No. PCT/IL2017/050138. (12 Pages).

(56) References Cited

OTHER PUBLICATIONS

International Search Report and the Written Opinion dated May 18, 2017 From the International Searching Authority Re. Application No. PCT/IL2017/050140. (15 Pages).
International Search Report and the Written Opinion dated May 22, 2017 From the International Searching Authority Re. Application No. PCT/IL2017/050137. (12 Pages).
International Search Report and the Written Opinion dated Aug. 24, 2017 From the International Searching Authority Re. Application No. PCT/IL2017/050136. (22 Pages).
International Search Report and the Written Opinion dated Jan. 28, 2016 From the International Searching Authority Re. Application No. PCT/IL2015/051038.
International Search Report and the Written Opinion dated Jan. 29, 2017 From the International Searching Authority Re. Application No. PCT/IL2016/051142. (12 Pages).
Invitation to Pay Additional Fees, Communication Relating to the Results of the Partial International Search and the Provisional Opinion dated Jun. 26, 2017 From the International Searching Authority Re. Application No. PCT/IL2017/050136. (18 Pages).
Notification of Office Action and Search Report dated Oct. 23, 2018 From the State Intellectual Property Office of the People's Republic of China Re. Application No. 201580069912.7 and Its Summary of Office Action in English. (19 Pages).
Official Action dated Jul. 12, 2018 From the US Patent and Trademark Office Re. U.S. Appl. No. 15/520,458. (35 pages).
Restriction Official Action dated Feb. 13, 2018 From the US Patent and Trademark Office Re. U.S. Appl. No. 15/520,458. (9 pages).
Supplementary European Search Report and the European Search Opinion dated Sep. 20, 2018 From the European Patent Office Re. Application No. 16746248.0. (8 Pages).
Supplementary European Search Report and the European Search Opinion dated Jun. 21, 2018 From the European Patent Office Re. Application No. 15852577.4. (6 Pages).
Ben-Asuly et al. "Photoactivation of Ruthenium Olefin Metathesis Initiators", Organometallics, 28: 4652-4655, Published on Web Jul. 24, 2009.
Diesendruck et al. "A Latent S-Chelated Ruthenium Benzylidene Initiator for Ring-Opening Metathesis Polymerization", Journal of Polymer Science, Part A: Polymer Chemistry, 47(16): 4209-4213, Published Online Jul. 8, 2009.
Doubrovski et al. "Voxel-Based Fabrication Through Material Property Mapping: A Design Method for Bitmap Printing", Computer-Aided Design, 60: 3-13, Available Online Jun. 5, 2014. Abstract, p. 7, Para 3.2.3, p. 11-12, Para 5.2, Section 3 'Voxed-Based Design for 3D Printing', Section 4 'Implementation'.
Doubrovski et al. "Voxel-Based Fabrication Through Material Property Mapping: A Design Method for Bitmap Printing", Computer-Aided Design, XP029107146, 60(C): Mar. 3-13, 2015. p. 1-9.
Fleet et al. "Inkjet Printing of Self-Healing Polymers for Enhanced Composite Interlaminar Properties", Journal of Materials Chemistry A, 3(5): 2283-2293, Published Online Dec. 8, 2014.
Gong et al. "ROMP of Acetoxy-Substituted Dicyclopentadiene to Linear Polymer With a High Tg", RSC Advances, 5(33): 26185-26188, Mar. 20, 2015.
Harris et al. "Photolithographic Patterning of Ring-Opening Metathesis Catalysts on Silicon", Advanced Materials, 17(1): 39-42, Published Online Jan. 6, 2005.
Khodabakhshi et al. "Anionic Polymerisation of Caprolactam at the Small-Scale via DSC Investigations: A Method to Be Used in an Additive Manufacturing Process", Journal of Thermal Analysis and Calorimetry, XP055377014, 115(1): 383-391, Published Online Aug. 8, 2013. p. 384, Para 1, Fig. 1, Para 2.
Pastine et al. "Chemicals on Demand With Phototriggerable Microcapsules", Journal of the American Chemical Society, JACS, 131(38): 13586-13587, Sep. 30, 2009.
Piermattei et al. "Activating Catalysts With Mechanical Force", Nature Chemistry, 1(2): 133-137, Advanced Online Publication Apr. 6, 2009.
Saha et al. "Cross-Linked ROMP Polymers Based on Odourless Dicyclopentadiene Derivatives", Polymer Chemistry, 7(18): 3071-3075, Published Online Apr. 14, 2016.
Szadkowska et al. "Latent Thermo-Switchable Olefin Metathesis Initiators Bearing A Pyridyl-Functionalized Chelating Carbene: Influence of the Leaving Group's Rigidity on the Catalyst's Performance", Organometallics, 29: 117-124, Published on Web Dec. 14, 2009.
Vidavsky et al. "Light-Induced Olefin Metathesis", Beilstein Journal of Organic Chemistry, 6: 1106-1119, Nov. 23, 2010.
Wang et al. "Cationic RuII Complexes With N-Heterocyclic Carbene Ligands for UV-Induced Ring-Opening Metathesis Polymerization", Angewandte Chemie International Edition, 47(17): 3267-3270, Published Online Mar. 12, 2008.
Wilson et al. "Autonomic Healing of Epoxy Vinyl Esters via Ring Opening Metathesis Polymerization", Advanced Functional Materials, 18(1): 44-52, 2008.
Official Action dated Sep. 18, 2020 from the US Patent and Trademark Office Re. U.S. Appl. No. 16/075,159. (69 pages).
Restriction Official Action dated Dec. 4, 2020 From the US Patent and Trademark Office Re. U.S. Appl. No. 16/804,017. (6 Pages).
Official Action dated Feb. 12, 2021 From the US Patent and Trademark Office Re. U.S. Appl. No. 16/804,017. (39 Pages).
Invitation Pursuant to Rule 137(4) EPC and Article 94(3) EPC dated Jun. 25, 2019 From the European Patent Office Re. Application No. 17709812.6. (2 Pages).
Restriction Official Action dated Jun. 11, 2019 From the US Patent and Trademark Office Re. U.S. Appl. No. 15/549,191. (10 Pages).
Communication Pursuant to Article 94(3) EPC dated Aug. 13, 2020 From the European Patent Office Re. Application No. 17747123.2. (5 Pages).
Translation Dated Apr. 16, 2019 of Notification of Office Action dated Mar. 28, 2019 From the State Intellectual Property Office of the People's Republic of China Re. Application No. 201580069912.7. (4 Pages).
Notification of Office Action and Search Report dated Jul. 24, 2019 From the State Intellectual Property Office of the People's Republic of China Re. Application No. 201580069912.7. (13 Pages).
Thomas et al. "Thermally Stable, Latent Olefin Metathesis Catalysts", Organometallics, 30(24): 6713-6717, Published Online Nov. 18, 2011.
European Search Report and the European Search Opinion dated Jan. 30, 2020 From the European Patent Office Re. Application No. 19206004.4. (7 Pages).
Notification of Office Action dated Mar. 24, 2020 From the State Intellectual Property Office of the People's Republic of China Re. Application No. 201580069912.7. (9 Pages).
Restriction Official Action dated Apr. 17, 2020 from the US Patent and Trademark Office Re. U.S. Appl. No. 16/095,384. (6 pages).
Official Action dated Jul. 17, 2020 from the US Patent and Trademark Office Re. U.S. Appl. No. 16/095,384. (49 pages).
Notification of Reasons for Rejection dated Oct. 15, 2019 From the Japan Patent Office Re. Application No. 2017-521539. (2 Pages).
Final Official Action dated Jun. 9, 2020 from the US Patent and Trademark Office Re. U.S. Appl. No. 15/549,191. (29 pages).
Interview Summary dated Jun. 30, 2020 from the US Patent and Trademark Office Re. U.S. Appl. No. 16/095,384. (3 pages).
Official Action dated Jun. 18, 2020 from the US Patent and Trademark Office Re. U.S. Appl. No. 16/075,652. (59 pages).
Restriction Official Action dated Jun. 23, 2020 from the US Patent and Trademark Office Re. U.S. Appl. No. 16/075,159. (8 pages).
Restriction Official Action dated Jul. 9, 2020 from the US Patent and Trademark Office Re. U.S. Appl. No. 16/075,157. (8 pages).
Khodabakhshi "Anionic Polymerisation of Caprolactam: An Approach to Optimising the Polymerisation Conditions to be Used in a Jetting Process", PhD Thesis Submitted to Department of Materials, Loughborough University: 1-214, 2011.
Office Action dated Dec. 15, 2019 From the Israel Patent Office Re. Application No. 253826 and Its Translation Into English. (5 Pages).
Translation Dated Apr. 20, 2020 of Notification of Office Action dated Mar. 24, 2020 From the State Intellectual Property Office of the People's Republic of China Re. Application No. 201580069912.7. (11 Pages).

(56) References Cited

OTHER PUBLICATIONS

Office Action dated Jun. 3, 2020 From the Israel Patent Office Re. Application No. 251842 and Its Translation Into English. (5 Pages).
Invitation Pursuant to Rule 137(4) EPC and Article 94(3) EPC Dated Jun. 25, 2019 From the European Patent Office Re. Application No. 17706320.3. (2 Pages).
Translation of Notification dated Aug. 13, 2019 From OA of Jul. 24, 2019 From the State Intellectual Property Office of the People's Republic of China Re. Application No. 201580069912.7. (15 Pages).
Official Action dated May 26, 2021 From the US Patent and Trademark Office Re. U.S. Appl. No. 16/075,159. (40 Pages).
Notification of Reasons for Rejection dated Oct. 15, 2019 From the Japan Patent Office Re. Application No. 2017-521539 and Its English Summary. (3 Pages).
Official Action dated Sep. 30, 2019 From the US Patent and Trademark Office Re. U.S. Appl. No. 15/549,191. (46 pages).

* cited by examiner

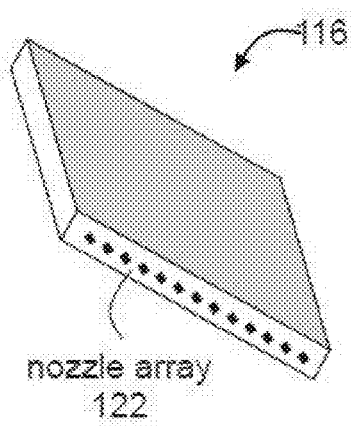
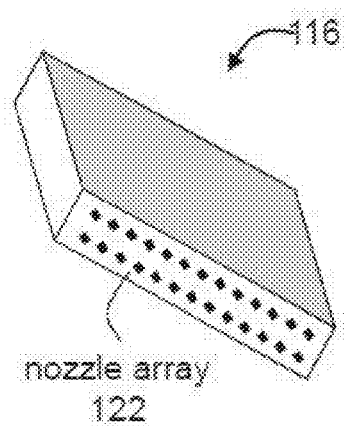
FIG. 3A
FIG. 3B
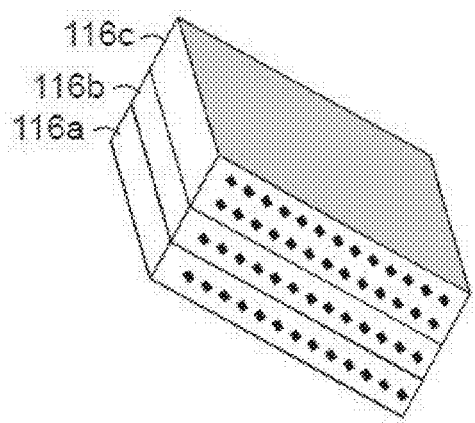
FIG. 3C
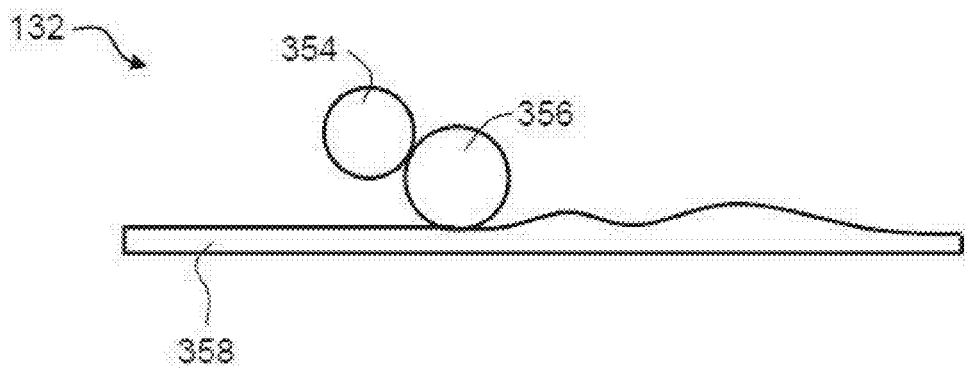
FIG. 4

THREE-DIMENSIONAL PRINTING COMBINING RING-OPENING METATHESIS POLYMERIZATION AND FREE RADICAL POLYMERIZATION

RELATED APPLICATIONS

This application is a National Phase of PCT Patent Application No. PCT/IL2017/050137 having International filing date of Feb. 5, 2017, which claims the benefit of priority under 35 USC § 119(e) of U.S. Provisional Patent Application No. 62/292,334 filed on Feb. 7, 2016. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to formulations, methods and systems for performing three-dimensional inkjet printing while employing ring-opening metathesis polymerization (ROMP) and free radical polymerization and to objects obtained by these methods.

Three-dimensional (3D) inkjet printing is a known process for building three dimensional objects by selectively jetting chemical compositions, for example, polymerizable compositions, via ink-jet printing head nozzles, onto a printing tray in consecutive layers, according to pre-determined image data. 3D inkjet printing is performed by a layer by layer inkjet deposition of chemical compositions. Thus, a chemical composition is dispensed in droplets from a dispensing head having a set of nozzles to form layers on a receiving medium. The layers may then be cured or solidified using a suitable methodology, to form solidified or partially solidified layers of the building material.

The chemical compositions used for forming the building material may be initially liquid and subsequently hardened (cured or solidified) to form the required layer shape. The hardening may be effected, for example, by exposing the building material to a curing energy such as thermal energy (e.g., by heating the building material) or to irradiation (e.g., UV or other photo-irradiation), or may be activated chemically, for example, by acid or base activation.

The chemical (e.g., polymerizable) compositions utilized in 3D inkjet printing processes are therefore selected so as to meet the process requirements, namely, exhibiting a suitable viscosity during jetting (thus being non-curable under jetting conditions) and rapid curing or solidification, typically upon exposure to a stimulus on the receiving medium. The building materials may include modeling materials and support materials, which form the object and optionally the temporary support constructions supporting the object as it is being built, respectively. The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, upon exposure to a condition that affects curing of the materials, to form the required layer shape. After printing completion, support structures, if present, are removed to reveal the final shape of the fabricated 3D object.

In order to be compatible with most of the commercially-available printing heads utilized in a 3D inkjet printing system, the uncured building material should feature the following characteristics: a relatively low viscosity (e.g., Brookfield Viscosity of up to 35 cps, preferably from 8 to 25 cps) at the working (e.g., jetting) temperature; Surface tension of from about 10 to about 50 Dyne/cm; a Newtonian liquid behavior; and high reactivity to a selected curing energy, to enable immediate solidification of the jetted layer upon exposure to a curing energy.

Until today, most 3D inkjet methodologies have utilized photopolymerizable materials, mainly free-radical polymerizable materials, and photo-induced curing, typically UV curing, thus narrowing the choice of materials and chemical reactions that can be utilized in this technology. Exemplary photopolymerizable building materials that are currently used in, for example, a "PolyJet" technology (Stratasys Ltd., Israel), are acrylic based materials.

International Patent Application Publication No. WO 2013/128452 discloses a multi-material approach which involves separate jetting of two components of a cationic polymerizable system and/or a radical polymerizable system, which intermix on the printing tray, leading to a polymerization reaction similar to pre-mixing of the two components before jetting, while preventing their early polymerization on the inkjet head nozzle plate.

Ring-opening metathesis polymerization (ROMP) is a type of olefin metathesis chain-growth polymerization. The driving force of the reaction is the relief of strained cyclic structures, typically cyclic olefins (e.g., norbornenes or cyclopentenes) or dienes (e.g., cyclopentadiene-based compounds).

The polymerization reaction typically occurs in the presence of organometallic catalysts, and the ROMP catalytic cycle involves formation of metal-carbene species, which reacts with the double bond in the cyclic structure to thereby form a highly strained metallacyclobutane intermediate. The ring then opens, giving a linear chain double bonded to the metal and terminated with a double bond. The as formed metal-carbene species then reacts with the double bond on another cyclic monomer, and so forth.

During recent decades ROMP evolved as a powerful polymerization tool especially due to the development of well-defined transition metal complexes as catalysts. Ruthenium, molybdenum and osmium carbene complexes useful as catalysts of ROMP reactions are described, for example, in U.S. Pat. Nos. 5,312,940, 5,342,909, 5,728,917, 5,710,298, 5,831,108, and 6,001,909; and PCT International Patent Applications having Publication Nos. WO 97/20865, WO 97/29135 and WO 99/51344.

The use of ROMP reactions in reaction injection molding (RIM) has been described, for example, in U.S. Patent Application Publication Nos. 2011/0171147, 2005/0691432, U.S. Pat. No. 8,487,046, EP Patent Application Publication No. 2452958, and EP Patent No. 2280017. One of the ROMP materials used in ROMP-based RIM is dicyclopentadiene (DCPD).

Poly-DCPD-based materials exhibit good mechanical properties and combine both good toughness and high thermal resistance. For example, polymeric materials based on DCPD were used to produce Telene 1810, which features a viscosity of about 200 cps at room temperature, HDT of 120° C. and impact of 300 J/m; and Metton M15XX, which features a viscosity of 300 cps at room temperature, Tg of 130° C. and impact of 460 J/m [see, for example, www(dot)metton(dot)com/index(dot)php/metton-lmr/benefits].

Additional background art includes WO 2013/128452; Adv. Funct. Mater. 2008, 18, 44-52; Adv. Mater. 2005, 17, 39-42; and Pastine, S. J.; Okawa, D.; Zettl, A.; Fréchet, J. M. J. J. Am. Chem. Soc. 2009, 131, 13586-13587; Vidaysky and Lemcoff, *Beilstein J. Org. Chem.* 2010, 6, 1106-1119; Ben-Asuly et al., Organometallics 2009, 28, 4652-4655; Piermattei et al., Nature Chemistry, DOI: 10.1038/NCHEM.167; Szadkowska et al., Organometallics 2010, 29, 117-124; Diesendruck, C. E.; Vidaysky, Y.; Ben-Asuly, A.; Lemcoff, N. G., *J. Polym. Sci., Part A: Polym. Chem.* 2009, 47, 4209-4213; Wang et al., Angew. Chem. Int. Ed. 2008, 47, 3267-3270; U.S. Patent Application Publication No. 2009-0156766; WO 2014/144634; EP Patent No. 1757613, U.S. Pat. No. 8,519,069, and PCT International Application No. PCT/IL2015/051038 published as WO 2016/063282.

SUMMARY OF THE INVENTION

Ring Opening Metathesis Polymerization (ROMP) systems are used for producing cured material that exhibit valuable properties, such as relatively low shrinkage, high thermal resistance, high impact, and chemical and solvent resistance.

However, the ROMP technology is limited to methodologies such as, for example, RIM, mainly due to its rapid curing at ambient conditions (e.g., room temperature). Typically, a formulation polymerizable by ROMP immediately solidifies once a catalyst is added and/or activated. This limits the use of ROMP formulations in 3D inkjet processes, where liquid formulations that feature viscosity within a pre-determined range are required to be passed through inkjet printing heads.

The present inventors have now designed various methodologies usable in 3D inkjet printing of ROMP formulations (formulation systems in which a monomer is polymerizable via ROMP), and particularly usable in 3D inkjet printing processes combining ROMP curable systems and free-radical polymerization systems.

Embodiments of the present invention therefore relate to formulations, methods (processes) and systems designed for practicing 3D inkjet printing processes while using ROMP curable systems and free-radical polymerization systems.

According to an aspect of some embodiments of the present invention there is provided a method of fabricating a three-dimensional object, the method comprising sequentially forming a plurality of layers in a configured pattern corresponding to the shape of the object, thereby forming the object, wherein forming at least one of the layers comprises:

dispensing by at least one inkjet printing head at least one modeling material formulation which comprises:

an unsaturated cyclic monomer polymerizable by ring opening metathesis polymerization (ROMP);

a catalyst for initiating ROMP of the monomer;

a curable material polymerizable by free-radical polymerization (FRP); and a curing agent for initiating free radical polymerization of the curable material;

exposing the at least one modeling material formulation to a condition at which ROMP of the ROMP monomer occurs (a ROMP condition), for a first time period; and exposing the at least one modeling material formulation to a condition at which free radical polymerization of the FRP curable material occurs (a FRP condition), wherein:

exposing to the FRP condition is subsequent to the first time period; and/or the ROMP condition comprises a first temperature and the FRP condition comprises a second temperature, the second temperature being higher than the first temperature; and/or the curing agent is such that its half life at the first temperature, $t_{1/2\ CT}$, and a time period in which 80% of the unsaturated cyclic monomer undergo polymerization by the ROMP at the first temperature (CT), toy), satisfy 2.5 times $t_{c80} < t_{1/2\ CT} < 1000$ times $t_{c80}$.

Herein, a "ROMP condition" encompasses a condition which induces initiation of ROMP of the ROMP monomer by the catalyst and a condition at which ROMP occurs, which can be the same as or different from the condition which induces FRP initiation.

Herein, a "FRP condition" encompasses a condition which induces initiation of free radical polymerization of the FRP curable material by the catalyst and a condition at which FRP occurs, which can be the same as or different from the condition which induces ROMP initiation.

According to an aspect of some embodiments of the present invention there is provided a method of fabricating a three-dimensional object, the method comprising sequentially forming a plurality of layers in a configured pattern corresponding to the shape of the object, thereby forming the object, wherein forming at least one of the layers comprises:

(i) dispensing by at least one inkjet printing head at least one modeling material formulation, the at least one modeling material formulation comprising:

an unsaturated cyclic monomer polymerizable by ring opening metathesis polymerization (ROMP);

a catalyst or catalyst system comprising a catalyst for initiating ROMP of the monomer;

a curable material polymerizable by free-radical polymerization (FRP); and a curing agent (or system) for initiating free radical polymerization (FRP) of the curable material;

(ii) exposing the at least one modeling material formulation to a condition for inducing initiation of ROMP of the monomer by the catalyst;

(iii) maintaining the formulation at a first temperature for a first time period; and (iv) subsequent to the first time period, exposing the modeling material formulation to a condition for inducing initiation of free-radical polymerization of the curable material by the curing agent, the condition for inducing initiation of the free radical polymerization comprising a second temperature, wherein the second temperature is higher than the first temperature, to thereby obtain a cured modeling material in the layer.

According to some of any of the embodiments described herein, the first time period is such that at least 80% of the unsaturated cyclic monomer undergo polymerization by the ROMP during the first time period.

According to some of any of the embodiments described herein, the second temperature is higher than a glass transition temperature (Tg) of a polymeric material formed upon the exposing to a condition for inducing initiation of ROMP of the monomer during the first time period.

According to some of any of the embodiments described herein, the second temperature is higher than the first temperature by at least 20° C., or by at least 30° C., or by at least 40° C., or by at least 50° C.

According to some of any of the embodiments described herein, the first temperature ranges from 25° C. to about 200° C., or from 25° C. to about 150° C.

According to some of any of the embodiments described herein, the second temperature is higher than 100° C., or higher than 120° C., or higher than 150° C.

According to some of any of the embodiments described herein, the second temperature is lower than 200° C., or lower than 190° C., or lower than 180° C., or lower.

According to some of any of the embodiments described herein, the curing agent is such that its half life at the first temperature, $t_{1/2\ CT}$, and a time period in which 80% of the unsaturated cyclic monomer undergo polymerization by the ROMP at the first temperature (CT), $t_{c80}$, satisfy 2.5 times $t_{c80} < t_{1/2\ CT} < 1000$ times $t_{c80}$.

According to some of any of the embodiments described herein, the curing agents is characterized by a half life at the first temperature, $t_{1/2\ CT}$, which satisfies 10 times $t_{c80} < t_{1/2\ CT} < 100$ times $t_{c80}$.

According to some of any of the embodiments described herein, the curing agent has a one-minute half-life temperature of less than 183° C., or less than 170° C., or less than 160° C.

According to an aspect of some embodiments of the present invention there is provided a method of fabricating a three-dimensional object, the method comprising sequentially forming a plurality of layers in a configured pattern corresponding to the shape of the object, thereby forming the object, wherein forming each of the layers comprises:

(i) dispensing by at least one inkjet printing head at least one modeling material formulation, the at least one modeling material formulation comprising:

an unsaturated cyclic monomer polymerizable by ring opening metathesis polymerization (ROMP);

a catalyst for initiating ROMP of the monomer;

a curable material polymerizable by free-radical polymerization; and a curing agent for initiating free radical polymerization of the curable material;

(ii) exposing the at least one modeling material formulation to a condition for inducing initiation of ROMP of the ROMP monomer by the catalyst;

(iii) maintaining the at least one modeling material formulation at a first temperature; and (iv) exposing the modeling material formulation to a condition for inducing initiation of free-radical polymerization of the curable material by the curing agent, the condition for inducing initiation of the free radical polymerization comprising a second temperature, to thereby obtain a cured modeling material in the layer, wherein the curing agent is such that its half life at the first temperature, $t_{1/2\ CT}$, and a time period in which 80% of the unsaturated cyclic monomer undergo polymerization by the ROMP at the first temperature (CT), $t_{c80}$, satisfy 2.5 times $t_{c80} < t_{1/2\ CT} < 1000$ times $t_{c80}$.

According to some of any of the embodiments described herein, the curing agent is characterized by a half life at the first temperature, $t_{1/2\ CT}$, which satisfies 10 times $t_{c80} < t_{1/2\ CT} < 100$ times $t_{c80}$.

According to some of any of the embodiments described herein, the curing agent has a one-minute half-life temperature of less than 183° C., or less than 170° C., or less than 160° C.

According to some of any of the embodiments described herein, the first temperature and the second temperature are substantially the same.

According to some of any of the embodiments described herein, the second temperature is higher than the first temperature.

According to some of any of the embodiments described herein, exposing to the second temperature is subsequent to the first time period.

According to some of any of the embodiments described herein, the first time period is such that at least 80% of the unsaturated cyclic monomer (ROMP monomer) undergo polymerization by the ROMP during the first time period.

According to some of any of the embodiments described herein, the second temperature is higher than a glass transition temperature (Tg) of a polymeric material formed upon the exposing to a condition for inducing initiation of ROMP of the ROMP monomer during the first time period.

According to some of any of the embodiments described herein, the second temperature is higher than the first temperature by at least 20° C., or by at least 30° C., or by at least 40° C., or by at least 50° C.

According to some of any of the embodiments described herein, the first temperature ranges from 25° C. to about 200° C., or from about 25° C. to about 150° C.

According to some of any of the embodiments described herein, the second temperature is higher than 100° C., or higher than 120° C., or higher than 150° C.

According to some of any of the embodiments described herein, the second temperature is lower than 200° C., or lower than 190° C., or lower than 180° C., or lower.

According to some of any of the embodiments described herein, the curing agent comprises a peroxide, preferably a non-cyclic peroxide.

According to some of any of the embodiments described herein, the at least one modeling material formulation is characterized by a viscosity of no more than 35 centipoises at a temperature of the inkjet printing head during the dispensing.

According to some of any of the embodiments described herein, prior to exposing, the catalyst system is such that the catalyst does not initiate ROMP of the monomer.

According to some of any of the embodiments described herein, the curable material, the unsaturated cyclic monomer polymerizable by the ROMP (the ROMP monomer), the curing agent and the catalyst system are included in the same modeling material formulation.

According to some of any of the embodiments described herein, prior to the exposing, at least one of the (FRP) curable material, the curing agent, the monomer polymerizable by the ROMP (the ROMP monomer), and the catalyst is physically separated from other components in the formulation.

According to some of any of the embodiments described herein, at least one of the condition for inducing initiation of the ROMP and the condition for inducing initiation of the free radical polymerization comprises removing the physical separation.

According to some of any of the embodiments described herein, the catalyst is active towards initiating ROMP of the ROMP monomer, and wherein prior to the exposing, at least the catalyst (the ROMP catalyst) and the ROMP monomer are physically separated in the modeling material formulation.

According to some of any of the embodiments described herein, the condition for inducing initiation of the ROMP comprises removing the physical separation between the catalyst and the monomer.

According to some of any of the embodiments described herein, the catalyst system is such that the catalyst is inactive towards initiating ROMP of the monomer.

According to some of any of the embodiments described herein, the catalyst is activatable by the exposing to the condition for inducing initiation of the ROMP.

According to some of any of the embodiments described herein, the catalyst system further comprises an activator for chemically activating the catalyst towards initiating ROMP of the monomer, and wherein prior to the exposing, the activator is incapable of activating the catalyst.

According to some of any of the embodiments described herein, the activator is physically separated from the catalyst and/or the monomer in the modeling material formulation.

According to some of any of the embodiments described herein, the condition for inducing initiation of the ROMP comprises removing the physical separation between the activator and the catalyst and/or the monomer.

According to some of any of the embodiments described herein, prior to the exposing, the activator is chemically inactive in the modeling material formulation.

According to some of any of the embodiments described herein, the activator is activatable upon exposure to the condition for inducing initiation of the ROMP, such that the exposing to the condition activates the activator, thereby activating the catalyst towards initiating ROMP of the monomer.

According to some of any of the embodiments described herein, the at least one modeling material formulation further comprises a ROMP inhibitor.

According to some of any of the embodiments described herein, the formation of each of the layers comprises dispensing at least two modeling material formulations by at least two inkjet printing heads, each head jetting one of the at least two modeling material formulations.

According to some of any of the embodiments described herein, at least one of the modeling material formulations comprises the unsaturated cyclic monomer polymerizable by ROMP (the ROMP monomer), and at least another one of the modeling material formulations comprises the catalyst (the ROMP catalyst).

According to some of any of the embodiments described herein, at least one of the modeling material formulations which comprises the monomer polymerizable by ROMP further comprises an activator for chemically activating the catalyst towards initiating ROMP of the monomer.

According to some of any of the embodiments described herein, at least one of the modeling material formulations comprises the unsaturated cyclic monomer polymerizable by ROMP, and the catalyst (the ROMP catalyst), and at least another one of the modeling material formulations comprises an activator for chemically activating the catalyst towards initiating ROMP of the monomer.

According to some of any of the embodiments described herein, at least one of the formulations comprises the (FRP) curable material and at least one another formulation comprises the monomer polymerizable by the ROMP.

According to some of any of the embodiments described herein, at least one of the modeling material formulations further comprises the curing agent (for initiating the FRP).

According to some of any of the embodiments described herein, the curing agent is comprised in at least one modeling material formulation which is devoid of the (FRP) curable material.

According to some of any of the embodiments described herein, at least one of the formulations comprises a ROMP inhibitor.

According to some of any of the embodiments described herein, the method further comprises selecting a ratio between the at least two modeling material formulations; and wherein the dispensing is according to the ratio.

According to some of any of the embodiments described herein, the at least two formulations comprise a first model formulation that comprises the monomer polymerizable by the ROMP and a second model formulation that comprises the curable material, and wherein a ratio between the first and second formulations ranges from 9:1 to 1:9.

According to some of any of the embodiments described herein, the ratio ranges from 4:1 to 1:1.

According to some of any of the embodiments described herein, the at least one modeling material formulation further comprises a toughening agent, an impact modifying agent, a stabilizing agent, a surface active agent, an elastomeric component or composition, an antioxidant, a filler, a pigment, and/or a dispersant.

According to some of any of the embodiments described herein, a temperature of an inkjet printing head for dispensing a modeling material formulation which comprises the monomer polymerizable by the ROMP ranges from 25° C. to 65° C.

According to some of any of the embodiments described herein, at least one of the dispensing and the exposing to the condition for inducing initiation of the ROMP is performed under inert atmosphere.

According to some of any of the embodiments described herein, the method further comprises subjecting the cured modeling material to a post-curing condition.

According to some of any of the embodiments described herein, the post-curing condition comprises heat and/or application of an anti-oxidant composition.

According to an aspect of some embodiments of the present invention there is provided a system for three-dimensional inkjet printing, comprising:

a plurality of inkjet printing heads;

a heating system configured for heating a building material formulation dispensed by the printing heads; and a controller configured for controlling the inkjet printing heads to dispense droplets of the building material formulation in layers, such as to print a three-dimensional object on the tray, and for controlling the heating system to first maintain a first temperature for a first time-period, and then maintain a second temperature for a second time-period, the second temperature being higher than the first temperature.

According to some of any of the embodiments described herein, the system further comprises a leveling device configured for straightening at least one of the layers, while the at least one formulation is at a cured or partially cured state.

According to some of any of the embodiments described herein, the leveling device comprises a milling device.

According to some of any of the embodiments described herein, the leveling device is a self-cleaning leveling device, wherein the cured or partially cured formulation is periodically removed from the leveling device.

According to some of any of the embodiments described herein, at least one of the inkjet printing heads is configured to maintain a temperature of at least 25° C. but which does not exceed 65° C.

According to some of any of the embodiments described herein, at least one of the inkjet printing heads is configured to maintain a temperature of at least 65° C. but which does not exceed 85° C.

According to some of any of the embodiments described herein, at least one of the inkjet printing heads is configured to heat at least one modeling material formulation of the building material formulation prior to the dispensing, and wherein the controller is configured to ensure that a temperature within the at least one inkjet printing head is at least 25° C. but not above 65° C.

According to some of any of the embodiments described herein, at least one of the inkjet printing heads is configured to heat at least one modeling material formulation of the building material formulation prior to the dispensing, and wherein the controller is configured to ensure that a temperature within the at least one inkjet printing head is at least 65° C. but not above 95° C. or above 85° C.

According to some of any of the embodiments described herein, the system further comprises a mixing chamber for preparing at least modeling material formulation of the building material formulation prior to entry of the at least one modeling material formulation into a respective head, wherein a position and fluid communication between the mixing chamber and the respective head is selected such that at least 80% of the at least one modeling material formulation entering the respective head remains uncured.

According to some of any of the embodiments described herein, the heating system comprises a ceramic radiation source.

According to some of any of the embodiments described herein, the system further comprises a chamber containing the plurality of inkjet printing heads, the chamber being generally sealed to an environment outside the chamber.

According to some of any of the embodiments described herein, the chamber comprises a gas inlet and the system comprises a gas source configured for filling the chamber by an inert gas through the gas inlet.

According to some of any of the embodiments described herein, the controller is configured for generating, continuously or intermittently, inflow and outflow of the inert gas through the gas inlet and the gas outlet, respectively.

According to some of any of the embodiments described herein, the system further comprises a gas flow generating device, placed within the chamber and configured for generating a flow of the inert gas within the chamber.

According to some of any of the embodiments described herein, the system further comprises a working tray for carrying the layers once formed, and a working tray heater for heating the working tray.

According to an aspect of some embodiments of the present invention there are provided kits comprising the at least one modeling material formulation as described herein. In some embodiments, a kit comprising the modeling material formulation further comprises instructions to use the formulation in a 3D inkjet printing of an object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-C are schematic illustrations of printing heads according to some embodiments of the present invention; and FIG. 4 is a schematic illustration of a self-cleaning leveling device, according to some embodiments of the present invention.

DESCRIPTION OF SPECIFIC EMBODIMENTS OF THE INVENTION

Figure 1:
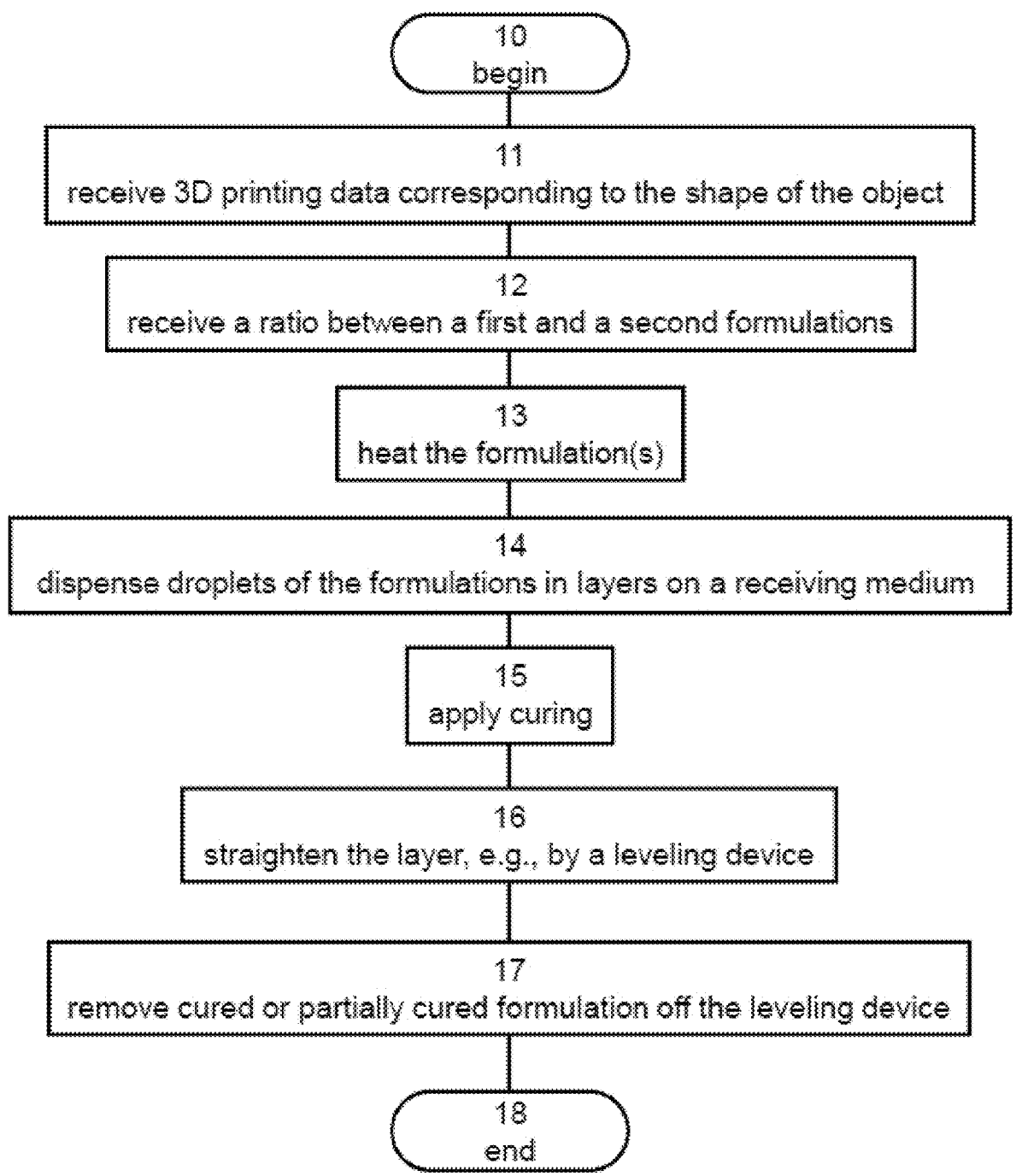
FIG. 1 is a flowchart describing an exemplary method according to some embodiments of the present invention.

The present invention, in some embodiments thereof, relates to three-dimensional printing and, more particularly, but not exclusively, to formulations, methods and systems for performing three-dimensional inkjet printing while employing ring-opening metathesis polymerization (ROMP) and free radical polymerization and to objects obtained by these methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have sought for methodologies that enable utilizing materials obtainable via ring opening metathesis polymerization (ROMP) in combination with materials obtainable via free radical polymerization in three-dimensional (3D) inkjet printing processes.

As discussed hereinabove, 3D inkjet printing systems require, on one hand, using building material formulations which exhibit certain properties while being dispensed from inkjet printing heads, and, on the other hand, aim to obtain three-dimensional objects which feature stability, durability and toughness.

Materials obtained by ring-opening metathesis polymerization (ROMP) are characterized by exceptional mechanical and other properties. However, employing ROMP chemistry in 3D inkjet printing requires solving problems associated with, for example, fast propagation of the polymerization reaction, immediately once a catalyst contacts a ROMP monomer. Thus, for example, pre-mixing a ROMP monomer and a ROMP catalyst before jetting leads to substantial increase in viscosity when such a formulation passes through the inkjet printing head and nozzle plate, resulting in clogging due to polymerization of the composition on the nozzle plate.

Moreover, it has been uncovered that when combining a ROMP system and a free-radical polymerization system in 3D inkjet printing processes, such that the polymerization reactions occur simultaneously, the free radical polymerization may interfere with the ROMP, preventing its advance and leading to formation of a cured modeling material with inferior properties.

The present inventors have designed formulations, methods and systems which enable using ROMP chemistry, combined with free radical polymerization chemistry, in 3D printing processes (e.g., 3D inkjet printing processes), while maintaining the exceptional properties imparted by the ROMP materials to the objects.

Embodiments of the present invention therefore relate to formulations, methods (processes) and systems designed for practicing 3D inkjet printing processes while using ROMP curable systems and free-radical polymerization curable systems.

The Method:

According to aspects of some embodiments of the present invention, there is provided a method of three-dimensional (3D) inkjet printing of a three-dimensional object. According to embodiments of these aspects, the method is generally effected by sequentially forming a plurality of layers in a configured pattern corresponding to the shape of the object, thereby forming the object.

According to embodiments of these aspects, formation of each layer is effected by dispensing a building material formulation (uncured building material, also referred to herein simply as a building material) which comprises at least one modeling material formulation, and exposing the dispensed building material formulation to condition which affects curing of the formulation to thereby obtain a cured building material.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Each layer is preferably formed by three-dimensional inkjet printing which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

When three-dimensional inkjet printing is employed, a building material formulation is dispensed from one or more dispensing head(s) each having one or more (e.g., a set of) nozzles to deposit the building material formulation in layers on a supporting structure. The inkjet printing system thus dispenses a building material formulation in target locations which are to be occupied and leaves other target locations void. The inkjet printing typically includes a plurality of dispensing heads, each of which can be configured to dispense a different formulation which forms a part of the building material formulation. Thus, different target locations can be occupied by different building materials.

The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

Herein throughout, the phrases "building material formulation", "uncured building material", "uncured building material formulation", "building material" and other variations therefore collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely, uncured support material formulations.

Herein, the phrase "printed object" describes the product of the 3D inkjet process, before the support material, if such has been used as part of the uncured building material, is removed. Herein throughout, the term "object" or "model object" describes a final product of the additive manufacturing. This term refers to the product obtained by a method as described herein, after removal of the support material, if such has been used as part of the uncured building material. The "object" therefore essentially consists (at least 95 weight percents) of a cured modeling material.

The term "object" as used herein throughout refers to a whole object or a part thereof.

Herein throughout, the phrase "cured modeling material" describes the part of the building material that forms the object, as defined herein, upon exposing the dispensed building material to curing (and optionally post-treatment), and, optionally, if a support material has been dispensed, removal of the cured support material, as described herein. The cured modeling material can be a single cured material or a mixture of two or more cured materials, depending on the modeling material formulations used in the method, as described herein. According to embodiments of the present invention, the cured modeling material is a mixture of two or more cured materials; a cured material obtained by ROMP and a cured material obtained by FRP.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the uncured building material which is dispensed so as to form the object, as described herein. The modeling material formulation is an uncured modeling formulation (unless specifically indicated otherwise), which, upon exposure to a condition that effects curing, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling formulations, and can be dispensed such that different parts of the object are made, upon curing, of different cured modeling formulations, and hence are made of different cured modeling materials or different mixtures of cured modeling materials.

The method of the present embodiments manufactures three-dimensional objects in a layerwise manner by forming a plurality of layers in a configured pattern corresponding to the shape of the objects, as described herein.

The final three-dimensional object is made of the modeling material or a combination of modeling materials or a combination of modeling material/s and support material/s or modification thereof (e.g., following curing). All these operations are well-known to those skilled in the art of solid freeform fabrication.

In some exemplary embodiments of the invention an object is manufactured by dispensing a building material formulation that comprises two or more different modeling material formulations, each modeling material formulation from a different dispensing head of the inkjet printing apparatus. The modeling material formulations are optionally and preferably deposited in layers during the same pass of the printing heads. The modeling material formulations and/or combination of formulations within the layer are selected according to the desired properties of the object.

FIG. 1 presents a flowchart describing an exemplary method according to some embodiments of the present invention. It is to be understood that, unless otherwise defined, the operations described hereinbelow can be executed either contemporaneously or sequentially in many combinations or orders of execution. Specifically, the ordering of the flowchart is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally and preferably continues to 11 at which 3D printing data corresponding to the shape of the object are received. The data can be received, for example, from a host computer which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Optionally, but not necessarily, the method proceeds to 12 at which a ratio between a first model formulation and a second model formulation is received. While the embodiments below are described with a particular emphasis on a ratio between two model formulations, it is to be understood that more detailed reference to a ratio between two model formulations is not to be interpreted as indicating that embodiments in which a ratio between more than two model formulations are not contemplated. Thus, embodiments of the present invention contemplate receiving a ratio between N model formulations, where N is at least 2, and can be 2, 3, 4, or more. The ratio is typically expressed in terms of the volumes of the respective model formulations, but may also be expressed in terms of other extensive physical properties, such as the weights of the respective model formulations. A representative example of a received ratio for two model formulations is X1:X2, where X1 and X2 are the extensive physical properties (e.g., weight, volume) of the first and second model formulations. A representative example of a received ratio for three or more model formulations is X1:X2: . . . :XN, where N is the number of the model formulations (N>2, in the present example) and X1, X2, . . . , XN are the extensive physical properties (e.g., weight, volume) of the respective model formulations. An exemplary such ratio, a weight ratio, is also referred to herein as A:B ratio.

In some of any of the embodiments described herein, the method comprises selecting a weight ratio A:B of a first model formulation and a second model formulation, in which A represents the part by weight of the first model formulation and B represents a part by weight of the second formulation, of the total weight of the first and second formulations. In some embodiments, the A:B weight ratio ranges from about 9:1 to about 1:9, or from about 9:1 to 1:2, or from about 9:1 to 1:1, or from about 8:2 to 1:1, and can be, for example, 9:1, 8:1, 7:1, 6:1, 5:1, 4:1, 3:1, 2.5:1, 2:1, 1.5:1 1:1 or 1:1.5, including any intermediate values and subranges therebetween.

It is to be understood that whenever a weight ratio A:B is indicated, it corresponds to the relative weight percents of the first and second formulations of the total weight of the first and second formulations. For example, a 3:1 weight ratio corresponds to 75% weight percents of formulation A and 25 weight percents of formulation B. A 4:1 weight ratio corresponds to 80 weight percents of formulation A and 20 weight percents of formulation B.

The ratio can be received as a user input or can be obtained from an external source, such as, but not limited to, a computer that provides a predetermined ratio or calculates it. In these embodiments, at least two of the model formulations comprise substances (materials) that react chemically with one another to form a building (e.g., modeling) material. The properties of the building (e.g., modeling) material that is formed by the chemical reaction typically depend on the selected ratio. The computer can thus calculate the ratio based on the desired properties of the building (e.g., modeling) material. Also contemplated are embodiments in which instead of receiving the ratio the method receives building (e.g., modeling) material properties and calculates the ratio based on the received properties.

At 14 droplets of a building material (uncured) as described herein are dispensed in layers, on a receiving medium, using at least two different multi-nozzle inkjet printing heads, according to the printing data. The receiving medium can be a tray of a three-dimensional inkjet system or a previously deposited layer. The building material comprises one or more modeling material formulations that comprise components of a ROMP system and of a free-radical polymerization system, as described herein. The building material cam optionally further comprise a support material formulation.

In some embodiments of the present invention, the dispensing 14 is effected within an environment that is similar in its thermodynamic condition (for example, temperature, humidity, pressure) to the ambient environment. Alternatively, the dispensing 14 can be executed in a generally dry (e.g., relative humidity of less than 60% or less than 50% or less than 40%, or less) and inert environment. For example, the dispensing can be executed in a nitrogen environment. In these embodiments, dispensing 14 is executed in a chamber and is optionally and preferably preceded by an operation in which an inert gas, e.g., nitrogen, helium, krypton and the like is introduced into the chamber.

When there is more than one the model formulation, the dispensing 14 is optionally and preferably according to a predetermined ratio between the model formulations. In embodiments in which operation 12 is executed, the dispensing 14 can be according to the ratio selected at 12. Typically, the amounts (e.g., weight, volume) of model formulations that are dispensed can be according to the predetermined or selected ratio. For example, the ratio between the size (e.g., weight, volume) of the dispensed droplets of the first model formulation and the size (e.g., weight, volume) of the dispensed droplets of the second model formulation can correspond to the predetermined or selected ratio. Also contemplated are embodiments in which the ratio between the number of the dispensed droplets of the first model formulation and the number of the dispensed droplets of the second model formulation correspond to the predetermined or selected ratio.

Optionally, before being dispensed, the uncured building material, or a part thereof (e.g., one or more formulations of the (uncured) building material, preferably one or more modeling material formulation), is heated 13, prior to being dispensed. These embodiments are particularly useful for uncured building material formulations having relatively high viscosity at the operation temperature of the working chamber of a 3D inkjet printing system. The heating 13 of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity of no more than X centipoises, where X is about 40 centipoises, or about 35 centipoises, or about 30 centipoises, preferably about 25 centipoises and more preferably about 20 centipoises, or 18 centipoises, or 16 centipoises, or 14 centipoises, or 12 centipoises, or 10 centipoises and even as low as 2 centipoises. In some embodiments, the viscosity is at least 8 centipoises.

The heating 13 can be executed before loading the respective formulation into the printing head of the 3D printing system, or while the formulation is in the printing head or while the formulation passes through the nozzle of the printing head.

In some embodiments, the heating 13 is executed before loading of the respective formulation into the printing head, so as to avoid clogging of the printing head by the formulation in case its viscosity is too high.

In some embodiments, the heating 13 is executed by heating the printing heads, at least while passing the formulations making up the building material through the nozzle of the printing head.

In some embodiments, a temperature of an inkjet printing head for dispensing a modeling material formulation as described herein is lower than 70° C., and ranges, for example, from about 25° C. to about 65° C., including any subranges and intermediate values therebetween. Modeling material formulations which comprise one or more monomers that undergo polymerization via ROMP, as described herein, and optionally other, non-curable components, are suitable for use in the context of these embodiments.

In some embodiments, higher temperatures of an inkjet printing head are required, for example, higher than 70° C., or ranging from about 65° C. to about 95° C., or ranging from about 65° C. to about 85° C., including any subranges and intermediate values therebetween. Modeling material formulations which comprise curable materials which are polymerizable by non-ROMP reactions, as described herein as curable components, for example, FRP curable materials, optionally in addition to ROMP-curable components, are suitable for use in the context of these embodiments.

Once the uncured building material is dispensed on the receiving medium according to the 3D printing data, the method optionally and preferably continues to 15 at which the deposited layers are exposed to a curing condition (one, two or more conditions), as defined herein. Preferably, each individual layer is exposed to this condition following or during the deposition of the layer, and prior to the deposition of the subsequent layer.

In some embodiments, exposing to conditions that effect curing is performed under a generally dry and inert environment, as described herein.

In these embodiments, the dry and inert environment is optionally and preferably prepared before the material is dispensed so that 15 can be executed simultaneously with 14 wherein the material is exposed to the environment upon exiting the inkjet printing head.

Alternatively or additionally, the exposure 15 can include exposing the dispensed layer to radiation, such as, but not limited to, electromagnetic radiation, for example, infrared radiation (e.g., at a wavelength of from about 800 nm to about 4 µm), ultraviolet radiation (e.g., at a wavelength of from about 200 nm to about 400 nm) and visible or near-visible light radiation (e.g., at a wavelength of from about 400 nm to about 800 nm), or particle radiation, for example in the form of an electron beam, depending on the modeling material being used. Preferably, but not necessarily, the infrared radiation is applied by a ceramic lamp, for example, a ceramic lamp that produces infrared radiation of from about 3 µm to about 4 µm, e.g., about 3.5 µm, or of any other wavelength suitable for efficient application of heat, as discussed hereafter.

Alternatively or additionally, the exposure 15 can include exposing the dispensed layer to elevated temperature, for example, from about 25° C. to about 100° C., or from about 25° C. to about 65° C., or from about 65° C. to about 100° C. Higher temperatures (for example, above 100° C. or from about 100° C. to about 900° C., or from about 200° C. to about 900° C., e.g., about 300° C., or from about 300° C. to about 900° C. or from about 400° C. to about 900° C.) are also contemplated. The elevated temperatures can be generated by heating the tray on which the layers are dispensed, and/or the chamber within which the printing process is executed or heat-inducing irradiation, using a radiation source as described herein, at a suitable wavelength for providing a required temperature. A ceramic lamp, for example, when operated at the above-described wavelengths, may result in heating a dispensed formulation to up to 300° C., and even to a temperature of from about 400° C. to about 900° C.

In some embodiments of the present invention 15 is executed in two or more stages. For example, the modeling material formulation(s) can first be heated to a first temperature (or maintained at room temperature in case the first temperature is room temperature), which is maintained for a first time period, and then heated to a second temperature which is maintained for a second time period, wherein the second temperature is higher than the first temperature. It was found by the present inventors that with such heating protocol, ROMP occurs during the first time-period and free-radical polymerization occurs during the second time-period. In various exemplary embodiments of the invention the first temperature is sufficient to initiate and/or effect ROMP but sufficiently low so that free-radical polymerization is not initiated or occurs as at slow rate. Further details regarding this heating protocol are provided hereinbelow.

The method can preferably continue to 16 at which the deposited layer is straightened, for example, by a leveling device. Optionally, the layer is straightened after the dispensed formulation is cured or partially cured. Alternatively, the layer is straightened while the dispensed formulation is still uncured. In some embodiments, straightening of a layer is performed so as to provide a certain (e.g., pre-determined) thickness of the layer, to thereby provide a plurality of layers in which a thickness of at least one, and preferably two or more, of the layers is controlled.

As used herein the phrase "cured" refers to a formulation that underwent curing or at least a partial curing, as defined herein, and encompasses a state of the formulation in which at least 20% or at least 30% or at least 40% or at least 50% or at least 60% or at least 70% of the formulation underwent curing, as defined herein, and a state of a formulation that underwent up to 100% curing.

Typically, a formulation that underwent curing or partial curing is characterized by a viscosity that is substantially higher than an uncured formulation, and preferably, a formulation, or at least a part thereof, solidifies upon curing. A "cured" formulation is also referred to interchangeably as a "hardened" formulation or as a "solidified" formulation.

Straightening or leveling of a layer or layers after curing (or partial curing) can be achieved by a leveling device that is capable of reforming the solidified portion of the formulation or removing part thereof. A representative example of such a leveling device is a roller capable of milling, grinding and/or flaking a solidified formulation or part thereof. Straightening can be achieved by a leveling device that is capable of leveling the formulation in its liquid, gel, partially cured or cured state. In some embodiments, the leveling device effects milling, grinding and/or flaking, and/or removes at least part of the top of a layer of the formulation. Such a leveling device can be, for example, a roller, a blade or a cutter. In some embodiments of the present invention the method continues to 17 at which cured, partially cured or uncured formulation is removed off the leveling device. These embodiments are particularly useful when the leveling device is applied to the layer while the formulation is uncured or partially cured. In this case, a portion of the formulation collected by the leveling device can experience curing or partial curing while the formulation is on the leveling device (for example on the roller, when the leveling device comprises a roller), and the method preferably removes such cured or partially cured formulation from the device. These embodiments can also be useful when the leveling device is applied to the layer while the formulation is cured (for example, when the leveling device effects milling, grinding, flaking and/or material removal of the solidified portion of the formulation). In this case the method removes the debris of the milling, grinding and/or flaking process from the leveling device, using for example a suction device.

Operation 17 is preferably executed automatically and optionally also continuously while the leveling device is in motion over the layer. For example, the leveling device can comprise a double roller having a first roller that contacts and straightens the layer and a second that is in contact with the first roller but not with the layer and which is configured to remove the formulation from the first roller.

The method ends at 18.

Figure 5A:
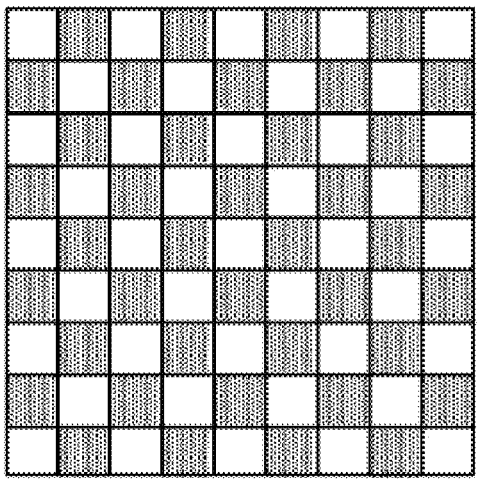
FIGS. 5A and 5B present schematic illustrations of bitmaps in embodiments of the invention in which a "Drop on Drop" printing protocol is employed. A bitmap suitable for the deposition of the first model formulation is illustrated in FIG. 5A and a bitmap suitable for the deposition of the second model formulation is illustrated in FIG. 5B. When the droplets of both formulations have the same or approximately the same weight, the bitmaps are useful for a 50:50 (or 1:1) w/w ratio. White boxes represent vacant locations, dotted boxes represent droplets of the first model formulation and wavy boxes represent droplets of the second model formulation. Each patterned wavy/dotted box represents a pixel (e.g., one composition droplet) in a layer. Both model formulations can be deposited at the same location, but at different times, during movement of the printing heads.
Figure 5B:
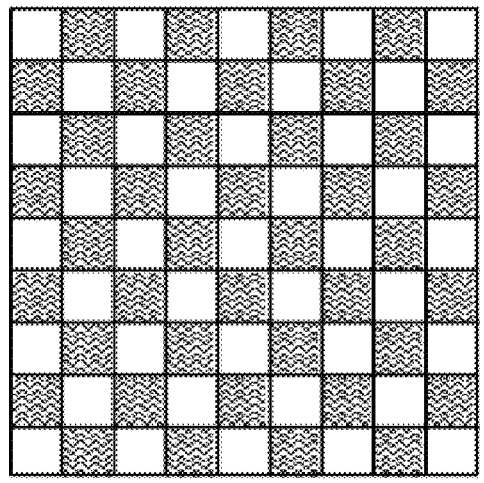

In some embodiments of the present invention a "Drop on Drop" printing protocol is employed. These embodiments are schematically illustrated in FIGS. 5A and 5B. A bitmap suitable for the deposition of the first modeling material formulation is illustrated in FIG. 5A and a bitmap suitable for the deposition of the second modeling material formulation is illustrated in FIG. 5B. White boxes represent vacant locations, dotted boxes represent droplets of the first modeling material formulation and wavy boxes represent droplets of the second modeling material formulation. The printing data in these embodiments are such that for each layer, both modeling material formulations are deposited at the same location, but different times, during movement of the printing head. For example, each droplet of a first modeling material formulation can be jetted on top of a droplet of a second modeling material formulation, or vice versa. Preferably, but not necessarily, the two formulation parts are jetted in drops at the same weight and/or rate. These embodiments are particularly useful when the desired weight ratio is 1:1. For other desired weight ratios, the two formulation parts are preferably jetted in drops of different weights, wherein the ratio of the weights corresponds to the desired ratio.

A representative example for a resolution suitable for the present embodiments is 1200 dpi in the X direction and 300 dpi in the Y direction. The drop on drop printing protocol allows the two types of drops to combine and mix before the crystallization of deposited material.

Figure 6A:
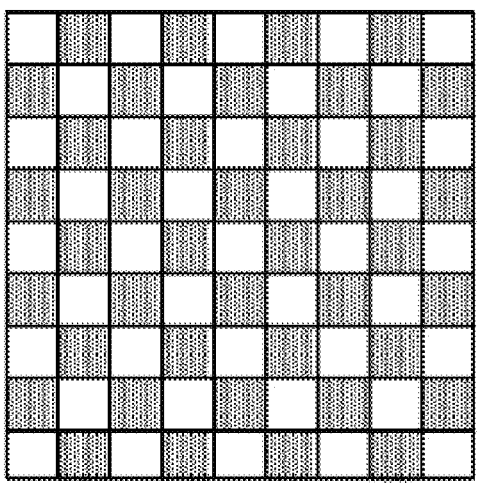
FIGS. 6A and 6B present schematic illustrations of bitmaps in embodiments of the invention in which a "side-by-side" printing protocol is employed. A bitmap suitable for the deposition of the first model formulation is illustrated in FIG. 6A and a bitmap suitable for the deposition of the second model formulation is illustrated in FIG. 6B. When the droplets of both formulations have the same or approximately the same weight, the bitmaps are useful for a 50:50 (or 1:1) w/w ratio. White boxes represent vacant locations, dotted boxes represent droplets of the first model formulation and wavy boxes represent droplets of the second model formulation. Each patterned wavy/dotted box represents a pixel (e.g., one formulation droplet). A drop of the first composition (dotted boxes) is deposited adjacent to a drop of the second composition. Both model formulations may be deposited simultaneously during movement of the printing heads.
Figure 6B:
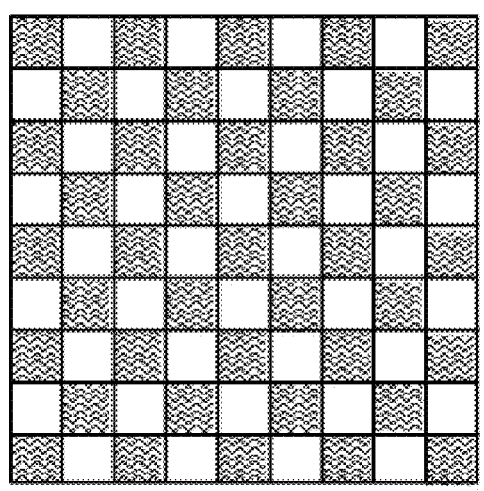

In some embodiments of the present invention a "side by side" printing protocol is employed. These embodiments are schematically illustrated in FIGS. 6A and 6B. A bitmap suitable for the deposition of the first modeling material formulation is illustrated in FIG. 6A and a bitmap suitable for the deposition of the second modeling material formulation is illustrated in FIG. 6B. The colors of the white, dotted and wavy boxes represent vacant locations, droplets of the first modeling material formulation and droplets of the second modeling material formulation, respectively. The printing data in these embodiments is such that for each layer, each drop of a first modeling material formulation is jetted adjacent to a drop of a second modeling material formulation, or vice versa. Due to drop spreading, the adjacent drops tend to partially overlap. As a result, the two drops diffuse toward each other, mix and react after deposition.

In the schematic illustrations shown in FIGS. 5A-6B, chessboard bitmaps are illustrated, but this need not necessarily be the case, since, for some applications, other bitmap patterns can be employed.

In some of any of the embodiments described herein, the uncured building material comprises one or more modeling material formulations, as described in further detail hereinafter, and dispensing the building material formulation comprises dispensing one or more modeling material formulations.

In some of any of the embodiments described herein, the (uncured) building material further comprises one or more support material formulations.

In some of any of the embodiments described herein, dispensing a building material further comprises dispensing the support material formulation(s).

Dispensing the support material formulation, in some embodiments, is effected by inkjet printing head(s) other than the inkjet printing heads used for dispensing the modeling material formulation(s).

In some embodiments, exposing the building material to a condition that induces curing includes one or more conditions that affect curing of a support material formulation, to thereby obtain a cured support material.

In some of any of the embodiments described herein, once a building material is cured, the method further comprises removing the cured support material. Any of the methods usable for removing a support material formulation can be used, depending on the materials employed in the modeling material formulation and the support material formulation. Such methods include, for example, mechanical removal of the cured support material and/or chemical removal of the cured support material by contacting the cured support material with a solution in which it is dissolvable (e.g., an alkaline aqueous solution).

As used herein, the term "curing" describes a process in which a formulation is hardened. Curing typically encompasses polymerization of monomer(s) and/or oligomer(s) and/or cross-linking of polymeric chains (either of a polymer present before curing or of a polymeric material formed in a polymerization of the monomers or oligomers). The product of a curing reaction is therefore typically a polymeric material and in some cases a cross-linked polymeric material. This term, as used herein, encompasses also partial curing, for example, curing of at least 20% or at least 30% or at least 40% or at least 50% or at least 60% or at least 70% or at least 80% of the formulation, as well as 100% of the formulation. This term encompasses, for example, polymerization of at least 20% or at least 30% or at least 40% or at least 50% or at least 60% or at least 70% or at least 80% or at least 85% or at least 90% or at least 95%, as well as 100% of monomers and/or oligomers present in a formulation (e.g., a modeling material formulation).

Herein, the phrase "a condition that affects curing" or "a condition for inducing curing", which is also referred to herein interchangeably as "curing condition" or "curing inducing condition" describes a condition which, when applied to a formulation that contains a curable material (e.g., when exposing a formulation to the condition), induces polymerization of monomer(s) and/or oligomer(s) and/or cross-linking of polymeric chains. Such a condition can include, for example, application of a curing energy, as described hereinafter, to the curable material(s), and/or contacting components of a curable system with one another (e.g., contacting curable material(s) with chemically reactive components such as initiators, co-initiators, catalysts, co-catalysts, and/or activators).

When a condition that induces curing comprises application of a curing energy, the phrase "exposing to a condition that affects curing" means that the dispensed layers are exposed to the curing energy and the exposure is typically performed by applying a curing energy to the dispensed layers.

The phrase "exposing to curing energy" and grammatically diversions thereof typically includes application of radiation or application of heat.

The radiation can be electromagnetic radiation (e.g., ultraviolet or visible light), or electron beam radiation, or ultrasound radiation or microwave radiation, depending on the materials to be cured. The application of radiation (or irradiation) is effected by a suitable radiation source. For example, an ultraviolet or visible or infrared or Xenon lamp can be employed, as described herein.

A curable material or system that undergoes curing upon exposure to electromagnetic radiation (e.g., as described herein) is referred to herein interchangeably as "photopolymerizable" or "photoactivatable" or "photocurable".

When the curing energy comprises heat, the curing is also referred to herein and in the art as "thermal curing" and comprises application of thermal energy, that is, heating the dispensed layer(s) comprising the formulations. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is effected by irradiating the dispensed layers by heat-inducing radiation. Such irradiation can be effected, for example, by means of an IR lamp or Xenon lamp, operated to emit radiation onto the deposited layer.

In some embodiments, heating is effected by infrared radiation applied by a ceramic lamp, for example, a ceramic lamp that produces infrared radiation of from about 3 μm to about 4 μm, e.g., about 3.5 μm.

In some embodiments, the heat-inducing radiation is selected to emit radiation at a wavelength that results in efficient absorption of the heat energy by a selected ROMP monomer or mixture of monomers, or any other curable material, so as to effect efficient application of heat energy (efficient heating or thermal curing). A curable material or system that undergoes curing upon exposure to heat is referred to herein as "thermally-curable" or "thermally-activatable" or "thermally-polymerizable".

Exposing the dispensed layer(s) (the dispensed building material that comprises one or more modeling material formulations) to a curing energy that comprises heat, as used herein, describes a exposing to a curing condition that comprises heating the dispensed layers (the dispensed building material that comprises one or more modeling material formulations) at an elevated temperature, such that the curing condition comprises the elevated temperature (e.g., a first and/or second temperature as described herein).

In some of any of the embodiments described herein, the method further comprises exposing the cured modeling material either before or after removal of a cured support material, if such has been included in the building material, to a post-treatment condition. The post-treatment condition is typically aimed at further hardening the cured modeling material(s) and/or at preventing its oxidation. In some embodiments, the post-treatment hardens a partially-cured material to thereby obtain a completely cured material.

In some embodiments, the post-treatment is effected by exposure to heat or radiation, preferably at a reduced pressure (e.g., vacuum), and optionally at atmospheric pressure under inert atmosphere, as described in any of the respective embodiments herein. In some embodiments, when the condition is heat, the post-treatment can be effected by heating the cured (or partially cured) material for a time period that ranges from a few minutes (e.g., 10 minutes) to a few hours (e.g., 1-24 hours, preferably 1-5 hours), and at a temperature of e.g., above 100° C., for example, at a temperature in a range of 100–200° C., or, for example, at 150° C., and at a reduced pressure.

An inert atmosphere can be, for example, nitrogen and/or argon atmosphere.

Reduced pressure can be, for example, lower than 200 mmHg, lower than 100 mmHg, or lower than 50 mmHg, for example, about 20 mmHg, although any other value is contemplated.

Alternatively, or in addition, the post-curing treatment comprises applying to a surface of (or coating) the model object, or to a part of the surface, a material or a composition that features anti-oxidation activity, to thereby reduce or prevent oxidation of the model object (or a part thereof) when exposed to ambient environment. In some of these embodiments, the material or composition is such that form a thin, preferably, but not necessarily transparent, layer on the surface of the model object or a part thereof. Any material or composition that feature anti-oxidation activity and which can be readily applied to the model object as described herein is contemplated. An exemplary such composition is an acrylic paint, that is, a formulation that forms an acrylic paint once deposited on a surface of the object.

Applying a material or composition featuring an anti-oxidation activity and exposing to heat or radiation, within a post-curing treatment as described herein, when used together, can be effected sequentially or simultaneously. For example, a formulation forming an acrylic paint can be applied to the surface of the model object, and exposure to heat and/or radiation can be applied thereafter, to thereby effect both formation of a layer of the acrylic paint and further hardening of the cured modeling formulation.

Particular Embodiments of the Method:

In some of any of the embodiments described herein, a method of fabricating an object as described herein, is effected such that formation of at least one, preferably each, of the layer(s) comprises dispensing by at least one inkjet printing head an uncured building material which comprises one or more modeling material formulations.

In some embodiments, the uncured building material comprises one modeling material formulation, and in some embodiments, the uncured building material comprises two or more modeling material formulations, which form a modeling material formulation system.

In embodiments pertaining to two or more modeling material formulations, the method further comprises selecting a ratio of the formulations, as described herein.

In some of these embodiments, the ratio is a weight ratio A:B, as described herein, which ranges from 9:1 to 1:9. In some of these embodiments, the ratio ranges from 9:1 to 1:1, and in some embodiments, it is 9:1, or 4:1, or 7:3, or 3:2, or 1:1, wherein A refers to a formulations that comprises a ROMP monomer and B refers to a formulation that comprises a FRP curable material.

According to embodiments of the present invention, the modeling material formulation or the modeling material formulation system (comprising two or more modeling material formulations) comprise:

an unsaturated cyclic monomer polymerizable by ring opening metathesis polymerization (ROMP), which is also referred to herein as component (A);

a catalyst system comprising a catalyst for initiating ROMP of the monomer, which is also referred to herein as component (B);

a curable material polymerizable by free-radical polymerization, which is also referred to herein as component (C); and a curing agent for initiating free radical polymerization of the curable material, which is also referred to herein as component (D).

Components (A), (B), (C) and (D) can be included in a single model formulation or in two or more model formulations, as is described in further detail hereinunder.

In some of any of the embodiments described herein, the dispensed at least one modeling material formulation or the dispensed layer comprising the model formulation(s) is first exposed to a condition for inducing initiation of ROMP of the monomer by the catalyst, that is, the at least one modeling formulation or the layer comprising the at least one modeling formulation is exposed to a curing condition which is a ROMP inducing condition, as described herein.

In some of any of the embodiments described herein, the formulation is maintained at a first time temperature for a first time period.

Herein, the first temperature, maintained during the first time period, is a temperature at which ROMP of the ROMP monomers occurs, is also referred to herein as the "curing temperature" or as CT.

In some embodiments, the first temperature is the ROMP inducing condition, as described herein, when such a condition comprises heat. In such embodiments, exposing to a ROMP inducing condition and maintaining the formulation at the first temperature are effected simultaneously, by exposing the formulation to the first temperature.

In some embodiments, the ROMP inducing condition is other than heat, and the first temperature is a temperature at which the model formulation is maintained while the ROMP occurs after it is initiated by exposure to the ROMP inducing condition.

In some of any of the embodiments described herein, following the first time period, the dispensed modeling material formulation(s) or the dispensed layer comprising the model formulation(s) is exposed to a condition for inducing initiation of free-radical polymerization of the curable material by the curing agent, that is, the formulation or the layer comprising same is exposed to a curing condition which is a FRP inducing condition, as described herein.

In any of the embodiments described herein, the FRP inducing condition comprises heat, as described herein. Exposing to the FRP inducing condition comprises exposing the formulation to a second temperature, that is, heating the dispensed layer comprising the formulation at an elevated temperature, which is referred to herein as a second temperature. The FRP inducing condition comprises an elevated temperature, which is the second temperature herein, to which the dispensed later comprising the formulation is exposed.

In the context of an FRP curable system used in the present embodiments, a FRP curing condition which comprises heat at an elevated temperature means that a free radical, which is generated from the curing agent, is generated upon exposure to the elevated temperature (the second temperature).

In other words, the curing agent is activatable by exposure to an elevated temperature (the second temperature), and is therefore a thermally-activatable curing agent, or a thermal curing agent.

According to some of any of the embodiments described herein, the thermally activatable curing agent is such that is activated at an elevated temperature (the second temperature) which is higher than a temperature at which ROMP of the ROMP monomer is effected (the first temperature). That is, the second temperature is higher than the first temperature.

According to some of any of the embodiments described herein, the exposure to the FRP curing condition is effected subsequent to the exposure to the ROMP inducing condition, and in some embodiments, the exposure to the FRP curing condition is effected for a second time period.

The method, according to some of the embodiments described herein, therefore comprises, upon dispensing the modeling material formulation(s), exposing the formulation to a first curing condition, which is a ROMP inducing condition, for a first time period, and subsequently (following the first time period or once the first time period ends) exposing the formulation to a second curing condition, which is a FRP inducing condition, which is effected at a temperature (the second temperature) which is higher than a temperature required for initiating ROMP and/or a temperature at which the ROMP of the ROMP monomer occurs (the first temperature).

The method according to these embodiments, utilizes a thermally-activatable FRP curing agent that is rendered active only upon exposure to a temperature higher than a temperature required for the ROMP reaction to occur. The method according to these embodiments is therefore such that prior to exposure to the second temperature, namely, during the first time period, the free radical polymerization does not occur, or occurs at a very low conversion rate, and thus does not interfere with the ROMP reaction. According to these embodiments, only after the ROMP has been advanced, and a conversion of ROMP monomers into a ROMP polymeric material was effected, during the first time period, a curing condition for effecting free radical polymerization is applied.

The method according to these embodiments utilizes a thermally-activatable curing agent that is selected in accordance with the first temperature, that is, is selected as such that it is activatable at a temperature that is higher than the temperature required for the ROMP of the ROMP monomer to occur.

The method, according to these embodiments, comprises a ROMP system and a FRP system, which are selected such that the ROMP and the FRP are initiated at different temperatures, and comprises controlling the temperatures applied to the dispensed modeling material formulation (the temperatures to which the at least one modeling material formulation is exposed). The method is effected at a first temperature for first time period, wherein during the first time period, ROMP of the ROMP monomer is effected upon exposure to the ROMP inducing condition, and after the first time period, at the first temperature, the method comprises applying the second temperature, which is the curing inducing condition of the FRP.

The method, according to these embodiments, allows polymerizing the ROMP monomer substantially independently from the polymerization of the FRP curable material. This is achieved by substantially preventing the FRP curing agent from generating a substantial amount of radicals until a substantial polymerization degree (e.g., at least 80%) of the ROMP reaction at the first temperature has been achieved.

Upon exposure to the second temperature, for the second time period, a cured modeling material is obtained in the dispensed layer, and a subsequent layer can be dispensed.

According to some of any of the embodiments pertaining to a method in which the second temperature is higher than a first temperature, the second temperature is higher than the first temperature by at least 20° C., or by at least 30° C., or by at least 40° C., or by at least 50° C.

According to some of any of the embodiments pertaining to a method in which the second temperature is higher than a first temperature, the first temperature is lower than 100° C., or lower than 90° C., or lower than 80° C., or lower than 70° C.

According to some of any of the embodiments pertaining to a method in which the second temperature is higher than a first temperature, the first temperature ranges from about 25° C. to about 100° C. or from about 25° C. to about 70° C., or from about 25° C. to about 65° C., as described herein, although higher temperature are contemplated.

According to some of any of the embodiments pertaining to a method in which the second temperature is higher than a first temperature, the first temperature ranges from about 50° C. to about 200° C. or from about 50° C. to about 150° C., or from about 60° C. to about 150° C., or from about 70° C. to about 130° C., According to some of any of the embodiments pertaining to a method in which the second temperature is higher than a first temperature, the second temperature is higher than 80° C., or higher than 90° C., or higher than 100° C., or higher than 110° C., or higher than 120° C., or higher than 150° C.

According to some of any of the embodiments pertaining to a method in which the second temperature is higher than a first temperature, the second temperature is lower than 200° C., or lower than 190° C., or lower than 180° C., or lower.

According to some of any of the embodiments pertaining to a method in which the second temperature is higher than a first temperature, the second temperature is higher than a glass transition temperature (Tg) of a polymeric material formed upon the exposing to a condition for inducing initiation of ROMP of the monomer during the first time period.

Herein, "a polymeric material formed upon exposing to a condition for inducing initiation of ROMP of the monomer during the first time period" describes a polymeric material that is substantially comprised of a polymerized ROMP monomer, and in which at least 50%, or at least 60%, or at least 70%, or at least 80%, of the ROMP monomers undergo polymerization. Such a polymeric material may further comprise residual amount (e.g., of less than 20%, or less than 15%, or less than 10%, or less) of a polymerized FRP curable material.

It is to be noted that the Tg of a polymeric material obtained during the first time period is not necessarily the same as the Tg of the (final) cured modeling material obtained by the method as described herein. In some embodiments, the Tg of the (final) cured modeling material is higher than the Tg of the polymeric material obtained during the first time period.

Herein, "Tg" of a material refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg(low) and the highest temperature of the Tg range is referred to herein as Tg(high).

In any of the embodiments described herein, the term "temperature higher than Tg" means a temperature that is higher than the Tg temperature, or, more preferably a temperature that is higher than Tg(high).

A temperature higher than the Tg of the polymeric material formed during the first time period may advance the free radical polymerization by allowing mobility of the FRP curable monomers and thus a more efficient free-radical polymerization thereof.

According to some of any of the embodiments pertaining to a method in which the second temperature is higher than a first temperature, the first time period is such that at least 80% of the unsaturated cyclic monomer undergo polymerization by the ROMP during that period.

Herein, the percentage of monomers which undergo polymerization describe a degree of polymerization conversion, that is a conversion of the monomers to the polymeric material made therefrom, and represents the portion of monomers that underwent polymerization out of the plurality of monomers in the model formulation.

In some embodiments, the first time period is such that at least 85%, or at least 90%, or at least 95% or substantially all ROMP monomer polymerize, namely, undergo ROMP.

Herein, the time period at which 80% of the ROMP monomers undergo polymerization at a certain first temperature (curing temperature, CT) for a certain ROMP system, is referred to as $t_{c80}$.

In some of any of the embodiments described herein, the first time period ranges from about 0.1 to 180 minutes, more preferably from 1 to 120 minutes, more preferably from about 1 to about 80 minutes, although other ranges, sub-ranges and values are also contemplated.

In some of any of the embodiments described herein, the curing agent in the FRP system is selected such that its half-life at the first temperature (CT), which is denoted herein $t_{1/2\ CT}$, and a time period in which 80% of the unsaturated cyclic monomer (ROMP monomer) undergo polymerization by the ROMP at the first temperature (CT), wherein is denoted herein $t_{c80}$, satisfy 2.5 times $t_{c80}$<$t_{1/2\ CT}$<1000 times $t_{c80}$, or 10 times $t_{c80}$<$t_{1/2\ CT}$<100 times $t_{c80}$.

By "half-life at the first temperature" or "$t_{1/2\ CT}$" it is meant that the time required for 50% of the curing agent to generate free radicals (e.g., the time required for thermal decomposition of 50% of a radical generator, to thereby generate free radicals) at the indicated temperature (the CT).

Since the rate of free-radical polymerization is determined be the rate at which free radicals are generated by the curing agent, the selected half-life of the curing agent at the first temperature, provides for a slow rate of the FRP during the first time period in which ROMP is effected at the first temperature.

In some of any of the embodiments described herein, the curing agent is alternatively, or in addition, selected such that it has a one-minute half-life temperature of less than 183° C., or less than 170° C., or less than 160° C.

By "one-minute half-life temperature" it is meant a temperature at which the half-life of the curing agent, as defined herein, is one minute.

In some of any of the embodiments described herein, the dispensed at least one modeling material formulation or the dispensed layer comprising the model formulation(s) is exposed to a condition for inducing initiation of ROMP of the monomer by the catalyst (exposed to a ROMP inducing condition), as described herein, and is maintained at a first temperature, as described herein, and is further exposed to a condition for inducing initiation of free-radical polymerization of the curable material by the curing agent (a FRP inducing condition), which condition comprises heating at the second temperature, as described herein, to thereby obtain a cured modeling material in the layer.

In these embodiments, the curing agent is such that its half life at the first temperature, $t_{1/2\ CT}$, and a time period in which 80% of the unsaturated cyclic monomer undergo polymerization by the ROMP at the first temperature (CT), $t_{c80}$, satisfy 2.5 times $t_{c80}$<$t_{1/2\ CT}$<1000 times $t_{c80}$, or 10 times $t_{c80}$<$t_{1/2\ CT}$<100 times $t_{c80}$, as described herein.

In some of these embodiments, the curing agent has a one-minute half-life temperature of less than 183° C., or less than 170° C., or less than 160° C., as described herein.

In some of any of these embodiments, the first temperature and the second temperature are substantially the same, and the exposure to the FRP curing condition is performed simultaneously with the ROMP, within the first time period.

Since the FRP curing agent is such that have a half-life at the first temperature as indicated, it is assumed that at least 80% of the ROMP of the ROMP monomer will be completed before a substantial free radical polymerization of the FRP curable material is effected. Thus, the free radical polymerization does not interfere with the ROMP.

In other embodiments, the second temperature is higher than the first temperature.

In these embodiments, exposing to the condition for inducing initiation of the free radical polymerization is performed subsequently to the first time period.

In some of these embodiments, the first time period is such that at least 80% of the unsaturated cyclic monomer undergo polymerization by the ROMP during the first time period, as described herein.

The first and second temperatures, and the first time period are as described hereinabove.

In some of any of the embodiments described herein, exposing the at least one modeling material to a second temperature is for a second time period.

The second time period can be from about 0.1 to about 180 minutes, more preferably from about 1 to about 120 minutes, more preferably from about 1 to about 80 minutes, although other ranges, subranges and values are also contemplated.

Curable Systems:

A "curable system" as described herein refers to a system that comprises one or more curable materials, as defined herein.

In some of any of the embodiments described herein, a "curable system" comprises one or more curable materials and optionally one or more initiators and/or catalysts and/or co-catalysts and/or activators and/or other reactive components for initiating curing of the curable materials, and, further optionally, one or more conditions (also referred to herein as curing conditions) for inducing the curing, as described herein.

In some of any of the embodiments described herein, a curable material is a monomer or a mixture of monomers and/or an oligomer or a mixture of oligomers and/or a polymer or a mixture of polymers which can form a polymeric material upon a polymerization reaction, when exposed to a condition at which curing, as defined herein, occurs (a condition that affects or induces curing).

In some of any of the embodiments described herein, a curable material can be a monofunctional curable material, which comprises one polymerizable group that participates in the polymerization or curing, or a bifunctional or multifunctional curable material, as defined herein.

A "bifunctional" or "multifunctional" curable material is meant to describe curable materials that result in a polymeric material that features two or more functional groups, and hence can act also as a cross-linker, for cross-linking polymeric chains formed of the same and/or different curable materials in the building material.

In some embodiments, a curable system further comprises a curing system, which comprises one or more initiators for initiating the curing and/or polymerization of the curable material(s).

The one or more initiators can be active per se towards the initiation of the curing and/or polymerization in the curable system, in which case the curing system consists of the one or more initiators.

Alternatively, the one or more initiators can be inactive towards this initiation.

Inactive initiators can be latent initiators, which are activatable upon exposure to a condition, and this condition induces the curing and/or polymerization. A curing system in this case comprises the one or more initiators and the condition activating the initiator(s).

Alternatively, inactive initiators can be inactive due to physical separation from the curable material(s). The physical separation can be effected by means of capsules, preferably degradable capsules as described herein. Such initiators are activatable by a condition that removes the physical separation, e.g., induces release of the initiator from the capsule, as described herein. A curing system in this case comprises the one or more initiator(s) and the condition for removal the physical separation.

Further alternatively, inactive initiators can be chemically activated by an activator, and become active upon a condition that results in contacting the activator, for example, as described hereinunder for embodiments relating to a pre-catalyst and an activator in a ROMP system.

In some of any of the embodiments described herein, depending on its components and chemistry, a curable system further requires a condition for effecting curing and/or polymerization of the curable materials.

In some of any of the embodiments described herein, the one or more modeling material formulations comprise a curable system that is an active system, namely, the components included in the one or more modeling material formulations can undergo polymerization or curing without a (e.g., chemical or physical) stimulus.

In some of any of the embodiments described herein, the one or more modeling material formulation comprise a curable system that is inactive, namely, the components included in the one or more modeling material formulations can undergo polymerization or curing only when exposed to a condition that induces curing.

A curable system as described herein may comprise, in addition to a curable material, a curing system, as described herein.

According to the present embodiments, the modeling material formulation(s) comprise a curable system as described herein which is a ROMP system, as described herein in any of the respective embodiments, which comprises one or more ROMP monomers, and a curing system which comprises a catalyst (a ROMP catalyst) or a catalyst system, as described herein in any of the respective embodiments.

According to the present embodiments, the modeling material formulation(s) further comprise a curable system as described herein which is a free radical polymerization (FRP) system, as described herein in any of the respective embodiments, which comprises one or more FRP curable materials, and a FRP curing agent or system, as described herein in any of the respective embodiments.

In some embodiments, the modeling material formulation(s) further comprise components of additional, one or more curable systems, either in the same, and preferably, in different formulations.

Herein throughout, curable systems which comprise curable materials that are curable and/or polymerizable via a polymerization or curing reaction other than ROMP, are also referred to herein collectively also as non-ROMP curable systems. The components of such systems are also referred to herein as non-ROMP components, for example, non-ROMP curable materials, non-ROMP initiators, non-ROMP activators, and non-ROMP inducing condition (or condition for inducing non-ROMP polymerization and/or curing or for initiating a non-ROMP reaction).

In some of any of the embodiments described herein, at least one of the modeling material formulations as described herein comprises a monomer that is polymerizable by ring opening metathesis polymerization (ROMP). Such a monomer is also referred to herein interchangeably as a ROMP monomer, a ROMP-polymerizable monomer, a ROMP curable monomer, a ROMP component, a ROMP active component, a monomer polymerizable by ROMP, and similar diversions. In some embodiments, one or more of the modeling material formulations in the (uncured) building material comprises a catalyst for initiating a ROMP reaction of the monomer, as described in further detail hereinunder.

In some of any of the embodiments described herein, the ROMP monomer is an unsaturated cyclic monomer, preferably a strained unsaturated cyclic olefin, as described in further detail hereinunder.

In some of any of the embodiments described herein, exposing the modeling material formulation to a condition that induces curing comprises exposing the dispensed layer comprising the modeling material formulation(s) to a condition for inducing initiation of ROMP of the monomer by the catalyst, as described in further detail hereinunder. Any of the conditions for effecting curing as described hereinabove are contemplated, depending on the selected materials and/or formulation of the ROMP system.

Herein throughout, a condition for inducing initiation of ROMP of the monomer by the catalyst is also referred to herein interchangeably as "a ROMP inducing condition" or simply as "inducing condition", and describes a condition to which a modeling material formulation or a dispensed layer comprising a modeling material formulation is exposed so as to effect ROMP of the ROMP monomer (e.g., to effect initiation of ROMP of the ROMP monomer by the catalyst).

In some of any of the embodiments described herein, at least one of the modeling material formulations as described herein comprises a curable material that is polymerizable by free-radical polymerization (FRP), as described herein. Such a curable material is also referred to herein interchangeably as a FRP curable material, a FRP monomer, a FRP polymerizable material, a curable material polymerizable by FRP, and similar diversions. In some embodiments, one or more of the modeling material formulations in the (uncured) building material comprises a curing agent for initiating a free radical polymerization of the FRP curable material (e.g., for generating free radicals), as described in further detail hereinunder.

In some of any of the embodiments described herein, exposing a modeling material formulation or the dispensed layer(s) comprising the modeling material formulation to a condition that induces curing comprises exposing the modeling material formulation or the dispensed layer comprising the modeling material formulation(s) to a condition for inducing initiation of free radical polymerization of the FRP curable material by the curing agent, as described in further detail hereinunder. Any of the conditions for effecting curing as described hereinabove are contemplated, depending on the selected materials and/or formulation of the FRP curable system.

Herein throughout, a condition for inducing initiation of free radical polymerization of the FRP curable material is also referred to herein interchangeably as "a FRP inducing condition", and describes a condition to which a modeling material formulation or a dispensed layer comprising the modeling material formulation is exposed so as to effect free radical polymerization of the FRP curable material (e.g., to effect initiation of free radical polymerization of the FRP curable material by the curing agent).

The ROMP inducing condition and curing FRP inducing condition can be the same or different.

In some of any of the embodiments described herein, components which form a curable system as described herein are referred to as reactive components or materials, and curable components are referred to as reactive polymerizable components, materials, monomers, or groups, interchangeably.

Additional components included in the modeling material formulations as described herein, which do not undergo a polymerization and/or curing, are also referred to herein as non-reactive materials or components.

Herein throughout, whenever a ROMP monomer is indicated, it is to be understood as encompassing one or more (e.g., a mixture of two, three or more) ROMP monomer(s); whenever a ROMP catalyst or pre-catalyst is indicated, it is to be understood as encompassing one or more (e.g., a mixture of two, three or more) catalyst(s) and/or pre-catalyst(s); whenever a ROMP activator is indicated, it is to be understood as encompassing one or more (e.g., a mixture of two, three or more) ROMP activator(s); whenever a ROMP inhibitor is indicated, it is to be understood as encompassing one or more (e.g., a mixture of two, three or more) ROMP inhibitor(s); whenever a FRP curable material is indicated, it is to be understood as encompassing one or more (e.g., a mixture of two, three or more) CRP curable material(s); whenever a FRP curing agent is indicated, it is to be understood as encompassing one or more (e.g., a mixture of two, three or more) curing agent(s); whenever a FRP inhibitor is indicated, it is to be understood as encompassing one or more (e.g., a mixture of two, three or more) FRP inhibitor(s); and whenever a toughening agent (e.g., an impact modifying agent) is indicated, it is to be understood as encompassing one or more (e.g., a mixture of two, three or more) agents. Similarly, whenever reference to any other agent or moiety is made herein throughout, it is to be understood as encompassing one or more (e.g., a mixture of two, three or more) agent(s) or moiety/moieties.

A ROMP System:

Herein, a "ROMP system" describes a set of materials and optionally conditions for effecting polymerization, via a ROMP reaction, of an unsaturated cyclic ROMP monomer (or a mixture of ROMP monomers). The materials included in a ROMP system are also referred to herein as "ROMP components" or "ROMP active components".

A ROMP system requires at least a ROMP monomer and a catalyst for initiating the ROMP reaction. The catalyst is also referred to herein throughout as a "ROMP catalyst" or a "ROMP catalyst system".

In some embodiments, a ROMP system consists of a catalyst and a ROMP monomer. In such cases, the catalyst in referred to herein as an "active catalyst", which is active towards initiation of ROMP of the monomer immediately once it contacts the monomer, without a need to apply an external stimulus such as, for example, heat, radiation, or chemical additives.

In some of these embodiments, a condition for inducing initiation of ROMP of the monomer by the catalyst requires contacting the catalyst with the ROMP monomer.

By "active towards initiation of ROMP" of the monomer it is meant that in the presence of the catalyst, at least 50% or at least 60% or at least 70% or at least 80% of the monomer polymerizes via ROMP mechanism to provide a respective polymer.

In some embodiments, a ROMP system consists of a catalyst and a ROMP monomer and a condition for activating the catalyst towards initiation of ROMP of the monomer. In such cases, the catalyst is referred to herein as a "latent catalyst", which is activatable upon exposure to the condition. According to some of these embodiments, the catalyst is inactive towards initiation of ROMP of the monomer when the ROMP system is not exposed to the condition that activates the catalyst, namely, prior to exposure to a ROMP inducing condition.

By "inactive towards initiation of ROMP" of the monomer it is meant that in the presence of the catalyst, no more than 40% or no more than 30% or no more than 20% or no more than 10% or no more than 5% of the monomer polymerizes via ROMP mechanism to provide a respective polymer.

Latent catalysts as described herein can be thermally-activatable catalysts, which are converted into active catalysts upon exposure to heat (that is, a condition for inducing initiation of ROMP comprises heat or heating a ROMP system, optionally in addition to contacting the catalyst and the ROMP monomer).

Latent catalysts as described herein can be photo-activatable catalysts, which are converted into active catalysts upon exposure to radiation (that is, a condition for inducing initiation of ROMP comprises exposure to radiation or application of radiation to the ROMP system, optionally in addition to contacting the catalyst and a ROMP monomer). The radiation can be, for example, an electromagnetic radiation (e.g., UV or visible or IR light), or ultrasound radiation, or heat-inducing radiation, and can be applied by a suitable source of the radiation, as described herein.

Latent catalysts activatable by exposure to other conditions are also contemplated.

In some embodiments, a ROMP system consists of a ROMP monomer, a ROMP catalyst and an activator, for chemically activating the ROMP catalyst. In such cases, the ROMP catalyst is inactive towards initiation of ROMP of the monomer, as defined herein, in the absence of the activator (when it is not contacted with the activator). A ROMP catalyst that is activatable in the presence of an activator is referred to herein also as a "pre-catalyst", and the activator is referred to herein as a "co-catalyst". A combination of pre-catalyst and an activator is also referred to herein and in the art as a catalyst system, and herein also as a ROMP catalyst system.

By "chemically activating" it is meant that the activation of a catalyst is made by an addition of a chemical entity (a chemical additive), e.g., a chemical compound or a chemical species such as an ion.

According to some of these embodiments, the pre-catalyst is inactive towards initiation of ROMP of the monomer, as defined herein, in the absence of a respective activator.

According to these embodiments, a condition for initiating ROMP of a monomer requires a contact between the pre-catalyst and the activator and the catalyst and the ROMP monomer.

In some of these embodiments, the activator is an activatable activator, which is rendered active towards chemically activating the catalyst when exposed to a certain condition. In such cases, the activator is incapable of chemically activating the catalyst unless it is activated (by exposure to the condition). Such activators are also referred to herein as "latent activators".

A latent activator is incapable of activating a catalyst for initiating ROMP of the monomer, and can be converted to an active activator when exposed to an activating condition (which can be the ROMP inducing condition as described herein).

According to some of these embodiments, the activator is inactive towards chemically activating the catalyst, and the catalyst is therefore inactive towards initiation of ROMP of the monomer when the ROMP system is not exposed to the condition that activates the activator.

By "inactive towards chemically activating the catalyst" it is meant that no chemical reaction between the activator and the catalyst occurs, such that in the ROMP system containing the ROMP monomer, a ROMP catalyst which is chemically activatable by the activator, and the latent activator, no more than 40% or no more than 30% or no more than 20% or no more than 10% or no more than 5% of the monomer polymerizes via ROMP mechanism to provide a respective polymer.

Latent activators as described herein can be thermally-activatable activators, which are converted into active activators upon exposure to heat (that is, a condition for inducing initiation of ROMP comprises heat or heating a ROMP system, optionally in addition to contacting an activator and a catalyst and a ROMP monomer).

Latent activators as described herein can be photo-activatable catalysts, which are converted into active activators upon exposure to radiation (that is, a condition for inducing initiation of ROMP comprises exposure to radiation or application of radiation to the ROMP system, optionally in addition to contacting an activator and a catalyst and a catalyst and a ROMP monomer). The radiation can be, for example, an electromagnetic radiation (e.g., UV or visible or IR light), or ultrasound radiation, and can be applied by a suitable source of the radiation.

In some of any of the embodiments described herein, a ROMP system can further comprise a ROMP inhibitor.

A "ROMP inhibitor" as used herein refers to a material that slows down a ROMP reaction initiated by a catalyst. ROMP inhibitors can be used with active catalysts, latent catalysts and pre-catalysts, as described herein. In some embodiments, a ROMP inhibitor inhibits a ROMP reaction initiated in the presence of an active catalyst, or once a latent catalyst or pre-catalyst is converted to an active catalyst, by interfering with the chemical reactions that activate a latent catalyst or a pre-catalyst.

It is to be noted that a ROMP system as described herein refers to the active components and/or conditions that together lead to ROMP polymerization of a ROMP monomer. A formulation that comprises a ROMP system can further comprise other components which can participate in polymerization or curing reactions, and/or form a part of the final polymeric material, as described in further detail hereinbelow.

ROMP Monomers (Component (A)):

A ROMP monomer as described herein describes any material that undergoes ROMP in the presence of a ROMP catalyst or a ROMP catalyst system.

Typically ROMP monomers are unsaturated cyclic compounds (cyclic olefins), and preferably strained unsaturated cyclic compounds (strained cyclic olefins).

Any compound that can undergo ROMP is encompassed by the present embodiments.

The phrase "ROMP monomer" as used herein encompasses one ROMP monomer or a combination of ROMP monomers, and also encompasses a mixture of a ROMP monomer with another cyclic olefin that can react with a ROMP monomer during ROMP of the ROMP monomer, if included in the same reaction mixture. Such cyclic olefins can be recognized by those skilled in the art.

Exemplary ROMP monomers include, but are not limited to dicyclopentadiene (DCPD), cyclopentadiene trimer, tetramer, pentamer, etc., norbornene, cyclooctene, cyclooctadiene, cyclobutene, cyclopropene and substituted derivatives thereof, for example, substituted norbornenes such as carboxylated norbornenes, butyl norbornene, hexyl norbornene, octyl norbornene.

Any cyclic olefin (unsaturated cyclic compounds) suitable for the metathesis reactions disclosed herein may be used.

Herein, the phrases "cyclic olefin" and "unsaturated cyclic compound" are used interchangeably encompasses compounds comprising one, two, three or more non-aromatic rings (fused and/or unfused rings) which comprise at least one pair of adjacent carbon atoms in the ring which are bound to one another by an unsaturated bond. The ring may optionally be substituted or unsubstituted, and the cyclic olefin may optionally comprise one unsaturated bond ("monounsaturated"), two unsaturated bonds ("di-unsaturated"), three unsaturated bond ("tri-unsaturated"), or more than three unsaturated bonds. When substituted, any number of substituents may be present (optionally from 1 to 5, and optionally 2, 3, 4 or 5 substituents), and the substituent(s) may optionally be any substituent describes herein as being optionally attached to an alkyl or alkenyl.

Examples of cyclic olefins include, without limitation, cyclooctene, cyclododecene, and (c,t,t)-1,5,9-cyclododecatriene.

Examples of cyclic olefins with more than one ring include, without limitation, norbornene, dicyclopentadiene, tricyclopentadiene, and 5-ethylidene-2-norbornene.

The cyclic olefin may be a strained or unstrained cyclic olefin, provided the cyclic olefin is able to participate in a ROMP reaction either individually or as part of a ROMP cyclic olefin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a co-monomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In some embodiments of any one of the embodiments described herein, the substituted or unsubstituted cyclic olefin comprises from 4 to 30, or from 5 to 24, or from 5 to 20, or from 5 to 15, carbon atoms. In some such embodiments, the cyclic olefin is a hydrocarbon devoid of heteroatoms. In alternative embodiments, the cyclic olefin comprises one or more (e.g., from 2 to 12) heteroatoms such as O, N, S, or P, for example, crown ether cyclic olefins which include numerous O heteroatoms throughout the cycle, are within the scope of the invention.

In some embodiments of any one of the embodiments described herein relating to a cyclic olefin comprising from 5 to 24 carbon atoms, the cyclic olefin is monounsaturated, di-unsaturated, or tri-unsaturated.

In exemplary embodiments, the cyclic olefin is a norbornene-based monomer and/or a monocyclic monomer. A norbornene-based monomer can be, for example, 2-norbornene, norbornadiene and other bicyclic compounds; dicyclopentadiene (DCPD), dihydrodicyclopentadiene and other tricyclic compounds; tetracyclododecene, ethylidenetetracyclododecene, phenyltetracyclododecene and other tetracyclic compounds; tricyclopentadiene and other pentacyclic compounds; tetracyclopentadiene and other heptacyclic compounds; alkyl substituted compounds, such as methyl, ethyl, propyl and butyl substituted compounds, alkylidene substituted compounds, such as ethylidene substituted compounds, andaryl substituted compounds, such as phenyl and tolyl substituted compounds; and derivatives thereof having for instance an epoxy group, a methacryl group, a hydroxyl group, an amino group, a carboxyl group, a cyano group, a halogen atom, and others.

Exemplary monocyclic cyclic olefins include, but are not limited to, cyclobutene, cyclopentene, cyclooctene, cyclododecene, 1,5-cyclooctadiene and other monocyclic cyclic olefins, and substitution compounds and derivatives having polar groups like those mentioned as examples for the norbornene based monomers. Such cyclic olefin monomers may be used alone or in combination with another or more types.

In some embodiments of any of the embodiments described herein, the cyclic olefin has the general formula (A):

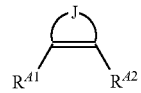

Formula (A)

wherein:

$R^{A1}$ and $R^{A2}$ are each independently hydrogen, alkyl, cycloalkyl, alkenyl, alkynyl, aryl, heteroaryl, heteroalicyclic, halo, hydroxy, alkoxy, aryloxy, thiohydroxy, thioalkoxy, thioaryloxy, sulfinyl, sulfonyl, sulfonate, nitrile, nitro, azide, phosphonyl, phosphinyl, oxo, carbonyl, thiocarbonyl, urea, thiourea, carbamyl, N-carbamyl, O-thiocarbamyl, N-thiocarbamyl, C-amido, N-amido, C-carboxy, O-carboxy, sulfonamido, and amino;

J is a saturated or unsaturated hydrocarbon, which may be substituted or unsubstituted, and may optionally comprise one or more heteroatoms between the carbon atoms thereof. Additionally, two or more substituents attached to ring atoms within J may optionally be linked to form a bicyclic or polycyclic olefin.

In some embodiments of any of the respective embodiments described herein, the compound of formula (A) contains from 5 to 14 ring atoms, optionally from 5 to 8 ring atoms, for a monocyclic olefin; and, for bicyclic and polycyclic olefins, from 4 to 8 ring atoms in each ring, optionally from 5 to 7 ring atoms in each ring.

In some embodiments of any of the embodiments described herein, the cyclic olefin has the general formula (B):

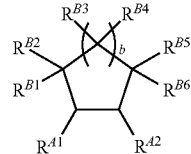

Formula (B)

wherein:

b is an integer in a range of 1 to 10, optionally 1 to 5;

$R^{A1}$ and $R^{A2}$ are as defined above for formula (A); and $R^{B1}$, $R^{B2}$, $R^{B3}$, $R^{B4}$, $R^{B5}$, and $R^{B6}$ are each independently hydrogen, alkyl, cycloalkyl, alkenyl, alkynyl, aryl, heteroaryl, heteroalicyclic, halo, hydroxy, alkoxy, aryloxy, thiohydroxy, thioalkoxy, thioaryloxy, sulfinyl, sulfonyl, sulfonate, nitrile, nitro, azide, phosphonyl, phosphinyl, oxo, carbonyl, thiocarbonyl, urea, thiourea, carbamyl, N-carbamyl, O-thiocarbamyl, N-thiocarbamyl, C-amido, N-amido, C-carboxy, O-carboxy, sulfonamido, and amino, or alternatively, any of the $R^{B1}$, $R^{B2}$, $R^{B3}$, $R^{B4}$, $R^{B5}$, and $R^{B6}$ moieties can be linked to any of the other $R^{B1}$, $R^{B2}$, $R^{B3}$, $R^{B4}$, $R^{B5}$, and $R^{B6}$ moieties to provide a substituted or unsubstituted 4- to 7-membered ring.

In some embodiments of any of the embodiments described herein, the cyclic olefin is monocyclic.

In some embodiments of any of the embodiments described herein, the cyclic olefin is monounsaturated, optionally being both monocyclic and monounsaturated.

Examples of monounsaturated, monocyclic olefins encompassed by formula (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as methylcyclopentene (e.g., 1-methylcyclopentene, 4-methyl-cyclopentene), ethylcyclopentene (e.g., 1-ethylcyclopentene), isopropylcyclohexene (e.g., 1-isopropylcyclohexene), chloropentene (e.g., 1-chloropentene), fluorocyclopentene (e.g., 1-fluorocyclopentene), methoxycyclopentene (e.g., 4-methoxy-cyclopentene), ethoxycyclopentene (e.g., 4-ethoxy-cyclopentene), cyclopentene-thiol (e.g., cyclopent-3-ene-thiol), methylsulfanyl-cyclopentene (e.g., 4-methylsulfanyl-cyclopentene), methylcyclohexene (e.g., 3-methylcyclohexene), methylcyclooctene (e.g., 1-methyl-cyclooctene), and dimethylcyclooctene (e.g., 1,5-dimethyl-cyclooctene).

In some embodiments of any of the embodiments described herein, the cyclic olefin is diunsaturated, optionally being both monocyclic and diunsaturated.

In some embodiments, the cyclic olefin has the general formula (C):

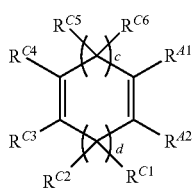

Formula (C)

wherein:

c and d are each independently integers in the range of from 1 to 8, optionally from 2 to 4, and optionally 2 (such that the cyclic olefin is a cyclooctadiene);

$R^{A1}$ and $R^{A2}$ are as defined above for formula (A); and $R^{C1}$, $R^{C2}$, $R^{C3}$, $R^{C4}$, $R^{C5}$, and $R^{C6}$ are each independently defined as for $R^{B1}$-$R^{B6}$.

In some embodiments, $R^{C3}$ and $R^{C4}$ are substituents (i.e., not hydrogen), in which case at least one of the olefinic moieties is tetrasubstituted.

Examples of diunsaturated, monocyclic olefins include, without limitation, 1,3-cyclopentadiene, 1,3-cyclohexadiene, 1,4-cyclohexadiene, heptadiene (e.g., 1,3-cycloheptadiene), octadiene (e.g., 1,5-cyclooctadiene, 1,3-cyclooctadiene), and substituted versions thereof (e.g., 5-ethyl-1,3-cyclohexadiene).

In some embodiments of any of the embodiments described herein, the cyclic olefin comprises more than two (optionally three) unsaturated bonds. In some embodiments, such compounds are analogous to the diene structure of formula (C), comprising at least one methylene linkage (analogous to the number of methylene linkages indicated by the variables c and d in formula (C)) between any two olefinic segments.

In some embodiments of any of the embodiments described herein, the cyclic olefin is polycyclic.

Herein, the term "polycyclic" refers to a structure comprising two or more fused rings.

In some embodiments of any of the embodiments described herein, the cyclic olefin is a polycyclic olefin having the general formula (D):

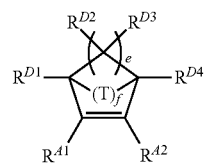

Formula (D)

wherein:

$R^{A1}$ and $R^{A2}$ are each independently as defined above for formula (A);

$R^{D1}$, $R^{D2}$, $R^{D3}$ and $R^{D4}$ are each independently as defined for $R^{B1}$-$R^{B6}$;

e is an integer in the range of from 1 to 8, optionally from 2 to 4;

f is 1 or 2; and

T is a substituted or unsubstituted saturated or unsaturated hydrocarbon of 1-4 carbon atoms in length (optionally 1 or 2 carbon atoms in length, for example, substituted or unsubstituted methyl or ethyl), O, S, N($R^{G1}$), P($R^{G1}$); P(=O)($R^{G1}$); Si($R^{G1}$)$_2$, B($R^{G1}$); or As($R^{G1}$), wherein $R^{G1}$ is alkyl, alkenyl, alkynyl, cycloalkyl, heteroalicyclic, aryl, heteroaryl, alkoxy or aryloxy.

Cyclic olefins encompassed by formula (D) are examples of compounds in the norbornene family.

As used herein, the term "norbornene" refers to any compound that includes at least one substituted or unsubstituted bicyclo[2.2.1]hept-2-ene moiety or dehydrogenated derivative thereof, including without limitation, bicyclo[2.2.1]hept-2-ene (referred to in the art as "norbornene") and substituted versions thereof, norbornadiene, (bicyclo[2.2.1]hepta-2,5-diene) and substituted versions thereof, and polycyclic norbornenes, and substituted versions thereof.

In some embodiments, the cyclic olefin is a polycyclic norbornene having the general formula (E):

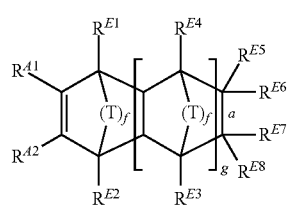

Formula (E)

wherein:

$R^{A1}$ and $R^{A2}$ are each independently as defined above for formula (A);

T is as defined above for formula (D);

$R^{E1}$, $R^{E2}$, $R^{E3}$, $R^{E4}$, $R^{E5}$, $R^{E6}$, $R^{E7}$, and $R^{E8}$ are each independently as defined for $R^{B1}$-$R^{B6}$; and "a" represents a saturated bond or unsaturated double bond, wherein when "a" is an unsaturated double bond, one of $R^{E5}$, $R^{E6}$ and one of $R^{E7}$, $R^{E8}$ is absent;

f is 1 or 2; and g is an integer from 0 to 5.

In some embodiments, the cyclic olefin has the general formula (F):

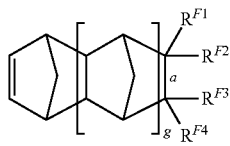

Formula (F)

wherein:

$R^{F1}$, $R^{F2}$, $R^{F3}$ and $R^{F4}$ defined above for $R^{E4}$, $R^{E5}$, $R^{E6}$, $R^{E7}$, and $R^{E8}$ respectively; and a and g are as defined in formula (E) hereinabove.

Examples of bicyclic and polycyclic olefins include, without limitation, dicyclopentadiene (DCPD); trimer and higher order oligomers of cyclopentadiene (e.g., cyclopentadiene tetramer, cyclopentadiene pentamer); ethylidenenorbornene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; 5-cyanonorbornene; 5,5,6-trimethyl-2-norbornene; cyclo-hexenylnorbornene; endo,exo-5,6-dimethoxynorbornene; endo,endo-5,6-dimethoxynorbornene; endo,exo-5,6-dimethoxycarbonylnorbornene; endo,endo-5,6-dimethoxycarbonylnorbornene; 2,3-dimethoxynorbornene; norbornadiene; tricycloundecene; tetracyclododecene; 8-methyltetracyclododecene; 8-ethyltetracyclododecene; 8-methoxycarbonyltetracyclododecene; 8-methyl-8-tetracyclododecene; 8-cyanotetracyclododecene; pentacyclopentadecene; pentacyclohexadecene; and the like, and their structural isomers, stereoisomers, and mixtures thereof.

Additional examples of bicyclic and polycyclic olefins include, without limitation, $C_2$-$C_{12}$-alkyl-substituted and $C_2$-$C_{12}$-alkenyl-substituted norbornenes, for example, 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like.

In some embodiments of any of the embodiments described herein, the cyclic olefin is dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo,exo-5,6-dimethoxynorbornene; endo,endo-5,6-dimethoxynorbornene; endo,exo-5-6-dimethoxycarbonylnorbornene; endo,endo-5,6-dimethoxycarbonylnorbornene; 2,3-dimethoxynorbornene; norbornadiene; tricycloundecene; tetracyclododecene; 8-methyltetracyclododecene; 8-ethyltetracyclododecene; 8-methoxycarbonyltetracyclododecene; 8-methyl-8-tetracyclododecene; 8-cyanotetracyclododecene; pentacyclopentadecene; pentacyclohexadecene; an oligomer of cyclopentadiene (e.g., cyclopentadiene tetramer, cyclopentadiene pentamer); and/or a $C_2$-$C_{12}$-alkyl-substituted norbornene or $C_2$-$C_{12}$-alkenyl-substituted norbornene (e.g., 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; 5-butenyl-2-norbornene).

In some embodiments of any of the embodiments described herein, the cyclic olefin is dicyclopentadiene, tricyclopentadiene, or higher order oligomer of cyclopentadiene (e.g., cyclopentadiene tetramer, cyclopentadiene pentamer), tetracyclododecene, norbornene, and/or a $C_2$-$C_{12}$-alkyl-substituted norbornene or $C_2$-$C_{12}$-alkenyl-substituted norbornene (e.g., according to any of the respective embodiments described herein).

Additional examples for ROMP capable cyclic olefin monomers which may be optionally used in embodiments of the invention include any polycyclic compounds which are characterized by the presence of at least two norbornene moieties in its structure, for example:

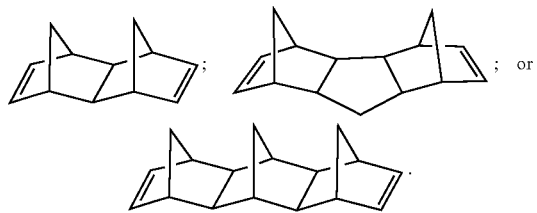

In some embodiments of any of the embodiments described herein, the cyclic olefin is characterized by the presence of at least three rings.

In some embodiments of any of the embodiments described herein relating to a norbornene-based monomer, a monocyclic olefin (e.g., cyclobutene, cyclopentene, cyclopentadiene, cyclooctene, cyclododecene) is copolymerized with the norbornene-based monomer.

Without being bound by any particular theory, it is believed that polycyclic monomers with a rigid backbone, such as cyclopentadiene trimer (TCPD or CPD trimer) will typically produce a cross-linked polymer with very high Tg and heat deflection temperature (HDT), but will also be more brittle and may have lower impact resistance.

In some embodiments of any of the embodiments described herein, a polycyclic monomer with a rigid backbone (e.g., according to any of the respective embodiments described herein) is formulated with one or more softer additional monomers and/or cross linkers.

Examples of additional monomers include, without limitation, monomers having the formula:

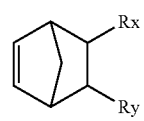

wherein Rx and Ry are each independently hydrogen, $C_1$-$C_{20}$-alkyl, cycloalkyl, hetroalicylic, aryl, polyethylene glycol, polypropylene glycol or benzyl.

Example of bifunctional cyclic olefins, which may also act as cross linkers include, without limitation, compounds having any one of the following formulas:

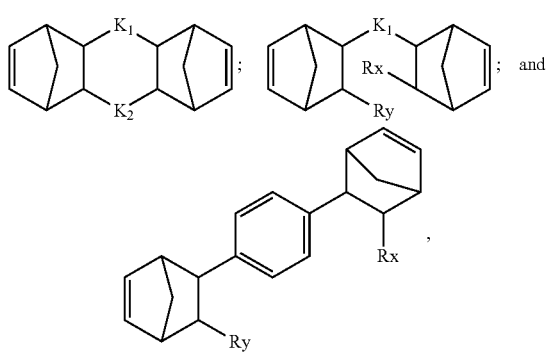

wherein Rx and Ry are each independently hydrogen, $C_1$-$C_{20}$-alkyl, cycloalkyl, hetroalicylic, aryl, polyethylene glycol, polypropylene glycol or benzyl; and $K_1$ and $K_2$ are each independently $C_1$-$C_{20}$-alkylene, cycloalkyl, heteroalicylic, aryl, polyethylene glycol, polypropylene glycol or benzyl.

Additional examples of bifunctional cyclic olefins include, without limitation:

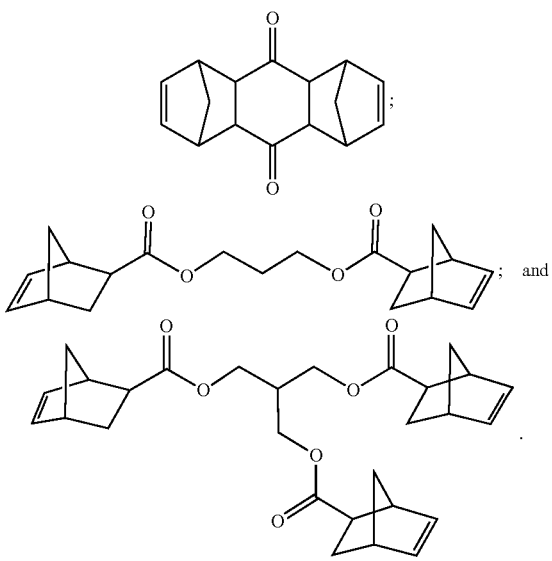

The connection between an additional monomer and/or bifunctional monomer (cross-linker) to a polycyclic (e.g., norbornene) monomer may optionally be, without limitation, through a saturated or unsaturated carbon-carbon bond, an ester bond, and ether bond, an amine, or an amide bond.

Synthesis of norbornene derivatives described herein according to any of the respective embodiments may optionally be performed by Diels-Alder reaction of double bond with cyclopentadiene (CPD), as depicted in Scheme 1 below:

Scheme 1

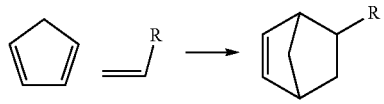

-continued

Substituents of a polymerized cyclic olefin may optionally be in a protected form in the monomer. For example, hydroxy groups, which may interfere with metathesis catalysis, may be protected by being in a form of any suitable protected group used in the art. Acceptable protecting groups may be found, for example, in Greene et al., Protective Groups in Organic Synthesis, 3rd Ed. (New York: Wiley, 1999).

In some of any of the embodiments described herein, the ROMP monomer is selected as such that is chemically compatible with (e.g., does not interfere with the activity of) a curing agent or system of the FRP system.

Additional ROMP Reactive Compounds:

A ROMP system may further comprise, in addition to a ROMP monomer, linear olefins which can be co-polymerized with the ROMP monomer. Exemplary such olefins include, but are not limited to, ethylene, propylene, 1-butene, 1-pentene, 1-hexene, 1-octene, 1-butene, 2-pentene, and 1,4-hexadiene. Such linear olefins can be present in an amount lower than 50 wt. %, preferably lower than 20 wt. %, more preferably lower than 10 wt. % of the total amount of the ROMP monomers and the linear olefin monomers.

ROMP Catalysts and Catalyst Systems (Component (B)):

ROMP catalysts typically include metal carbene organometallic complexes, with the metal being typically, but not necessarily, a transition metal such as ruthenium, molybdenum, osmium or tungsten.

Ruthenium based ROMP catalysts are more stable on exposure to non carbon-carbon double-bond functional groups, and to other impurities like water and oxygen. These catalysts can typically be used in low loading in the formulation (e.g., in a range of from about 0.002% to about 0.05% by weight of the total weight of a modeling material formulation containing same).

Ruthenium based ROMP catalysts that are usable in the context of embodiments of the present invention are marketed, for example, by Materia, Umicore, Evonic, Telene and BASF.

Exemplary ruthenium-based ROMP catalysts include, Grubbs $1^{st}$ and $2^{nd}$ generation catalysts, Hoveyda-Grubbs catalysts, umicore 41, umicore 42, umicore 61SIMes, and catMETium RF1.

ROMP catalysts can be divided into active catalysts, latent catalysts and pre-catalysts.

An active catalyst is a ROMP catalyst that initiates ROMP of a monomer when in contact with the ROMP monomer, without requiring a stimulus. ROMP active catalysts are typically active at room temperature.

Exemplary active catalysts usable in the context of the present embodiments are the Grubbs $2^{nd}$ generation, Hoveyda-Grubbs $2^{nd}$ generation, and Grubbs $3^{rd}$ generation catalysts, which are realized by any person skilled in the art.

A latent catalyst is a ROMP catalyst that initiates ROMP of a monomer when in contact with the ROMP monomer, upon exposure to a physical stimulus, typically heat or radiation, as described herein. A latent catalyst is inactive in initiating ROMP of a monomer in the absence of a suitable physical stimulus.

A latent catalyst typically includes a chelating (e.g., donor) ligand which "blocks" a coordinative site of the metal and thus renders the catalyst inactive. Activating the catalyst is effected by dissociating the chelating ligand from the metal center, to thereby render it active towards metathesis.

In a latent catalyst, dissociating the chelating ligand requires a physical external stimulus, as described herein. The type of the external stimulus is determined by the nature of the metal, the chelating ligand and other ligands in the transition metal complex.

Latent ROMP catalysts that are activated in response to heat are also referred to as thermally-activatable catalysts. These include, for example, S-chelated ruthenium catalysts such as described, for example, in Diesendruck, C. E.; Vidaysky, Y.; Ben-Asuly, A.; Lemcoff, N. G., *J. Polym. Sci., Part A: Polym. Chem.* 2009, 47, 4209-4213, which is incorporated by reference as if fully set forth herein.

An exemplary S-chelated thermally-activatable latent catalyst is:

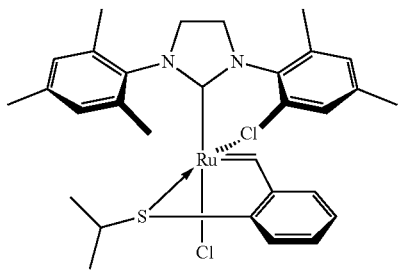

Other exemplary thermally-activatable ROMP catalysts include N-chelated ruthenium catalysts, such as, for example, described in Szadkowska et al., Organometallics 2010, 29, 117-124, which is incorporated by reference as if fully set forth herein.

Exemplary N-chelated thermally-activatable latent catalyst include, without limitation:

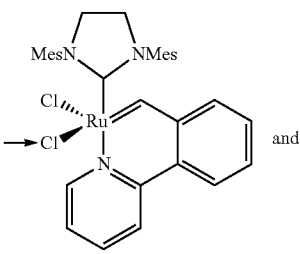
VIII and

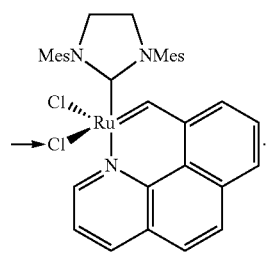
IX

Any other thermally-activatable ROMP catalysts are contemplated.

Latent ROMP catalysts that are activated in response to radiation are also referred to as photoactivatable catalysts.

Photoactivatable ROMP catalysts are mostly UV-activatable catalysts, in which dissociation of a chelating ligand is effected in the presence of UV radiation. Exemplary UV-activatable ROMP latent catalysts are described, for example, in Vidaysky, Y. and Lemcoff, N. G. Beilstein J. Org. Chem., 2010, 6, 1106-1119; Ben-Asuly et al., Organometallics, 2009, 28, 4652-4655; Diesendruck et al., *J. Polym. Sci., Part A: Polym. Chem.* 2009, 47, 4209-4213; Wang et al., Angew. Chem. Int. Ed. 2008, 47, 3267-3270; and U.S. Patent Application Publication No. 2009-0156766, all of which are incorporated by reference as if fully set forth herein.

UV-activatable ROMP catalysts can be, for example, O-chelated and S-chelated Ruthenium catalysts.

Non-limiting examples include the following:

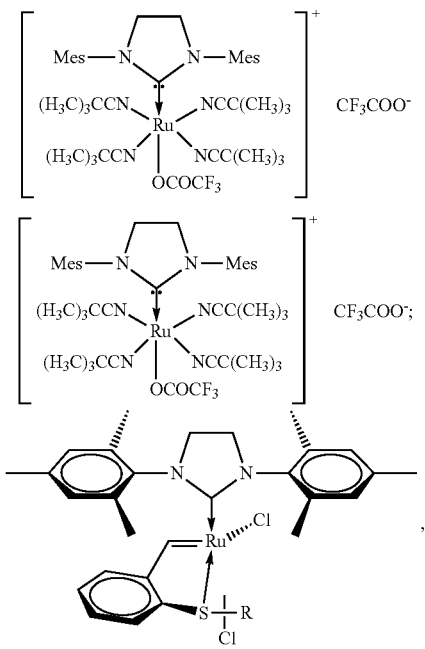

with R being Ph, beta-Naph, 1-Pyrenyl, or i-Pr;
and all catalysts described in Vidaysky, Y. and Lemcoff, N. G. Beilstein J. Org. Chem., 2010, 6, 1106-1119.

UV-activatable ROMP catalysts can be, for example, tungsten catalysts such as, for example:

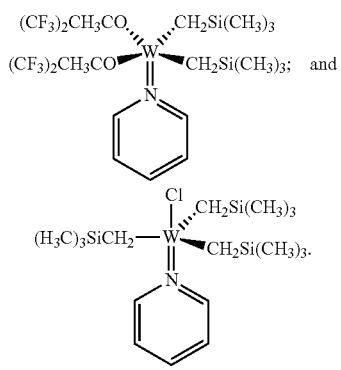

Photoactivatable latent catalyst can also be activated in response to ultrasound radiation. Such catalysts are described, for example, in Piermattei et al., Nature Chemistry, DOI: 10.1038/NCHEM.167, which is incorporated by reference as if fully set forth herein.

A ROMP pre-catalyst is a ROMP catalyst that initiates ROMP of a monomer when in contact with the ROMP monomer, upon exposure to a chemical stimulus, as described herein, typically an addition of an acid or a proton, which converts the pre-catalyst to an active catalyst (which induces ROMP of a ROMP monomer when in contact with the ROMP monomer). A pre-catalyst is inactive in initiating ROMP of a monomer in the absence of the chemical stimulus.

A pre-catalyst, similarly to a latent catalyst, typically includes a chelating (e.g., donor) ligand which "blocks" a coordinative site of the metal and thus renders the catalyst inactive. Activating the catalyst is effected by dissociating the chelating ligand from the metal center, to thereby render it active towards metathesis.

In a pre-catalyst, dissociating the chelating ligand requires a chemical stimulus, typically a presence of an acid. The agent that exerts a chemical stimulus that activates the catalyst is referred to herein as an activator or a co-catalyst.

A ROMP pre-catalyst and a suitable activator form together a catalyst system.

The activator can be, for example, an acid, such as HCl, an acid generator such as, but not limited to, $(R_nSiCl_{4-n})$, with R being an alkyl or aryl, and n being 1, 2, or 3, or an acid generator as described, for example, in EP Patent No. 1757613 and U.S. Pat. No. 8,519,069, the teachings of which are incorporated by reference as if fully set forth herein.

In some embodiments, when n is 2 or 3, one or the R groups can be hydrogen, and the R groups can be the same or different, as long as at least one of the R groups is an alkyl or aryl. Exemplary activators are presented in Table A below.

TABLE A

| Tradename | Structure | Supplier | |
|---|---|---|---|
| Trichloro(phenyl)silane | [phenyl-SiCl₃] | Sigma Aldrich | Acid activator |
| HCl | | Sigma Aldrich | Acid activator |
| Chlorophenylsilane | [H₂Si(Cl)(phenyl)] | Sigma Aldrich | Acid activator |
| Dichloro(phenyl)silane | [Cl-SiH(Cl)-phenyl] | Sigma Aldrich | Acid activator |
| Dichloromethyl(phenyl)silane | [Cl₂Si(CH₃)(phenyl)] | Sigma Aldrich | Acid activator |
| ChloroDimethyl Phenyl Silane | | Sigma Aldrich | Acid activator |
| ChloroTrimethyl Silane | [(CH₃)₃SiCl] | TCI | Acid activator |
| Butyl(chloro)dimethyl Silane, | | TCI | Acid activator |
| Chloro-decyl-dimethyl Silane | | TCI | Acid activator |
| Chloro(chloromethyl)dimethyl | [H₃C-Si(Cl)(CH₃)-CH₂Cl] | TCI | Acid activator |
| Chloro(dichloromethyl)dimethylsilane | [Cl-Si(-)(-)-CHCl₂] | Alfa Aesar | Acid activator |
| Pentafluoropropionic acid | $F_3C-CF_2-C(O)OH$ | Sigma | Non chloride Acid activator |
| Trifluoroacetic acid | $HO-C(O)-CF_3$ | Sigma | Non chloride Acid activator |
| Trichloroacetic acid | $HO-C(O)-CCl_3$ | Sigma | Acid activator |
| Trichlorododecyl silane (TCSA) | $Cl-SiCl_2-CH_2(CH_2)_{10}CH_3$ | Sigma-Aldrich | Acid activator |
| Trichloro(octadecyl)silane | $CH_3(CH_2)_{16}CH_2SiCl_3$ | Sigma-Aldrich | Acid activator |
| Dichlorodiphenyl silane | [(phenyl)₂SiCl₂] | Sigma-Aldrich | Acid activator |
| Perfluoro decyldimethylchloro silane | | Acros | Acid activator |
| Perfluoro decylmethyl dichlorosilane | | Acros | Acid activator |

Alternatively, the activator is activatable in response to an external stimulus, for example, heat or radiation.

A group of latent activators which are usable in the context of the present embodiments is known in the art as photoacid generators (PAG). Such activators and corresponding pre-catalysts are described for example, in Keitz, B. K.; Grubbs, R. H. J. Am. Chem. Soc. 2009, 131, 2038-2039, which is incorporated by reference as if fully set forth herein.

Additional exemplary PAG include sulfonium salts such as triaryl sulfonium chloride and UVI 6976, iodonium salt Uvacure 1600, Speedcure 937, Irgacure 250, Irgacure PAG 103, Irgacure PAG 203, 2-(4-Methoxystyryl)-4,6-bis (trichloromethyl)-1,3,5-triazine and TMCH. Other exemplary commercially available PAG are described in Table I hereinunder.

Acid-activatable ROMP catalysts are described, for example, in U.S. Pat. No. 6,486,279. Other catalysts that can be activated by PAG are acid activatable pre-catalysts such as the Schiff base-chelated catalysts described in EP Patent No. 1757613 and U.S. Pat. No. 8,519,069.

Other ROMP catalyst systems are recognizable by any person skilled in the art.

Additional exemplary ROMP catalysts usable in the context of the present embodiments are described in WO 2014/144634, which is incorporated by reference as if fully set forth herein.

In some embodiments, a ROMP catalyst can be represented by the following Formula:

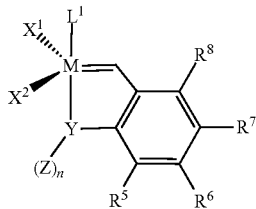

wherein,
M is a Group 8 transition metal, particularly Ru or Os, or, more preferably, Ru (ruthenium);
$X^1$, $X^2$, and $L^1$ are neutral ligands commonly used for olefin metathesis catalyst, particularly Ru-based catalyst;
Y is a heteroatom selected from N, O, S, and P; preferably Y is O or N;
$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein "A" and Fn have been defined above; and any combination of Y, Z, $R^5$, $R^6$, $R^7$, and $R^8$ can be linked to form one or more cyclic groups;
n is 0, 1, or 2, such that n is 1 for the divalent heteroatoms O or S, and n is 2 for the trivalent heteroatoms N or P; and
Z is a group selected from hydrogen, alkyl, aryl, functionalized alkyl, functionalized aryl where the functional group(s) may independently be one or more of the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate;

methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ may be linked to a support. Additionally, $R^5$, $R^6$, $R^7$, $R^8$, and Z may independently be thioisocyanate, cyanato, or thiocyanato.

Additional exemplary ROMP catalysts can be represented by the following formula:

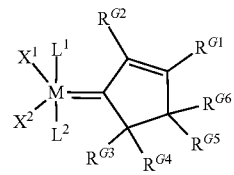

wherein M is a Group 8 transition metal, particularly ruthenium or osmium, or more particularly, ruthenium;
$X^1$, $X^2$, $L^1$, and $L^2$ are common ligands of catalysts as defined above; and
$R^{G1}$, $R^{G2}$, $R^{G3}$, $R^{G4}$, $R^{G5}$, and $R^{G6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein heteroatoms and/or functional groups may be present in either the aryl or the alkyl portions of the alkylene and arylalkylene groups, and Fn is a functional group, or any one or more of the $R^{G1}$, $R^{G2}$, $R^{G3}$, $R^{G4}$, $R^{G5}$, and $R^{G6}$ may be linked together to form a cyclic group.

Additional ROMP catalysts can be represented by the following formula:

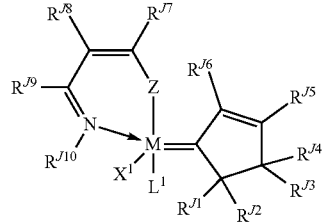

wherein M is a Group 8 transition metal, particularly ruthenium or osmium, or more particularly, ruthenium;
$X^1$ and $L^1$ are common ligands as defined above;
Z is selected from the group consisting of oxygen, sulfur, selenium, $NR^{JU}$, $PR^{JU}$, $AsR^{JU}$, and $SbR^{JU}$; and
$R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{JU}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{JU}$ may be linked together to form a cyclic group.

Additional ROMP catalysts can be represented by the following formula:

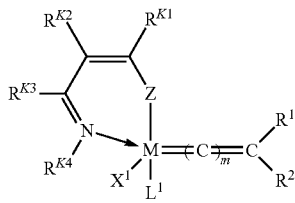

wherein M is a Group 8 transition metal, particularly ruthenium or osmium, or more particularly, ruthenium;

$X^1$, $L^1$, $R^1$, and $R^2$ are as commonly used in ligands of ROMP catalysts;

Z is selected from the group consisting of oxygen, sulfur, selenium, $NR^{K5}$, $PR^{K5}$, $AsR^{K5}$, and $SbR^{K5}$;

m is 0, 1, or 2; and $R^{k1}$, $R^{k2}$, $R^{k3}$, $R^{k4}$, and $R^{k5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylammosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, and $R^{K5}$ may be linked together to form a cyclic group.

Additional ROMP catalysts can be represented by the following formula:

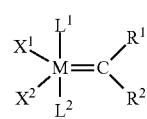

wherein:
M is a Group 8 transition metal;
$L^1$ and $L^2$ are neutral electron donor ligands;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $R^1$, and $R^2$ can be taken together to form a cyclic group, and further wherein any one or more of $X^1$, $X^2$, $L^1$, $L^2$, $R^1$, and $R^2$ may be attached to a support.

Preferred catalysts contain Ru or Os as the Group 8 transition metal, with Ru particularly preferred.

The catalysts having the structure of formula (I) are in one of two groups. In the first group, $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether. Exemplary ligands are trisubstituted phosphines. The first group of catalysts, accordingly, is exemplified by the ruthenium bisphosphine complex $(PCy_3)_2(Cl)_2Ru=CHPh$ (1)

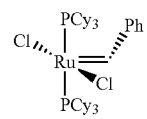

The catalysts of the second group are transition metal carbene complexes, preferably ruthenium carbene complexes, wherein $L^2$ is as defined above and $L^1$ is a carbene having the structure of formula (II)

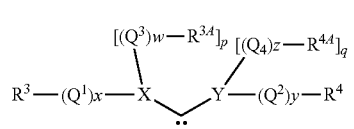

such that the complex has the structure of formula (IIA)

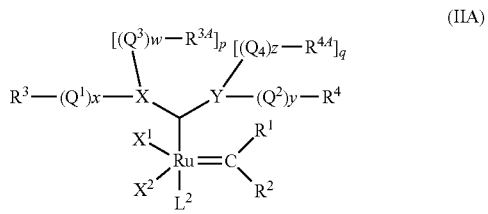

wherein:

$X^1$, $X^2$, $L^1$, $L^2$, $R^1$, and $R^2$ are as defined above;

X and Y are heteroatoms selected from N, O, S, and P;

p is zero when X is O or S, and p is 1 when X is N or P;

q is zero when Y is O or S, and q is 1 when Y is N or P;

$Q^1$, $Q^2$, $Q^3$ and $Q^4$ are independently selected from hydrocarbylene, substituted hydrocarbylene, heteroatom-containing hydrocarbylene, substituted heteroatom-containing hydrocarbylene, and —(CO)—, and further wherein two or more substituents on adjacent atoms within Q may be linked to form an additional cyclic group;

w, x, y, and z are independently zero or 1; and $R^3$, $R^{3,4}$, $R^4$, and $R^{4,4}$ are independently selected from hydrogen, hydrocarbyl, substituted hydrocarbyl, heteroatom-containing hydrocarbyl, and substituted heteroatom-containing hydrocarbyl, wherein any two or more of $X^1$, $X^2$, $L^2$, $R^1$, $R^2$, $R^3$, $R^{3,4}$, $R^4$, and $R^{4,4}$ can be taken together to form a cyclic group, and further wherein any one or more of $X^1$, $X^2$, $L^2$, $R^1$, $R^2$, $R^3$, $R^{3,4}$, $R^4$, and $R^{4,4}$ may be attached to a support.

The second group of catalysts, accordingly, is exemplified by the ruthenium carbene complex $(IMesH_2)(PCy_3)(Cl)_2Ru=CHPh$ (2):

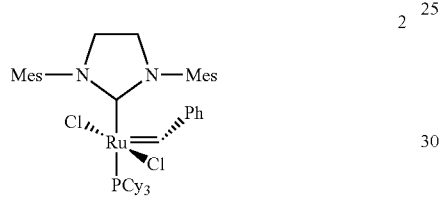

Additional transition metal carbene complexes useful as catalysts in conjunction with the present invention include, but are not limited to, neutral ruthenium or osmium metal carbene complexes containing metal centers that are formally in the +2 oxidation state, have an electron count of 16, and are penta-coordinated. Other preferred metathesis catalysts include, but are not limited to, cationic ruthenium or osmium metal carbene complexes containing metal centers that are formally in the +2 oxidation state, have an electron count of 14, and are tetra-coordinated. Still other preferred metathesis catalysts include, but are not limited to, neutral ruthenium or osmium metal carbene complexes containing metal centers that are formally in the +2 oxidation state, have an electron count of 18, and are hexa-coordinated.

Exemplary catalyst systems suitable for use in the context of the present embodiments are described, for example, in EP 1468004, EP 2280017, EP 2151446, EP 1757613, and EP 1577282.

Other exemplary catalyst systems usable in the context of the present embodiments include, without limitation, the following:

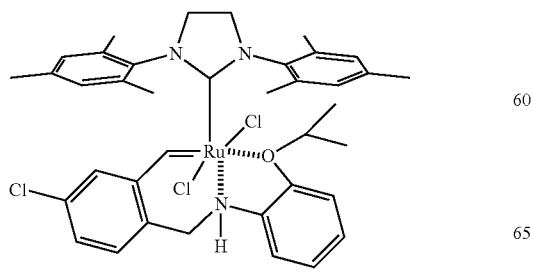

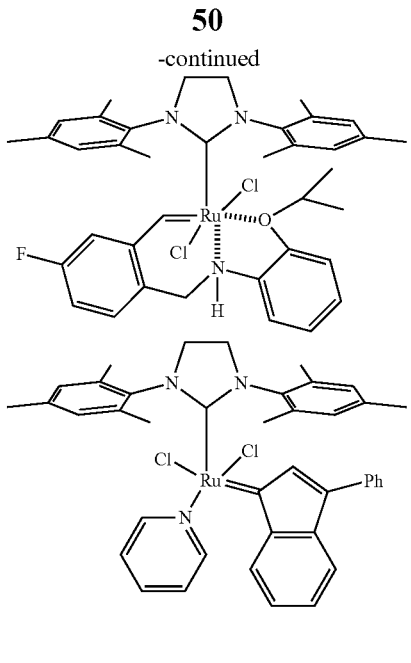

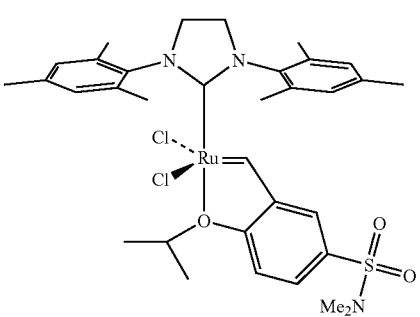

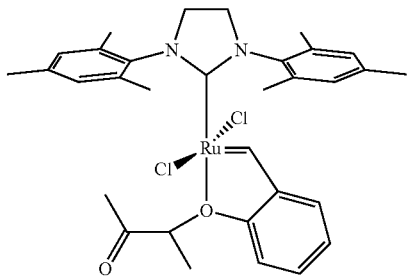

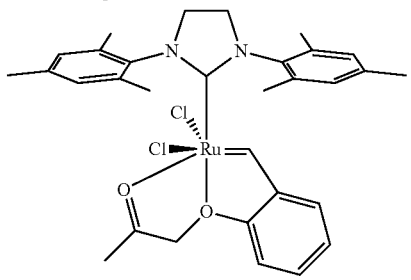

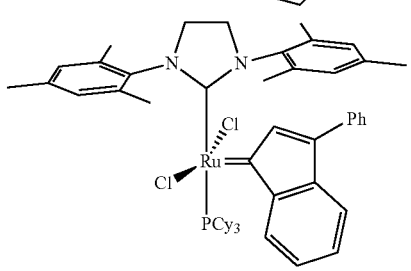

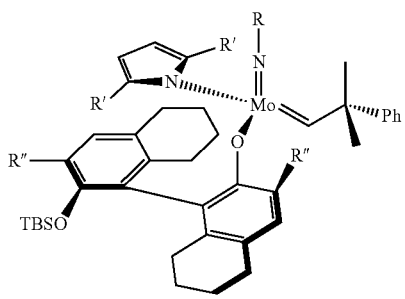
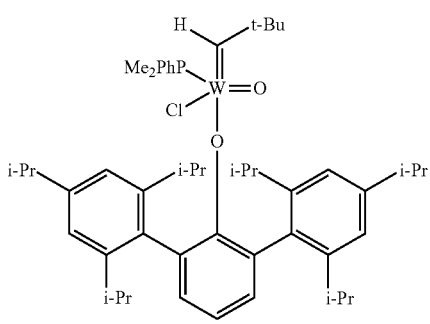
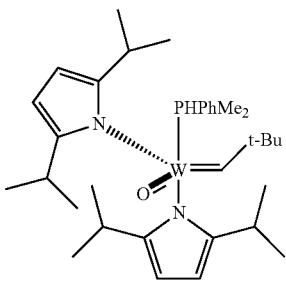
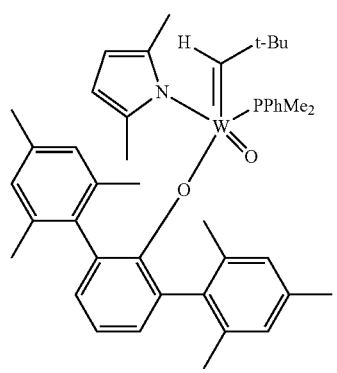
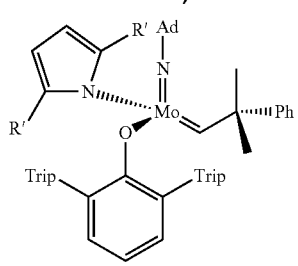
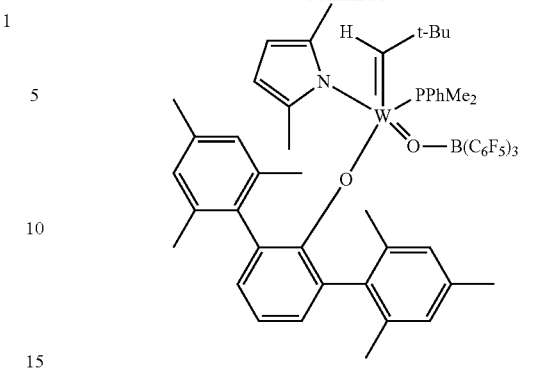

In some of any of the embodiments described herein, the catalyst is a latent catalyst.

In some of these embodiments, the latent catalyst is a thermally-activatable catalyst.

In some of any of the embodiments described herein, the catalyst is an active catalyst.

In some of these embodiments, the building material comprises at least two modeling material formulations, and the active catalyst and the ROMP monomer are included in different modeling material formulations, as described in further detail hereinunder.

In some of any of the embodiments described herein, the catalyst is selected suitable (e.g., chemically compatible) for inclusion with a FRP curable material as described herein.

ROMP Inhibitors:

ROMP inhibitors, as described herein, are typically Lewis base compounds such as triphenyl phosphine (TPP), trialkylphosphines such as tributylphosphine, trimethylphosphine, triethylphosphine, and other phosphines; aniline; and pyridine.

Any other ROMP inhibitors are contemplated.

A ROMP inhibitor is also referred to herein as a retardant.

Exemplary ROMP Systems:

In a preferred embodiment, the ROMP monomer is or comprises DCPD due to its high reactivity, and the high thermal resistance and toughness properties exhibited by a printed object made therefrom.

In a preferred embodiment, the ROMP monomer is or comprises a CPD trimer due to its suitable viscosity and the high thermal resistance exhibited by a printed object made therefrom.

In a preferred embodiment, a ROMP monomer is or comprises a mixture of DCPD and CPD trimer, for example, a mixture known in the art, and also referred to herein as "RIM monomer". In some embodiments, such a mixture comprises DCPD at a concentration ranging from about 70% to about 99%, or from 85% to about 95%, by weight, of the total weight of a ROMP monomer, and a CPD trimer at a concentration ranging from about 30% to about 1%, or from about 15% to about 5%, respectively, by weight, of the total weight of a ROMP monomer.

In a commercially available "RIM monomer", a concentration of DCPD is typically from about 90% to about 92%.

In some embodiments, a ROMP monomer is or comprises about 91% DCPD and about 9% CPD trimer, as described herein.

Table I below presents a list of exemplary components which can be included, in any combination, in a ROMP system as described herein in any one of the embodiments and any combinations thereof. These components can be included in one or more modeling material formulations, as described herein.

TABLE I

| Trade Name | Chemical Type | Function | Supplier |
|---|---|---|---|
| ULTRENE ™ 99 DCPD | Dicyclopentadiene | ROMP Monomer (bifunctional) | Cymetech |
| ULTRENE ™ 99-X DCPD (X = 6-20%) | Cyclopentadiene trimer in dicyclopentadiene | ROMP Monomer (bifunctional) | Cymetech |
| Cyclopentadiene trimer | Cyclopentadiene trimer | ROMP Monomer (bifunctional) | Sinosteel Anshan Research Institute of thermo-energy |
| Cyclooctene | Cyclooctene | ROMP Monomer | Sigma Aldrich |
| Cyclooctadiene | Cyclooctadiene | ROMP Monomer | Sigma Aldrich |
| Norbornene | | ROMP Monomer | |
| FA-512AS | Dicyclopentadienyloxyethyl acrylate | Dual curing ROMP/UV monomer | Hitachi chemicals |
| FA-511AS | Dicyclopentadieny acrylate | Dual curing ROMP/UV monomer | Hitachi chemicals |
| Kraton no. 1102 | Styrene-butadiene-styrene rubber | Rubber | GLS |
| | Polybutadiene | Rubber | Lanxess |
| Vistalon | ethylene propylene diene (EPDM) rubber | Rubber | ExonMobile chemicals |
| Exact plastomers | | Rubber-plastic | ExonMobile chemicals |
| Ethanox 702 | 4,4'-Methylenebis(2,6-di-tert-butylphenol) | antioxidant | Albemarle |
| Grubbs 1$^{st}$ generation catalyst | Benzylidene-bis(tricyclohexylphosphine)-dichlororuthenium | ROMP catalyst (active at room temperature) | Materia |
| Grubbs 2$^{st}$ generation catalysts | [1,3-bis-(2,4,6-trimethylphenyl)-2-imidazolidinylidene]dichloro(phenylmethylene)(tricyclo-hexylphosphine)ruthenium | ROMP catalyst (active at room temperature) | Materia |
| Hoveyda-Grubbs 1$^{st}$ Generation Catalyst | Dichloro(o-isopropoxyphenylmethylene)(tricyclohexylphosphine)ru-thenium(II) | ROMP catalyst (active at room temperature) | Materia |
| Hoveyda-Grubbs 2$^{nd}$ Generation Catalyst | [1,3-Bis-(2,4,6-trimethylphenyl)-2-imidazolidinylidene]dichloro(oisopropoxyphenylmethy-lene)ruthenium | ROMP catalyst (active at room temperature) | Materia |
| Umicore 41 | [1,3-Bis(mesityl)-2-imidazolidinyl-idene]-[2-[[(4-methylphenyl)imino]methyl]-4-nitro-phenolyl]-[3-phenyl-indenylidene](chloro)ruthenium(II) | ROMP catalyst (Pre-catalyst, activatable by an acid) | Umicore |
| Umicore 42 | [1,3-Bis(mesityl)-2-imidazolidinylidene]-[2-[[(2-methylphenyl)imino]methyl]-phenolyl]-[3-phenyl-indenyliden](chloro)ruthenium(II) | ROMP catalyst (Pre-catalyst, activatable by an acid) | Umicore |
| Umicore 22 | cis-[1,3-Bis(2,4,6-trimethylphenyl)-2-imidazolidinylidene]dichloro(3-phenyl-1H-inden-1-ylidene)(triisopropylphos-phite)ruthenium(II) | ROMP catalyst (thermally-activatable latent catalyst) | Umicore |
| Umicore 2 | 1,3-Bis(2,4,6-trimethylphenyl)-2-imidazolidinylidene]dichloro(3-phenyl-1H-inden-1-ylidene)(tricyclohexylphos-phine)ruthenium(II) | ROMP catalyst (active at room temperature) | Umicore |
| Umicore 61 | [1,3-Bis(2,4,6-trimethylphenyl)-2-imidazolidinylidene]dichloro[2-methyl(phenyl)amino]benzylidene]ruthenium(II) | ROMP catalyst (active at room temperature) | Umicore |
| Triphenyl phosphine | Triphenyl phosphine | ROMP inhibitor | Sigma Aldrich |
| Triethylphosphite | Triethylphosphite | ROMP inhibitor | Sigma Aldrich |
| Trimethylphosphite | Trimethylphosphite | ROMP inhibitor | Sigma Aldrich |
| tributylphosphite | Tributylphosphite | ROMP inhibitor | Sigma Aldrich |

TABLE I-continued

| Trade Name | Chemical Type | Function | Supplier |
|---|---|---|---|
| Irgacure PAG103 | | PAG (latent activator) | BASF |
| Irgacure PAG121 | | PAG (latent activator) | BASF |
| Trichloro(phenyl)silane | Trichloro(phenyl)silane | Acid generator (activator) | Aldrich |
| HCl | | Acid | |

Table IA below presents a list of exemplary ROMP monomers usable in the content of the present embodiments:

TABLE IA

| Tradename | Structure | Supplier |
|---|---|---|
| DCPD | Dicyclopentadiene | Telene SAS |
| RIM monomer | Cyclopentadiene trimer in dicyclopentadiene | Telene SAS |
| Cyclopentadiene trimer | Cyclopentadiene trimer | Zeon |
| Cyclooctene | Cyclooctene | Sigma Aldrich |
| Cyclooctadiene | Cyclooctadiene | Sigma Aldrich |
| Norbornene | Norbornene | Sigma Aldrich |
| ENB | 5-Ethylidene-2-norbornene | Sigma Aldrich |
| Cyclododecatriene | cyclododecatriene | BASF |

Table IB below presents a list of exemplary catalysts usable in the context of embodiments of the present invention.

TABLE IB

| Tradename | Structure | Supplier | |
|---|---|---|---|
| Grubbs 3$^{rd}$ generation | | Materia | ROMP catalyst |
| Hoveyda-Grubbs 2$^{nd}$ generation | [structure: Ru complex with SIMes ligand, Cl, Cl, PCy₃, =CHPh] | Sigma Aldrich | ROMP catalyst |
| C764 | | Telene | ROMP catalyst |
| Umicore M2 | | Umicore | ROMP catalyst |
| Umicore M20 | | Umicore | ROMP catalyst |
| Umicore M61 SIMes | [structure: Ru complex with SIMes ligand, Cl, Cl, =CH-aryl with Me-N-Ph group] | Umicore | ROMP catalyst |

TABLE IB-continued

| Tradename | Structure | Supplier | |
|---|---|---|---|
| Umicore M31 | (Ru complex with mesityl-substituted imidazolidine, two Cl, pyridine, and Ph-indenylidene ligands) | Umicore | ROMP catalyst |

A Free-Radical Polymerization (FRP) System:

Herein, a "free-radical polymerization system" is also referred to herein interchangeably as "FRP system" or as "radical polymerization system" describes a set of materials and optionally conditions for effecting polymerization that occurs upon generation of a free radical monomer and propagates by sequential addition of monomers thereto. The materials included in a FRP system are also referred to herein as "FRP components" or "FRP active components".

A FRP system requires at least a FRP curable material (Component (C)) and a FRP curing agent or system (Component (D)) for initiating the FRP reaction. The FRP curing agent, which is also referred to herein simply as "curing agent" (component (D)) typically comprises one or more radical initiators, which generate a free radical for initiating the FRP reaction. A radical initiator is also referred to herein throughout as "radical generator", "FRP initiator" or simply as "initiator".

According to some of these embodiments, the curing agent is inactive towards initiation of FRP of the curable material when the FRP system is not exposed to the condition that activates the curing agent, namely, prior to exposure to a FRP inducing condition.

By "inactive towards initiation of FRP" of the FRP curable material it is meant that in the presence of the curing agent, no more than 40% or no more than 30% or no more than 20% or no more than 10% or no more than 5% of the FRP curable material polymerizes to provide a respective polymer.

In these embodiments, a FRP system consists of a curing agent and a FRP curable material and a condition for activating the curing agent towards initiation of FRP of the curable material. In such cases, the curing agent is referred to herein as an "activatable curing agent" or a "latent curing agent", which is activatable upon exposure to the condition.

In these embodiments, a condition for initiating FRP comprises a condition that induces free radical generation by the initiator. The initiator in such cases is a latent initiator, which produces free radicals when exposed to the condition.

Activatable curing agents as described herein can comprise one or more thermally-activatable radical initiators, which are converted into active radical initiators upon exposure to heat (that is, a condition for inducing initiation of FRP comprises heat, heat-inducing radiation or heating a FRP system, optionally in addition to contacting the curing agent and the FRP curable material).

Activatable curing agents as described herein can in addition comprise photo-activatable radical initiators, which are also referred to herein as photoinitiators, which are converted into active radical initiators upon exposure to electromagnetic radiation, for example, UV-radiation.

In some embodiments, a FRP system consists of a FRP curable material, a FRP curing agent and an a co-initiator, for activating the one or more radical initiators forming the curing agent. In such cases, the FRP curing agent is inactive towards initiation of FRP of the curable material, as defined herein, in the absence of the co-initiator (when it is not contacted with the co-initiator). A combination of such a curing agent and a co-initiator is also referred to herein as a curing system, or as a FRP curing system.

Co-initiators are typically used with radical initiators that need a second molecule to produce a radical that is active in the free-radical polymerization system. A co-initiator of a radical initiator is also referred to herein as an FRP activator.

According to some of these embodiments, the curing agent is inactive towards initiation of FRP of the curable material, as defined herein, in the absence of a respective co-initiator.

In some of these embodiments, the co-initiator is an activatable activator, which is rendered active towards activating the radical initiator when exposed to a certain condition. In such cases, the co-initiator is incapable of activating the radical initiator(s) unless it is activated (by exposure to the condition). Such co-initiator are also referred to herein as "latent co-initiators".

A latent co-initiator is incapable of activating a radical initiator for initiating FRP of the curable material, and can be converted to an active co-initiator when exposed to an activating condition (which can be the FRP inducing condition as described herein).

According to some of these embodiments, the co-initiator is inactive towards activating the radical initiators forming the curing agent, and the curing agent is therefore inactive towards initiation of FRP of the curable material when the FRP system is not exposed to the condition that activates the co-initiator.

In some embodiments, latent co-initiators as described herein are thermally-activatable co-initiators, which are converted into active co-initiators upon exposure to heat (that is, a condition for inducing initiation of ROMP comprises heat, heat-inducing radiation or heating a ROMP system, optionally in addition to contacting a co-initiator, a curing agent and a FRP curable monomer).

In some of any of the embodiments described herein, the FRP system is a thermally activatable system, which comprises either a thermally activatable curing agent (which comprises one or more radical initiators which is/are thermally activatable) or a thermally-activatable co-initiator.

In some of any of the embodiments described herein, a FRP system further comprises a radical inhibitor, for preventing or slowing down polymerization and/or curing prior to exposing to the FRP inducing condition.

It is to be noted that a FRP system as described herein refers to the active components and/or conditions that together lead to FRP of a FRP curable material. A formulation that comprises a FRP system can further comprise other components which can participate in polymerization or curing reactions, and/or form a part of the final polymeric material, as described in further detail hereinbelow.

Any free-radical curable system that is usable in 3D inkjet printing processes and systems is contemplated by these embodiments.

The FRP Curable Material (Component (C)):

In some embodiments, FRP curable materials may include mono-functional and/or multi-functional acrylic and/or methacrylic monomers, acrylic and/or methacrylic oligomers, and any combination thereof. Other FRP curable materials may include vinyl ethers and other components (monomers or oligomers) with a reactive double bond.

An acrylic or methacrylic oligomer can be, for example, a polyester of acrylic acid or methacrylic acid, oligomers of urethane acrylates and urethane methacrylates. Urethane-acrylates are manufactured from aliphatic or aromatic or cycloaliphatic diisocyanates or polyisocyanates and hydroxyl-containing acrylic acid esters. Oligomers may be mono-functional or multifunctional (for example, di-, tri-, tetra-functional, and others). An example is a urethane-acrylate oligomer marketed by IGM Resins BV (The Netherlands) under the trade name Photomer-6010.

An acrylic or metyhacrylic monomer can be, for example, an ester of acrylic acid or methacrylic acid. Momoners may be mono-functional or multifunctional (for example, di-, tri-, tetra-functional, and others). An example of an acrylic mono-functional monomer is phenoxyethyl acrylate, marketed by Sartomer Company (USA) under the trade name SR-339. An example of an acrylic di-functional monomer is propoxylated (2) neopentyl glycol diacrylate, marketed by Sartomer Company (USA) under the trade name SR-9003.

Either the monomer or the oligomer might be polyfunctional, and can be, for example, Ditrimethylolpropane Tetraacrylate (DiTMPTTA), Pentaerythitol Tetra-acrylate (TETTA), Dipentaerythitol Penta-acrylate (DiPEP). Any other curable material that is polymerizable by free radical polymerization is contemplated.

In some embodiments, the FRP curable material comprises at least one ethylenically unsaturated bond and may be monofunctional. A multifunctional compound comprising at least one ethylenically unsaturated bond such as a vinyl group is also possible.

In some embodiments, the FRP curable material does not substantially interfere with the activity of the ROMP catalyst or system, and in some embodiments, it is compatible with the ROMP monomer, for example, it does not affect phase separation.

In some embodiments, the FRP curable material is a polyfunctional isocyanate FRP curable material such as, but are not limited to, toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenylether, 4,4'-methylene bis(phenylene isocyanate) (MDI), durylene diisocyanate, tolylene diisocyanate, xylylene diisocyanate (XDI), 1,5-naphthalene diisocyanate, benzidine diisocyanate, o-nitrobenzidine diisocyanate, and 4,4'-diisocyanate dibenzyl, and other aromatic diisocyanate compounds; methylene diisocyanate, 1,4-tetramethylene diisocyanate, 1,6-hexamethylene diisocyanate, 1,10-decamethylene diisocyanate, and other aliphatic diisocyanate compounds; 4-cyclohexylene diisocyanate, 4,4'-methylene bis(cyclohexyl isocyanate), 1,5-tetrahydronaphthalene diisocyanate, isophoron diisocyanate, hydrated MDI, hydrated XDI, and other alicyclic diisocyanate compounds; etc. or polyurethane prepolymers obtained by reacting these diisocyanate compounds and low molecular weight polyols or polyamines to give isocyanate ends. These compounds may be used alone or in combination.

Additional examples of FRP curable materials include, but are not limited to, vinyl alcohol, allyl alcohol, oleyl alcohol, cis-13-dodecenol, and trans-9-octadecenol, and other unsaturated alcohols; norbornyl alcohol, 2-cyclohexen-1-ol, 2-cyclooctadien-1-ol, and p-vinyl phenol, and other alcohols which have an alicyclic structure; 2-hydroxyethyl acrylate, 2-hydroxyethyl methacrylate, 2-hydroxy-3-acryloxypropyl methacrylate, ethoxylated hydroxyethyl acrylate, ethoxylated hydroxyethyl methacrylate, polypropyleneglycol monomethacrylate, polypropyleneglycol monoacrylate, phenol acrylate, phenol methacrylate, bisphenol A type epoxy acrylate, novolac type epoxy acrylate, and brominated bisphenol A type epoxy acrylate, and other (meth)acrylics (meaning methacrylics or acrylics).

In some embodiments, the FRP curable material comprises a mixture of two or more FRP curable materials.

In some embodiments, the FRP curable material can be any one or more of vinyl aromatic compounds such as styrene, alpha-methylstyrene, para-methylstyrene, aminostyrene, hydroxystyrene, divinyl benzene, vinyl toluene; allyl compounds such as monoallyl esters and/or ethers and diallyl esters and/or ethers; vinyl ether and vinyl ester compounds such as vinyl benzoate; and (meth)acrylic compounds such as (meth)acrylic acids and their esters.

Suitable (meth)acrylic compounds include but are not limited to ethyleneglycol di(meth)acrylate, propanediol di(meth)acrylate, butanediol di(meth)acrylate, diethyleneglycol di(meth)acrylate, triethyleneglycol di(meth)acrylate, tetraethyleneglycol di(meth)acrylate, polyethyleneglycol di(meth)acrylate and other bifunctional compounds, as well as trimethylolpropane tri(meth)acrylate, trimethylolethane (tri)methacrylate, trimethylolpropanepropyleneoxide-modified tri (meth)acrylate and other trifunctional compounds.

In some embodiments, the FRP curable material may be or comprise an oligomer of a polymer. Exemplary such FRP curable materials include a polyester and/or vinyl ester resin. Saturated and unsaturated polyesters are suitable, whereby preferred examples of saturated polyesters include those based on bis(2-hydroxyethyl) terephthalate monomer units. This monomer is suitably synthesized by an esterification reaction between terephthalic acid and ethylene glycol, or by transesterification reaction between ethylene glycol and dimethyl terephthalate.

Suitable unsaturated polyester resins comprise ethylenically unsaturated carbon-carbon bonds in conjugation with a carbonyl bond and preferably comprise fumaric and/or maleic acid building blocks. This class of materials includes ortho-resins, based on phthalic anhydride, maleic anhydride or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A; iso-resins prepared from isophthalic acid, maleic anhydride or fumaric acid, and glycols, and Bisphenol-A-fumarates, based on ethoxylated bisphenol-A and fumaric acid.

In some of any of the embodiments described herein, the FRP curable material is such that is chemically compatible with (e.g., does not affect the activity of) a catalyst or any component of a catalyst system of the ROMP system.

The FRP Curing Agent (Component (D)):

In some of any of the embodiments described herein, the FRP curing agent is a thermally-activatable curing agent, which comprises at least one radical initiator which is thermally-activatable and/or at least one co-initiator that is thermally-activatable.

In some of any of the embodiments described herein, the FRP curing agent is selected by a half-life at the first temperature (CT) as described herein.

In some of any of the embodiments described herein, the FRP curing agent is characterized by a one minute half-life temperature as described herein.

Suitable curing agents in the curing system may include a radical source such as a peroxide, a hydroperoxide, a diazo compound, a perester and/or a perketone compound, including cyclic and linear compounds. A linear (hydro) peroxide is particularly preferred as curing agent.

Suitable peroxides include but are not limited to alkylperoxides, arylperoxides, and aralkyl or alkaryl peroxides. Secondary and tertiary aliphatic and aromatic hydroperoxides, such as tert-butyl hydroperoxide, tert-amyl hydroperoxide, and cumene hydroperoxide, are particularly preferred. Suitable organic peroxides further comprise t-butyl hydroperoxide, p-menthane hydroperoxide, cumen hydroperoxide, and other hydroperoxides; dicumyl peroxide, t-butylcumyl peroxide, $\alpha,\alpha'$-bis(t-butylperoxy-m-isopropyl)benzene, di-t-butyl peroxide, 2,5-dimethyl-2,5-di(t-butylperoxy)-3-hexine, 2,5-dimethyl-2,5-di(t-butylperoxy)hexane, and other dialkyl peroxides; dipropionyl peroxide, benzoyl peroxide, and other diacyl peroxides; 2,2-di (t-butyl peroxy) butane, 1,1-di(t-hexylperoxy)cyclohexane, 1,1-di(t-butylperoxy)-2-methylcyclohexane, 1,1-di(t-butylperoxy)cyclohexane, and other peroxy ketals; t-butyl peroxyacetate, t-butyl peroxybenzoate, and other peroxy esters; t-butyl peroxyisopropyl carbonate, di(isopropylperoxy)dicarbonate, and other peroxy carbonates; t-butyltrimethylsilyl peroxide and other alkylsilyl peroxides; 3,3,5,7,7-pentamethyl-1,2,4-trioxepane, 3,6,9-triethyl-3,6,9-trimethyl-1,4,7-triperoxonane, 3,6-diethyl-3,6-dimethyl-1,2,4,5-tetraxane, and other cyclic peroxides. Among these, dialkyl peroxides, peroxy ketals, and cyclic peroxides are preferable due to inactivity towards ROMP components.

Suitable diazo compounds may comprise 4,4'-bisazidebenzal(4-methyl)cyclohexanone, 2, 6-bis (4'-azidobenzal) cyclohexanone, and others.

The FRP curing system may further comprise FRP inhibitors (also referred to herein as retardants, or FRP retardants), such as alkoxyphenols, catechols, and benzoquinones.

The curing system may further comprise any other radical initiators, other than thermally-activatable radical initiators, such as, for example, free-radical photoinitiators, as described herein.

A free-radical photoinitiator may be any compound that produces a free radical on exposure to radiation such as ultraviolet or visible radiation and thereby initiates the FRP reaction. Non-limiting examples of photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, and bisacylphosphine oxide (BAPO's).

In some embodiments, when a free-radical photoinitiator is used, a FRP inducing condition comprises radiation. In some of these embodiments, the method comprises exposing the dispensed formulation(s) to a suitable radiation, and this exposing is effected only subsequent to the first time period.

In some embodiments, the curing system comprises electron beam radiation, and does not require a free-radical initiator. If such a curing system is used, the method comprises exposing the dispensed formulation(s) to electron beam radiation, and this exposing is effected only subsequent to the first time period.

Exemplary FRP Systems:

Table II below presents exemplary FRP curable materials which are usable in the context of the present embodiments.

TABLE II

| Tradename | Structure | Supplier | |
|---|---|---|---|
| 2-hydroxyethyl methacrylate (HEMA) | | Sigma Aldrich | Acrylic monomer |
| hydroxypropyl methacrylate (HPMA) | | Sigma Aldrich | Acrylic monomer |
| dihydrocyclopentadienyl acrylate (DCPA) | | | Acrylic monomer |
| SR351 | trimethylolpropane triacrylate (TMPTA)- | Sartomer | Acrylic monomer |
| SR238 | 1,6-hexanediol acrylate (HDDA) | Sartomer | Acrylic monomer |
| SR833S | tricyclodecane dimethanol diacrylate(TCDDMDA)- | Sartomer | Acrylic monomer |
| SR421A | ,3,5 trimethyl cyclohexanol methacrylate (TMCHMA)- | Sartomer | Acrylic monomer |
| SR423D | exo-1,7,7-trimethylbicyclo(2,2,1)hept-2-yle methacrylate | Sartomer | Acrylic monomer |
| SR350D | trimethylolpropane trimethacrylate (TMPTMA)- | Sartomer | Acrylic monomer |

Exemplary radical initiators which are suitable for forming a curing agent according to some of the present embodiments, optionally in combination with the FRP curable materials in Table II, include dibenzoyl peroxide, tert-butyl peroxide, t-butyl-(3,5,5-trimethylperoxyhexanoate), and Azobisisobutyronitrile (AIBN).

The Modeling Material Formulations:

According to some of any of the embodiments described herein, the building material comprises one or more modeling material formulations which, upon being dispensed, can undergo a ROMP reaction.

According to some of any of the embodiments described herein, the building material comprises one or more modeling material formulations which form a ROMP system as described herein.

As is known in the art and discussed briefly hereinabove, ROMP reactions typically require a catalyst for initiating the polymerization reaction. As further discussed herein, once an active catalyst contacts a ROMP monomer, the polymerization reaction typically starts immediately, sometime without application of a curing energy, and hence modeling material formulations in which an active catalyst, as described herein, is utilized "as is", are inapplicable for 3D inkjet printing.

Embodiments of the present invention therefore relate to modeling material formulations which are designed such that, prior to exposure to a suitable condition, the ROMP system is inactive, that is a ROMP catalyst does not initiate ROMP of the monomer, and a ROMP monomer does not polymerize via ROMP to provide a respective polymer, as described herein.

Embodiments of the present invention therefore relate to modeling material formulations which are designed such that, prior to exposure to a suitable condition, the catalyst does not initiate the ROMP reaction, that is, prior to exposure to a suitable condition, at least 50%, preferably at least 60%, preferably at least 70%, at least 80%, at least 90%, at least 95% and even 100% of the ROMP monomers do not undergo polymerization. In other words, prior to exposure of a ROMP system to a suitable condition, no more than 40% or no more than 30% or no more than 20% or no more than 10% or no more than 5% of the monomer polymerizes via ROMP mechanism to provide a respective polymer.

Such modeling material formulations are characterized by a viscosity of no more than 35 centipoises, or no more than 25 centipoises at a temperature of the inkjet printing head during the dispensing.

In some embodiments, such modeling material formulations are characterized by the indicated viscosity at a temperature lower than 70° C., or lower than 65° C., or lower than 60° C., or lower than 50° C., or lower than 40° C., or lower than 30° C., and even at room temperature (e.g., 25° C.). Such a viscosity is indicative of the presence (e.g., of more than 80%) of non-polymerizable ROMP monomers in the formulation, or of the absence (e.g., less than 20% of the formulation) of polymeric materials obtained by ROMP in the formulation.

The modeling material formulations described herein are therefore designed such that ROMP of the ROMP monomers is not effected when the formulations pass through the inkjet printing heads.

Embodiments of the present invention further relate to modeling material formulations which are designed such that, upon exposure to a suitable condition (an inducing condition as described herein), the ROMP system becomes active, that is a ROMP catalyst is active towards ROMP of the monomer, and a ROMP monomer undergo polymerization via ROMP to provide a respective polymer.

Embodiments of the present invention relate to modeling material formulations which are designed such that, upon exposure to a suitable condition, the catalyst initiates the ROMP reaction, that is, upon exposure to a suitable condition, at least 50%, preferably at least 60%, preferably at least 70%, at least 80%, at least 90%, at least 95% and even 100% of the ROMP monomers undergo polymerization via ROMP reaction.

In some of any of the embodiments described herein, the building material comprises one (single) type of a modeling material formulation. Such embodiments are also referred to herein as "single jetting" methodology or approach.

In some of any of the embodiments described herein, the building material comprises two or more types of a modeling material formulation. Such embodiments are also referred to herein as "dual jetting" or "multi jetting" methodology or approach, respectively.

In any of the present embodiments, the modeling material formulations comprise in addition to ROMP monomers, FRP curable materials. Such embodiments are also referred to herein as "multi-curing" or "dual curing".

Generally, in the above terminology, "jetting" refers to the number of modeling material formulations included in the building material, and "curing" refers to the number of polymerization reactions that occur when the dispensed layers are exposed to a curing condition (e.g., a ROMP inducing condition and a FRP inducing condition as described herein).

It is to be noted that dual curing or multi curing refers herein to the type of polymerization reactions and not to the number of conditions applied for inducing curing.

"Single Jetting" Modeling Material Formulation:

According to some of any of the embodiments described herein, the building material comprises a single modeling material formulation, and the single modeling material comprises all the components of a ROMP system, as described herein in any of the respective embodiments.

In some of these embodiments, the ROMP system consists of a ROMP monomer as described herein and an active catalyst, as defined herein. According to these embodiments, the modeling material formulation comprises a ROMP catalyst and a ROMP monomer, and is such that the catalyst is active towards initiating ROMP of the monomer. The ROMP system in the modeling material formulation, according to these embodiments is an active ROMP system, in which the ROMP catalyst initiates ROMP of the monomer when the catalyst contacts the monomer.

According to some of these embodiments, the active catalyst and the ROMP monomer are physically separated in the modeling material formulation, such that no contact is effected between the catalyst and the ROMP monomer and hence the ROMP system is inactive, and the catalyst does not initiate ROMP of the monomer, as described herein. In these embodiments, the ROMP system is inactive in the modeling material formulation due to physical separation between the catalyst and the ROMP monomer.

According to some of these embodiments, the ROMP system becomes active once the physical separation is removed. Hence, in some embodiments, the condition is removal of the physical separation between the catalyst and the ROMP monomer. The physical separation results in a contact between the catalyst and the ROMP monomer and in an active ROMP system in which the catalyst initiates ROMP of the monomer.

In some embodiments, exposing the modeling material formulation to a condition for inducing initiation of ROMP of the monomer by the catalyst comprises removal of a physical separation between a ROMP catalyst and the ROMP monomer.

Physical separation can be effected, for example, by encapsulation of one or more components of the ROMP system.

By "encapsulation" it is meant that a component is enveloped by a capsule, whereby a capsule is used herein to describe a closed structure by which a component is enveloped. In some embodiments, the capsule has a core-shell structure in which the core is the encapsulated component which is enveloped by a shell.

Herein, the terms "physically separated" and "encapsulated" or "physical separation" and "encapsulation" are sometimes used interchangeably, for simplicity.

In some embodiments one of the catalyst and the ROMP monomer is encapsulated and the other is not encapsulated. In some embodiments, each of the ROMP monomer and ROMP catalyst is individually encapsulated (enveloped by a capsule). The capsules encapsulating the ROMP monomer can be the same as or different from the capsules encapsulating the ROMP catalyst.

The capsule may have any shape and can be made of any material.

In some embodiments, the capsule is designed so as to release its content, namely, the encapsulated ROMP component (ROMP monomer or ROMP catalyst) upon being exposed to a condition.

In some embodiments, exposure to a condition that induces initiation of ROMP monomer by the ROMP catalyst comprises exposure to a condition that affects release of a ROMP component from a capsule. That is, the ROMP including condition is a condition that degrades a capsule and results in contacting the catalyst with the ROMP monomer.

In some embodiments, the release of a ROMP component from a capsule is effected by exposure to a condition that affects degradation of the capsule.

Degradation of the capsule can be effected, for example, mechanically, so as to affect rupture or breaking of the capsule, and the condition is such that causes mechanical degradation of the capsule.

The mechanical degradation can be effected, for example, by application of mechanical forces such as shear forces.

In some embodiments, mechanical degradation is effected by exposing the capsule to shear forces, for example, by passing a modeling material formulation comprising the capsule through one or more inkjet printing heads (e.g., Ricoh Gen 3) which allow jetting at a frequency range of from about 10 kHz to about 30 kHz.

Alternatively, shear forces at such a rate are applied to the dispensed layers of the formulation (e.g., to the receiving tray).

Degradation of the capsule can be effected, for example, physically or chemically, by application of, for example, heat or radiation to the capsule so as to decompose capsule or melt the capsule's shell.

Degradation of the capsule can thus be effected by exposing the capsule to heat or radiation, to thereby release its content.

Non-limiting examples for encapsulation of a ROMP catalyst and/or a ROMP monomer include utilizing capsules made of, for example, wax, degradable polymeric materials, degradable micelles, sol-gel matrices, and/or clays. Exemplary degradable capsules are described, for example, in Adv. Funct. Mater. 2008, 18, 44-52; Adv. Mater. 2005, 17, 39-42; and Pastine, S. J.; Okawa, D.; Zettl, A.; Fréchet, J. M. J. J. Am. Chem. Soc. 2009, 131, 13586-13587. doi:10.1021/ja905378v; all of which are incorporated by reference as if fully set forth herein.

In some embodiments, one or more of the ROMP catalyst (e.g., an active catalyst) and a ROMP monomer is encapsulated (e.g., individually encapsulated, in case both are encapsulated) in a capsule and exposing a modeling material formulation to the inducing condition comprises passing the formulation through the inkjet printing heads at a shear rate that causes mechanical degradation of the capsule and release on the encapsulated component.

In some embodiments, one or more of the ROMP catalyst (e.g., an active catalyst) and a ROMP monomer is encapsulated (e.g., individually encapsulated, in case both are encapsulated) in a capsule and exposing a modeling material formulation to the inducing condition comprises exposing the dispensed formulation to heat or radiation to thereby cause degradation of the capsule and release the encapsulated component from the capsule.

In some of any of the embodiments described herein, the formulation comprises a plurality of capsules encapsulating one or both of the ROMP components. The capsules can be the same or different and can release their content when exposed to the same or different inducing condition.

In some of any of the embodiments described herein, the modeling material formulation comprises a ROMP catalyst and a ROMP monomer, and is such that the catalyst is inactive towards initiating ROMP of the monomer upon exposure to the condition.

In these embodiments, the ROMP system consists of a ROMP monomer as described herein and a latent catalyst, as defined herein, and a condition for activating the catalyst. According to these embodiments, prior to exposing the formulation to the inducing condition, the catalyst is inactive towards initiation of ROMP of the monomer, as explained hereinabove for a latent catalyst. The modeling material formulation, prior to exposure to the condition, is an inactive ROMP system, as described herein.

In some of these embodiments, the latent catalyst is photo-activatable by, for example, exposure to radiation, as described herein, and in some embodiments the latent catalyst is thermally-activatable by, for example, exposure to heat, as described herein.

In some of any of these embodiments, exposing the modeling material formulation to the inducing condition comprises exposing the formulation to heat or radiation or to any other condition that activates the catalyst, namely, converting a latent catalyst into an active catalyst.

In some of any of the embodiments described herein for the latent catalyst, the latent catalyst can be physically separated from the ROMP monomer, according to any one of the respective embodiments described herein for physical separation of an active catalyst.

In some of any of the embodiments described herein, the ROMP system comprises a ROMP monomer as described herein, and a catalyst system that comprises a pre-catalyst, as defined herein, and an activator (co-catalyst) for chemically activating the catalyst.

In some of these embodiments, the ROMP system consists of a ROMP monomer as described herein, and a catalyst system that comprises a pre-catalyst, as defined herein, and an activator (co-catalyst) for chemically activating the catalyst. In such a system, the activator chemically activates the catalyst, once it contacts the catalyst and the catalyst initiates the ROMP, once it contacts the ROMP monomer, without a stimulus.

In some of these embodiments, the activator is chemically active, that is, is capable of chemically-activating the catalyst, which in turn, becomes active towards initiation of the ROMP. In these embodiments, the ROMP system in the modeling material formulation is active.

In some of these embodiments, the ROMP system is rendered inactive by physical separation between at least two of its reactive components.

In some of these embodiments, when the activator is active in the formulation, the activator is physically separated from the catalyst (e.g., the pre-catalyst) and/or the ROMP monomer in the modeling material formulation. That is, the modeling material formulation is such that there is no contact between the activator and the catalyst, or between the activator and the monomer, or between the catalyst and the monomer, or between the activator and the catalyst and the monomer. Because at least two of the ROMP components composing the active ROMP system according to these embodiments do not contact one another, the ROMP system is inactive.

According to some of these embodiments, the inducing condition renders the ROMP system active, at least by removing the physical separation and allowing contact between all the components composing the ROMP system.

According to some of these embodiments, the inducing condition is, or comprises, removing the physical separation between the activator and the catalyst (e.g., the pre-catalyst) and/or the monomer.

In some of these embodiments, the physical separation is effected by encapsulation, that is, by using a capsule (or a plurality of capsules) enveloping one or more of the catalyst, the activator and the monomer.

The capsules can be capsules individually encapsulating the activator, capsules individually encapsulating the ROMP monomer, capsules individually encapsulating the pre-catalyst, or any combination thereof.

The capsules can alternatively comprise capsules encapsulating a ROMP monomer and the activator, or capsules encapsulating a ROMP monomer and a catalyst, or capsules encapsulating an activator and a catalyst. The ROMP component not included in such capsules can be individually encapsulated, or non-encapsulated, in the modeling material formulation.

In some of any of these embodiments, the capsule is such that release the ROMP component(s) encapsulated therein upon exposure to a condition. In some embodiments, exposing the modeling material to the ROMP inducing condition comprises exposing the formulation to a condition that affects a release of one or more of the ROMP components from a capsule encapsulating same and results in a contact between all the reactive components of the ROMP system.

Any of the embodiments described herein for degradable capsules are contemplated for the embodiments pertaining to a modeling material formulation that comprises a pre-catalyst and an active activator, as described herein.

In some embodiments, the activator is enveloped by a degradable capsule and is released from the capsule upon exposure to a condition that affects degradation of the capsule and hence release of the activator.

In some of any of these embodiments, the ROMP inducing condition allows contacting between the activator and the pre-catalyst, to thereby generate an active catalyst, which in turn, contacts the ROMP monomer and initiates ROMP of the monomer.

In some of any of the embodiments described herein, the ROMP system comprises a ROMP monomer as described herein, and a catalyst system that comprises a pre-catalyst, as defined herein, a latent activator (latent co-catalyst) for chemically activating the catalyst, and a condition for activating the activator towards chemically activating the catalyst.

In such a system, the activator chemically activates the catalyst and the catalyst initiates the ROMP upon exposure to the condition.

According to these embodiments, prior to exposing the formulation to the ROMP inducing condition, the activator is inactive towards activating the catalyst (the activator is incapable of chemically activating the catalyst), and hence the catalyst is inactive towards initiation of ROMP of the monomer, as explained hereinabove for a latent activator in an activator-pre-catalyst system. According to these embodiments, the modeling material formulation comprises a ROMP pre-catalyst, a ROMP monomer, and a latent activator of the catalyst, and is such that the activator is activatable towards activating the catalyst and the pre-catalyst is convertible to an active catalyst for initiating ROMP of the monomer, upon exposure to the condition. The modeling material formulation, prior to exposure to the condition, is an inactive ROMP system, as described herein. The ROMP system is activated upon exposure to a condition that activates the latent activator.

In some of these embodiments, the latent activator is photo-activatable by, for example, exposure to radiation, as described herein, and in some embodiments the latent activator is thermally-activatable by, for example, exposure to heat, as described herein.

In some of any of these embodiments, exposing the modeling material formulation to the ROMP inducing condition comprises exposing the formulation to heat or radiation or to any other condition that activates the activator, namely, converting a latent activator into an active activator, to thereby chemically activating the catalyst towards initiating ROMP of the ROMP monomer.

According to these embodiments, the ROMP inducing condition comprises a condition that converts a latent activator to an active activator.

In some of any of the embodiments described herein for a latent activator, one or more of the pre-catalyst, the latent activator and the ROMP monomer can be physically separated in the composition, as described herein in any of the embodiments pertaining to an active activator.

In some of any of the embodiments described herein for single jetting methodology, any combination of the respective embodiments is contemplated.

In exemplary embodiments, a ROMP monomer is encapsulated, a pre-catalyst is encapsulated, and the activator is a latent activator as described herein, and can be encapsulated or not.

In other exemplary embodiments, a latent catalyst is used, and is encapsulated. In some of these embodiments, the ROMP monomer can be encapsulated or not.

In other exemplary embodiments, a latent catalyst is used, and is encapsulated or not, and the ROMP monomer is encapsulated.

In some of any of the embodiments described herein, converting a ROMP system to an active ROMP system is effected by two or more conditions. For example, when one or more the ROMP component is encapsulated and one of the catalyst and the activator is latent, exposure to one condition releases the ROMP component from the capsule and exposure to another condition activates the latent component. According to these embodiments, the ROMP inducing condition comprises a set of conditions and exposing the formulation to these conditions can be effected simultaneously or sequentially. In exemplary embodiments, exposure to one condition is effected by passing the formulation through the inkjet printing heads (application of shear forces to degrade a capsule) and exposure to another condition is application of radiation.

In some of any of the embodiments described herein, converting a ROMP system to an active ROMP system is effected by a single condition. For example, a latent catalyst which is photoactivatable can be used in combination with a ROMP monomer that is encapsulated by photodegradable capsules (which undergo degradation upon exposure to radiation such as UV radiation). In another example, a pre-catalyst and/or a ROMP monomer are encapsulated in photodegradable capsules and a latent activator that is photoactivatable is used. In such embodiments, and similar embodiments, a UV-activatable ROMP system is provided in the modeling material formulation.

In additional exemplary embodiments, a latent catalyst which is thermally-activatable can be used in combination with a ROMP monomer that is encapsulated by thermally-degradable capsules (which undergo degradation upon exposure to heat). In another example, a pre-catalyst and/or a ROMP monomer are encapsulated in thermally-degradable capsules and a latent activator that is thermally-activatable is used. In such embodiments, and similar embodiments, a thermally-activatable ROMP system is provided in the modeling material formulation.

In some of any of the embodiments described herein, the modeling material can further comprise a ROMP inhibitor, as described herein.

In some of any of the embodiments described herein, the modeling material formulation can comprise, in addition to the ROMP components, additional, non-curable (non-reactive) materials, as described in further detail hereinunder.

In some of any of the embodiments described herein, one or more of the components FRP curable system (e.g., a FRP curable material and/or a FRP curing agent) and/or one or more of the ROMP components in the modeling material formulation is/are physically separated from the other components in the formulation.

In some of these embodiments, one or more of the ROMP components, e.g., a ROMP monomer, a ROMP active catalyst, a ROMP latent catalyst, a ROMP pre-catalyst and/or a ROMP activator (latent or not), if present, is physically separated from other components in the modeling material formulation.

Alternatively, or in addition, one or more of the FRP curable system, e.g., a FRP curable material and/or a respective initiator, curing agent and/or activator, is physically separated from other components in the modeling material formulation.

In some of any of these embodiments, the physical separation can be, for example, by means of a capsule enveloping the component, and the capsule is such that releases the enveloped component upon exposure to the condition that induced curing (a ROMP inducing condition and/or a FRP inducing condition).

The capsule and corresponding conditions for releasing an enveloped component and thereby initiating curing, can be in accordance with any of the embodiments described herein for a ROMP system.

In embodiments where two or components are individually encapsulated, the capsules can be degradable upon exposure to the same or different condition for initiating curing.

In a non-limiting example, a modeling material formulation can comprise a ROMP monomer, a ROMP active catalyst, a FRP curable material and a FRP curing agent (e.g., thermally-activatable), whereby the ROMP active catalyst is encapsulated.

In another example, a modeling material formulation can comprise a ROMP monomer, a ROMP latent or active catalyst, a FRP curable monomer and a FRP curing agent (e.g., thermally-activatable), whereby the ROMP latent catalyst and the FRP initiator are individually encapsulated. The capsules of the ROMP catalyst and the FRP initiator can be the same or different, and the condition for degrading the capsules and releasing the encapsulated component can be the same or different.

Any other combinations of encapsulated and non-encapsulated components are contemplated.

In some of any of the embodiments described herein, the FRP curing agent comprises at least one thermally-activatable radical initiator, as described herein.

In some of any of the embodiments described herein, the FRP initiator is activatable by a co-initiator (an activator), as described herein. In some of these embodiments, the modeling material formulation further comprises such a co-initiator. The co-initiator in the formulation can be a latent co-initiator which is activatable upon exposure to a curing condition (e.g., a thermally-activatable co-initiator, as described herein). The co-initiator can alternatively physically separated, as described herein, from other components in the formulation. The co-initiator, latent or not, can be the same activator that chemically activates a ROMP pre-catalyst or can be a different activator.

In some of any of the embodiments described herein, the FRP curable system is a thermally-activatable system, which undergoes polymerization and/or curing upon exposure to heat as a curing condition.

In some of these embodiments, the ROMP system in the formulation is a thermally-activatable system, as described herein.

In some of any of the embodiments of a single jetting as described herein, the ROMP components and the FRP components are preferably selected to be chemically compatible with one another.

"Multi-Jetting" (e.g., Dual Jetting) Modeling Material Formulations (Formulation Systems):

In some of any of the embodiments described herein, the building material comprises two or more modeling material formulations which are dispensed from different inkjet printing heads (each formulation is jetted from a different printing head or a different set of printing heads) to form the layers.

Such a methodology, which is referred to herein as dual jetting, when two different modeling material formulations are used, or as multi-jetting, when more than two modeling material formulations are used, allows dispensing modeling material formulations which are absent of one or more of the components required for a polymerization or curing to occur, whereby when the formulations are dispensed and contact one another, curing and/or polymerization occurs.

In the context of some of the present embodiments, such a methodology allows separating ROMP components as described herein by including a different combination of components in each formulation, whereby none of the formulations comprises all the components required for the ROMP reaction to occur. According to these embodiments, a ROMP reaction, and optionally FRP reaction or other non-ROMP reactions, occur only on the receiving medium, and after the building material is dispensed.

In some of these embodiments, exposing the formulation to a condition for initiating ROMP can be effected by contacting the different formulations on the receiving medium (receiving tray). In some of these embodiments, exposing to a ROMP inducing condition is effected by dispensing the formulations.

Connex 3™ (Stratasys Ltd., Israel) multiple material deposition technology, is an exemplary technology that provides the possibility to separate the components of a polymerizable or curable system into different formulations. Objet Connex 3™ (Stratasys Ltd., Israel) multiple material deposition system, is a system that allows utilizing such a technology.

In some of any of these embodiments, the building material comprises two or more modeling material formulations, and the two or more modeling material formulations are such that when combined, curing is effected at least by a ROMP reaction and a FRP reaction, as defined herein. These embodiments are referred to herein as dual jetting dual curing or multi-jetting multi-curing methodology.

In some of any of these embodiments, the building material comprises two or more modeling material formulations, and the two or more modeling material formulations are such that when combined, ROMP reaction is effected.

In some of these embodiments, one or both modeling material formulations comprises a ROMP monomer (which can be the same or different).

In some of any of the embodiments pertaining to multi-jetting single curing, any of the ROMP systems described hereinabove for single-jetting can be used, whereby a different combination of the ROMP components of a respective system is included in each of the modeling material formulations.

In some of any of the embodiments described herein, converting the ROMP system or systems to active ROMP systems is effected by a single condition. For example, in some embodiments, activating of a latent catalyst, if present in one or more of the formulations, of a latent activator, if present in one or more of the formulations, and/or release of one or more components that are encapsulated (e.g., degradation of capsules enveloping a ROMP component, if present in one or more of the formulations, are all effected upon exposing the dispensed formulations to the same condition. The condition can be, for example, radiation (e.g., UV radiation), such that the ROMP system or systems in the two or more modeling material formulations is/are photoactivatable. The condition can be, for example, heat, such that the ROMP system or systems in the two or more modeling material formulations is/are thermally-activatable.

In some of any of these embodiments, the ROMP components can include one or more ROMP monomers and one or more catalysts, for example, active catalysts.

In some of the embodiments when an active catalyst is used, the active catalyst is included in a modeling material formulation that is devoid of a ROMP monomer, and which, in some embodiments, comprises a FRP curable material as described herein.

In some of the embodiments when a ROMP active catalyst is used, one or more of the modeling material formulations comprises a ROMP monomer or monomers, and is devoid of a ROMP catalyst, and other one or more modeling material formulation comprises a ROMP catalyst which is an active catalyst, and is devoid of a ROMP monomer.

Alternatively, in any one of these embodiments, the ROMP catalyst is a latent catalyst.

Further alternatively, in any one of these embodiments, the ROMP catalyst is physically separated from the other components in the formulation containing same. Physical separation can be effected by means of degradable capsules, as described herein.

In any one of the embodiments when a ROMP latent catalyst is used, the inducing condition comprises a condition which activates the catalyst, as described herein.

In any one of the embodiments when an encapsulated ROMP catalyst is used, the inducing condition comprises a condition which degrades the capsule so as to release the active catalyst.

Alternatively, in any one of these embodiments, the ROMP catalyst is a pre-catalyst and the one or more of the modeling material formulations comprises an activator or a latent activator, as described herein.

In some of these embodiments, one or more of the modeling material formulations comprise a ROMP monomer and a ROMP pre-catalyst and other one or more modeling material formulations comprise the ROMP activator. Alternatively, one or more of the modeling material formulations comprise a ROMP monomer and the ROMP activator and other one or more modeling material formulations comprise the pre-catalyst.

Whenever the ROMP activator is included in the formulation(s) as active towards chemically activating the pre-catalyst to provide an active ROMP catalyst, the inducing condition for effecting ROMP can be contacting the respective formulations on the receiving medium (tray). Thus exposing to the condition is effected by jetting the formulations by the inkjet printing heads (dispensing the layers of the formulations).

Further alternatively, one or more of the modeling material formulations comprise a ROMP monomer and other one or more modeling material formulations comprise the ROMP activator and the ROMP pre-catalyst. In some of these embodiments, the ROMP activator is a latent activator and/or one or both of the ROMP activator and the pre-catalyst are physically separated from one another, as described herein.

In any of the embodiments described herein, one or more of the modeling material formulations further comprises a FRP curable material.

In some of these embodiments, the FRP curable material is included in a formulation which comprises a ROMP catalyst (active, latent or pre-catalyst, encapsulated or non-encapsulated) and/or a ROMP activator (active or latent, encapsulated or non-encapsulated).

In some of these embodiments, one or more formulations comprise a ROMP monomer and one or more other formulations comprise a FRP curable material and a ROMP catalyst (active, latent or pre-catalyst, encapsulated or non-encapsulated) and/or a ROMP activator (active or latent, encapsulated or non-encapsulated), and is devoid of a ROMP monomer.

In exemplary embodiments of a dual jetting methodology, one modeling material formulation, formulation A, comprises a ROMP monomer and another modeling material formulation, formulation B comprises a FRP curable material. In some embodiments, formulation A further comprises a ROMP pre-catalyst (optionally encapsulated) and formulation B further comprises a ROMP activator (latent or not, encapsulated or non-encapsulated). In some embodiments, formulation A further comprises a ROMP activator (latent or not, optionally encapsulated) and formulation B further comprises a ROMP pre-catalyst (optionally encapsulated). In some embodiments, formulation B further comprises a ROMP catalyst (latent or active, optionally encapsulated). In some embodiments, formulation B further comprises a ROMP activator (latent or not, encapsulated or non-encapsulated) and a ROMP pre-catalyst (optionally encapsulated).

Other combinations are also contemplated.

In some of any of the embodiments described herein, one or more of the modeling material formulations, according to any one of the embodiments described herein and any combination thereof, further comprises a FRP curable agent or system.

In some of these embodiments, the curing agent is comprised in one or more modeling material formulations which are devoid of a FRP curable material. In some embodiments, one or more of the modeling material formulations comprise a ROMP monomer and a FRP curing agent. In some embodiments, such a formulation is devoid of one or more of the ROMP components of the ROMP system (e.g., a ROMP catalyst, activator, pre-catalyst).

In exemplary embodiments of a dual jetting methodology according to these embodiments, one modeling material formulation, formulation A, comprises a ROMP monomer and another modeling material formulation, formulation B comprises a FRP curable material. In some embodiments, formulation A further comprises a ROMP pre-catalyst (optionally encapsulated) and a FRP curing agent (latent or active, optionally encapsulated), and formulation B further comprises a ROMP activator (latent or not, encapsulated or non-encapsulated). In some embodiments, formulation A further comprises a ROMP activator (latent or not, optionally encapsulated) and a FRP curing agent (latent or active, optionally encapsulated), and formulation B further comprises a ROMP pre-catalyst (optionally encapsulated). In some embodiments, formulation A further comprises a FRP curing agent (latent or active, optionally encapsulated) and formulation B further comprises a ROMP catalyst (latent or active, optionally encapsulated). In some embodiments, formulation A further comprises a ROMP activator (latent or not, optionally encapsulated) and a FRP curing agent (latent or active, optionally encapsulated), and formulation B further comprises a ROMP activator (latent or not, encapsulated or non-encapsulated) and a ROMP pre-catalyst (optionally encapsulated).

Other combinations are also contemplated.

In some of any of the embodiments described herein, one or more of the modeling material formulation further comprises a ROMP inhibitor and/or a FRP inhibitor (retardant).

In some of any of the embodiments described herein, the method further comprises exposing the formulation to one or more conditions for inducing polymerization and/or curing of the FRP curable system, as described in detail hereinabove.

Further Embodiments:

In some of any of the embodiments described herein, a concentration of a curable material, including a ROMP monomer or a FRP curable material, in a modeling material formulation containing same ranges from about 20% to about 99% or from about 50% to about 99% by weight of the total weight of the modeling material formulation, including any subranges and intermediate values therebetween.

In some of these embodiments, a modeling material formulation comprises a single curable material, at the indicted concentration range.

In some of these embodiments, a modeling material formulation comprises two or more curable materials, and the total concentration of curable materials ranges from about 20% or from about 50% to about 99% by weight of the total weight of the formulation.

In some of any of the embodiments described herein, a concentration of additional reactive components in a curable system as described herein, including, for example, a ROMP catalyst, a ROMP activator, a non-ROMP initiator, a FRP activator (or co-initiator), in a modeling material formulation containing same individually ranges (for each component) from about 0.001% to about 10%, or from about 0.01% to 5% by weight of the total weight of the modeling material formulation, including any subranges and intermediate values therebetween.

In some embodiments, a concentration of a ROMP catalyst (active or latent) or a ROMP pre-catalyst in a modeling material formulation containing same independently ranges from about 0.001% to about 1%, or from about 0.001% to about 0.1% by weight of the total weight of the modeling material formulation, including any subranges and intermediate values therebetween.

In some embodiments, a concentration of a ROMP inhibitor in a modeling material formulation containing same independently ranges from about 0.001% to about 1%, or from about 0.001% to about 0.1% by weight of the total weight of the modeling material formulation, including any subranges and intermediate values therebetween.

In some embodiments, a concentration of a ROMP activator (active or latent) in a modeling material formulation containing same independently ranges from about 0.001% to about 5%, or from about 0.001% to about 1% by weight of the total weight of the modeling material formulation, including any subranges and intermediate values there between. In some of these embodiments, a modeling material formulation comprises a single reactive component, at the indicted concentration range.

In some of these embodiments, a modeling material formulation comprises two or more curable materials reactive components, and the total concentration of the reactive components materials ranges from about 0.001% to about 10% by weight of the total weight of the formulation, including any subranges and intermediate values therebetween.

In some embodiments, a concentration of a FRP curing agent or system in a modeling material formulation containing same independently ranges from about 0.001% to about 10%, or from about 0.01% to about 10%, or from about 0.1% to about 10%, or from about 0.1% to about 5% by weight of the total weight of the modeling material formulation, including any subranges and intermediate values therebetween.

Additional Curable Systems:

In some of any of the embodiments described herein, the one or more modeling material formulations comprises one or more additional curable systems.

In some of any of the embodiments described herein, the one or more additional curable systems is/are polymerizable or cured via cationic polymerization, and are referred to herein also as cationic polymerizable or cationic curable systems.

The curable components or materials of such systems undergo polymerization or curing via cationic polymerization.

Exemplary cationically polymerizable components include, but are not limited to, epoxy-containing materials (monomers or oligomers), caprolactams, caprolactones, oxetanes, and vinyl ethers (monomers or oligomers).

Non-limiting examples of epoxy-containing curable compounds include Bis-(3,4 cyclohexylmethyl) adipate, 3,4-epoxy cyclohexylmethyl-3,4-epoxycyclohexyl carboxylate, 1,2 epoxy-4-vinylcyclohexane, 1,2-epoxy hexadecane, 3,4-epoxy cyclohexylmethyl-3,4-epoxy cyclohexane carboxylate, which is available, for example, under the trade name UVACURE 1500 from Cytec Surface Specialties SA/NV (Belgium) and mono or multifunctional silicon epoxy resins such as PC 1000 which is available from Polyset Company (USA).

In some embodiments, a cationic polymerizable material is polymerizable or curable by exposure to radiation. Systems comprising such a material can be referred to as photo-polymerizable cationic systems, or photoactivatable cationic systems.

In some embodiments, a cationic curable system further comprises a cationic initiator, which produces cations for initiating the polymerization and/or curing.

In some embodiments, a condition for initiating cationic curing and/or polymerization comprises is a condition that induced cation generation by the initiator. The initiator in such cases is a latent initiator, which produces cations when exposed to the condition.

In some embodiments, the initiator is a cationic photoinitiator, which produces cations when exposed to radiation.

In some of any of the embodiments described herein for cationic curable systems, the radiation is UV radiation, and the system is a cationic UV-curable system.

Suitable cationic photoinitiators include, for example, compounds which form aprotic acids or Bronstead acids upon exposure to ultraviolet and/or visible light sufficient to initiate polymerization. The photoinitiator used may be a single compound, a mixture of two or more active compounds, or a combination of two or more different compounds, i.e. co-initiators. Non-limiting examples of suitable cationic photoinitiators include aryldiazonium salts, diaryliodonium salts, triarylsulphonium salts, triarylselenonium salts and the like. An exemplary cationic photoinitiator is a mixture of triarylsolfonium hexafluoroantimonate salts.

Non-limiting examples of suitable cationic photoinitiators include P-(octyloxyphenyl) phenyliodonium hexafluoroantimonate UVACURE 1600 from Cytec Company (USA), iodonium (4-methylphenyl)(4-(2-methylpropyl)phenyl)-hexafluorophosphate known as Irgacure 250 or Irgacure 270 available from Ciba Speciality Chemicals (Switzerland), mixed arylsulfonium hexafluoroantimonate salts known as UVI 6976 and 6992 available from Lambson Fine Chemicals (England), diaryliodonium hexafluoroantimonate known as PC 2506 available from Polyset Company (USA), (tolylcumyl) iodonium tetrakis (pentafluorophenyl) borate known as Rhodorsil® Photoinitiator 2074 available from Bluestar Silicones (USA), iodonium bis(4-dodecylphenyl)-(OC-6-11)-hexafluoro antimonate known as Tego PC 1466 from Evonik Industries AG (Germany).

In some of any of the embodiments described herein, the additional (e.g., non-ROMP) curable system is any other system that is usable in 3D-printing processes and systems.

Additional examples include, without limitation, systems based on polyurethane chemistry, in which isocyanate-containing compounds and hydroxyl-containing compounds (e.g., polyols) react via polycondensation in the presence of a catalyst and/or upon exposure to UV radiation,), thiol chemistry, in which mercaptopropionate-based curable materials polymerize when exposed to UV in the presence of a free-radical photoinitiator, and more.

In some of these embodiments, the systems are UV-curable, that is, the condition inducing curing is effected by exposure to UV radiation, as described herein.

In some of these embodiments, the systems are thermally-curable, that is, the condition inducing curing is effected by exposure to heat, as described herein.

In some of these embodiments, exposing to a curing condition suitable for these additional curable systems is effected subsequent to the first time period. In some embodiments, it is effected subsequent to the second time period.

Additional Materials:

In some of any of the embodiments described herein, a modeling material formulation can further comprise one or more additional materials, which are referred to herein also as non-reactive materials.

Such agents include, for example, surface active agents, stabilizers, antioxidants, fillers, pigments, dispersants, and/or toughening agents or toughness modifiers (e.g, impact modifying agents or impact modifiers).

In cases of multi-jetting methodologies, the non-reactive agents can be independently included in one or all of the modeling material formulations.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a modeling formulation comprises a surface active agent. A surface-active agent may be used to reduce the surface tension of the formulation to the value required for jetting or for printing process, which is typically from about 10 to about 50 dyne/cm. An exemplary such agent is a silicone surface additive.

Suitable stabilizers (stabilizing agents) include, for example, thermal stabilizers, which stabilize the formulation at high temperatures.

In some embodiments, the modeling formulation comprises one or more pigments. In some embodiments, the pigment's concentration is lower than 35%, or lower than 25% or lower than 15%, by weight.

The pigment may be a white pigment. The pigment may be an organic pigment or an inorganic pigment, or a metal pigment or a combination thereof.

In some embodiments the modeling formulation further comprises a dye.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

In some of any of the embodiments described herein, one or more of the modeling material formulations comprises a toughening agent.

The toughening agent, according to some embodiments, can be added to one or more (e.g., two) of the modeling material formulations.

The phrase "toughening agent" is also referred to herein as a "toughness modifying agent" or "toughness modifier" and encompasses one or more (e.g., a mixture of two or more) toughening agents and is used herein to describe agents that modify (e.g., improve) the toughness of a material containing same.

In some embodiments, the toughness is reflected by Impact resistance and/or tensile strength.

In some embodiments, a toughness modifying agent (a toughening agent) improves the Impact resistance and/or Tensile strength of a material containing same. In some embodiments, a toughness modifying agent (a toughening agent) improves the Impact resistance of a material containing. In some embodiments, a toughness modifying agent (a toughening agent) improves the Tensile strength of a material containing same. In some embodiments, a toughness modifying agent (a toughening agent) improves the Impact resistance and the Tensile strength of a material containing same.

The phrase "toughening agent" encompasses materials referred to herein as "Impact modifying agents" or "Impact modifiers".

According to some of any of the embodiments of the present invention, the toughening agent (e.g. Impact modifying agent) is an elastomeric material.

The phrase "elastomeric material" is also referred to herein and in the art interchangeably as "elastomer" and encompasses deformable, viscoelastic polymeric materials (typically co-polymers), including rubbers, liquid rubbers and rubbery-like materials. In some embodiments, an elastomeric material as described herein comprises saturated and/or unsaturated hydrocarbon chains, preferably long hydrocarbon chains of at least 20 carbon atoms in length. In some embodiments, the hydrocarbon chains do not include heteroatoms (e.g., oxygen, nitrogen, sulfur) interrupting the chain or forming a part of the substituents of the chain.

In some embodiments, by "hydrocarbon" it is meant herein a material containing one or more chains comprised mainly (e.g., 80%, or 85% or 90%, or 95%, or 100%) of carbon and hydrogen atoms, linked to one another. Exemplary hydrocarbons include one or more alkyl, cycloalkyl and/or aryl moieties covalently linked to one another in any order.

Non-limiting examples of toughening agents include elastomeric materials such as, but not limited to, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred agents are elastomers such as polybutadienes.

Toughening agents such as elastomeric materials can be added to the formulation by incorporating in one or more of the modeling material formulations an elastomeric material in a dispersed/dissolved phase.

According to some of any of the embodiments described herein, the elastomeric material is characterized by at least one, at least two, or all of the following:

featuring a molecular weight lower than 50,000, or lower than 40,000, or, preferably, lower than 30,000, or lower than 20,000, or lower than 10,000 Daltons;

being non-reactive towards ROMP;

being dissolvable or dispersible in the one or more modeling material formulation(s) containing same; and being capable of forming a multiphase (e.g., biphasic) structure when blended with the cured modeling material.

According to some of any of the embodiments described herein, the elastomeric material is dissolvable or dispersible in the modeling material formulation comprising same.

ROMP monomers and formulations containing same are typically hydrophobic. Therefore, in some embodiments, an elastomeric material which is dissolvable or dispersible in a modeling material formulation which comprises a ROMP monomer is hydrophobic, and thereby exhibits compatibility, and dissolvability or dispersibility in the ROMP monomer formulation, which has a hydrophobic nature.

According to some of any of the embodiments described herein, the elastomeric material is selected capable of forming a multiphase (e.g., biphasic) structure when blended with the cured modeling material.

As is known in the art, Impact resistance can be improved in case of a phase separation between the impact modifying agent and the polymeric matrix with which it is blended, namely, in case where there is a biphasic or multiphasic structure of the blend.

In some embodiments, an elastomeric material that is capable of forming a multiphase (e.g., biphasic) structure when blended with the cured modeling material can be regarded as non-soluble in the polymeric matrix formed upon exposing the modeling material formulation(s) to curing condition, namely, in the cured (or partially cured) modeling material.

According to some of any of the embodiments described herein, the elastomeric material is selected such that it is dissolvable or dispersible in the modeling material comprising same, and is further capable of forming a multiphase (e.g., biphasic) structure when blended with the cured modeling material.

In some of the embodiments pertaining to an elastomeric material that is capable of forming a multiphasic structure when blended with the cured modeling material, the ROMP monomer is or comprises a DCPD or a derivative thereof, as described herein.

According to some of any of the embodiments described herein, the elastomeric material is an impact modifying agent (Impact modifier).

It is to be noted that phase separation is not required for an Impact modifying agent to provide its effect in all cases. That is, when an elastomeric material is blended with a cured modeling material formed of a ROMP monomer-containing modeling material formulation(s), Impact resistance can be improved also when there is no phase separation (no biphasic or multiphasic structure is formed).

According to some of any of the embodiments described herein, the elastomeric material is non-reactive towards ROMP. By "non-reactive towards ROMP" it is meant that the elastomeric material does feature functional groups that can participate in ROMP. As known in the art, ROMP involves materials featuring unsaturated bonds. Accordingly, exemplary elastomeric materials which are non-reactive towards ROMP are saturated polymeric materials, namely, polymers and/or copolymers which do not comprise unsaturated bonds in their backbone chain. The pendant groups of such elastomeric materials may or may not comprise unsaturated bonds.

Elastomeric materials featuring a saturated backbone chain, namely, are devoid of unsaturated bonds in their backbone chain, are defined herein as "saturated" elastomeric materials.

In some of the embodiments pertaining to an elastomeric material that is non-reactive towards ROMP, the ROMP monomer is or comprises a DCPD or a derivative thereof, as described herein.

According to some embodiments of the present invention, the elastomeric material is a low molecular weight material, as defined herein, which is a saturated polymer or co-polymer.

According to some embodiments of the present invention, the elastomeric material is a low molecular weight material, as defined herein, which is hydrophobic.

According to some embodiments of the present invention, the elastomeric material is a low molecular weight material, as defined herein, which is a saturated polymer or co-polymer and which is further characterized as hydrophobic.

According to some of these embodiments the elastomeric material is further characterized as dissolvable or dispersible in the modeling material formulation containing same and optionally further as forming a biphasic structure with the cured modeling material.

Exemplary elastomeric materials suitable for use according to some of the present embodiments include, but are not limited to, low MW EPDM such as Trilene 67 (MW=37,000 Da) or Trilene 77 (MW=27,000 Da), liquid EPR elastomers such as Trilene CP80 (MW=23,000 Da) or Trilene CP1100 (MW=6600 Da), low MW polybutenes, low MW polyisoprenes, and the like. Preferred exemplary elastomeric materials include, but are not limited to, liquid EPR elastomers and polybutenes, having MW lower than 20,000 or lower than 12,000 Daltons.

According to some of any of the embodiments, a concentration of the toughening agent (e.g., an elastomeric material as described herein), if present, may range from about 0.1% to about 20%, or from about 1 to about 20%, or from about 1 to about 15%, or from about 1 to about 12%, or from about 1 to about 10%, or from about 2 to about 10%, or from about 2 to about 8%, by weight, of the total weight of a formulation containing same, including any intermediate values and subranges therebetween.

A concentration of the toughening agent (e.g. elastomeric materials), if present, may range from about 0.10 phr to about 10 phr, or from about 0.1 phr to about 5 phr, relative to the weight of the formulation containing same.

A concentration of the toughening agent (e.g. elastomeric material) may alternatively range from about 0.1% to about 20%, or from about 1% to about 20%, or from about 1% to about 20%, or from about 5% to about 15% or from about 5% to about 10%, by weight, of the total weight of a formulation containing same, including any intermediate values and subranges therebetween.

In some embodiments, each of the modeling material formulations comprises an elastomeric material, as described herein.

Other impact modifying agents, such as, for example, carbon fibers, carbon nanotubes, nanoparticles, glass fibers, aramid Keylar, polyparaphenylene benzobisoxazole Zylon, and other polar and non polar impact modifiers, are also contemplated as toughening agents as described herein.

Alternatively, or in addition, elastomeric materials other than the elastomeric materials described herein can be included. In some embodiments, a concentration of such elastomeric materials, if present, is lower than a concentration of the elastomeric materials described herein.

In some embodiments, one or more of the modeling material formulations comprises an antioxidant. In some embodiments, at least a modeling material formulation that comprises a ROMP catalyst comprises an anti-oxidant.

In some embodiments, one or more, or each, of the modeling material formulations comprises a proton donor. Proton donors are useful for accelerating the activation of a pre-catalyst by the activator, to thereby accelerate the ROMP reaction, in case such a catalyst is used. For example, a proton donor, when contacted with a chlorosilane activator as described herein generates HCl, which accelerates the activation of the pre-catalyst.

The proton donors can be reactive (curable) or non-reactive. Curable proton donors include, for example, ROMP monomers which bear acidic protons (e.g., hydroxy groups).

An exemplary proton donor is a hydroxy alkyl, for example, 1-butanol.

A concentration of the proton donor can range from about 0.1 to about 2%, by weight, of a modeling material formulation containing same, including any intermediate values and subranges therebetween. Table III below presents exemplary non-reactive components which are advantageously added to one or more modeling material formulations described herein.

TABLE III

| Trade name | Structure | Supplier | |
|---|---|---|---|
| Trilene CP1100 | Liquid EPR | Lion copolymer | Impact modifier |
| Trilene CP80 | Liquid EPR | Lion copolymer | Impact modifier |
| Trilene 77 | Liquid EPDM | Lion copolymer | Impact modifier |
| Trilene 67 | Liquid EPDM | Lion copolymer | Impact modifier |
| Trilene 65 | Liquid EPDM | Lion copolymer | Impact modifier |
| 2,4-pentandione | | Sigma Aldrich | Promoter |

TABLE III-continued

| Trade name | Structure | Supplier | |
|---|---|---|---|
| Cobalt (II) 2-ethylhexanoate | | Sigma Aldrich | accelerator |
| dimethylaminobenzen | | Sigma Aldrich | accelerator |
| Ethanox 702 | 4,4'-Methylenebis(2,6-di-tert-butylphenol) | Albemarle | Antioxidant, radical scavenger |
| BHT | 2,6-Bis(1,1-dimethylethyl)-4-methylphenol | Sigma Aldrich | Antioxidant, Radical scavenger |
| NIPOL 1312[1] | Liquid NBR | ZEON | Impact modifier |
| NIPOL 1312LV | Liquid NBR | ZEON | Impact modifier |
| NIPOL 1312[2] | Liquid NBR | ZEON | Impact modifier |

Kits:

According to some of any of the embodiments described herein, there are provided kits containing modeling material formulations as described herein.

In some embodiments, a kit comprises a modeling material formulation for use in a single jetting dual or multi-curing methodology, as described herein. The components of the modeling material formulations are packaged together in the kit and include at least a ROMP monomer or monomers, as described in any of the respective embodiments, a ROMP catalyst, which can be active or latent, or can be a system of a pre-catalyst and an activator (latent or active), a FRP curable material, and a FRP curing agent, as described herein in any of the respective embodiments.

In some embodiments, and in accordance with any of the respective embodiments described herein for multi jetting dual or multi-curing approach, one or more of the components in the kit can be physically separated from the other components (e.g., encapsulated, as described herein).

In some embodiments, a kit comprises a modeling material formulation for use in a dual or multi-jetting dual or multi-curing methodology, as described herein. The components of each of the modeling material formulations are packaged individually in the kit and include at least a ROMP monomer or monomers, as described in any of the respective embodiments, a ROMP catalyst, which can be active or latent, or can be a system of a pre-catalyst and an activator (latent or active), a FRP curable material and a FRP curing agent, as described herein in any of the respective embodiments.

In some embodiments, and in accordance with any of the respective embodiments described herein for dual or multi-jetting dual or multi-curing approach, one or more of the components in one or more formulations can be physically separated from the other components (e.g., encapsulated, as described herein) in a respective formulation.

In some of any of the embodiments described herein, the kit may further comprise additional, non-reactive components, as described herein.

In exemplary embodiments, each of the first and the second formulations as described herein is individually packaged in a suitable packaging material, preferably, an impermeable material (e.g., water- and gas-impermeable material), and further preferably an opaque material; and both formulations are packaged together in the kit. In some embodiments, the kit further comprises instructions to use the formulations in an additive manufacturing process, preferably a 3D inkjet printing process as described herein. The kit may further comprise instructions to use the formulations in the process in accordance with the method as described herein. In some embodiments, the kits include instructions to avoid contact between the first and second formulations at any stage before printing is effected (e.g., before the formulations are dispensed from the nozzles).

The Object:

According to an aspect of some embodiments of the present invention there is provided a three-dimensional object which comprises a polymeric material obtainable by ROMP of respective ROMP monomer or combination of ROMP monomers. In some embodiments, the 3D object further comprises a polymeric material obtainable by FRP of respective FRP curable material or combination of FRP curable materials.

In some of these embodiments, the 3D object is obtainable by 3D inkjet printing.

In some embodiments, the three-dimensional object fabricated by a 3D inkjet printing process is characterized by an impact resistance of at least 80 J/m, or at least 100 Jim.

Herein throughout and in the art, the phrase "impact resistance", which is also referred to interchangeably, herein and in the art, as "impact strength" or simply as "impact", describes the resistance of a material to fracture by a mechanical impact, and is expressed in terms of the amount of energy absorbed by the material before complete fracture. Impact resistance can be measured using, for example, the ASTM D256-06 standard Izod impact testing (also known as "Izod notched impact", or as "Izod impact"), and/or as described hereinunder, and is expressed as J/m.

In some embodiments, the object is characterized by heat deflection temperature (HDT) which is at least 50, at least 60, at least 60, at least 70, and even at least 80° C.

Herein throughout and in the art, the phrase "heat deflection temperature", or HDT, describes the temperature at which a specimen of cured material deforms under a specified load. Determination of HDT can be performed using the procedure outlined in ASTM D648-06/D648-07 and/or as described hereinunder.

In some embodiments, the object is characterized by Tg, as defined herein, of at least 140° C., or at least 150° C., or at least 160° C., or at least 170° C.

The fabrication of 3D objects by a 3D inkjet printing process is enabled by the use of ROMP systems, as described herein.

In some embodiments, the 3D object further comprises, in at least a part thereof, a material featuring antioxidation, for example, in a form of a layer deposited on the surface of the object or a part thereof as described herein.

Figure 2:
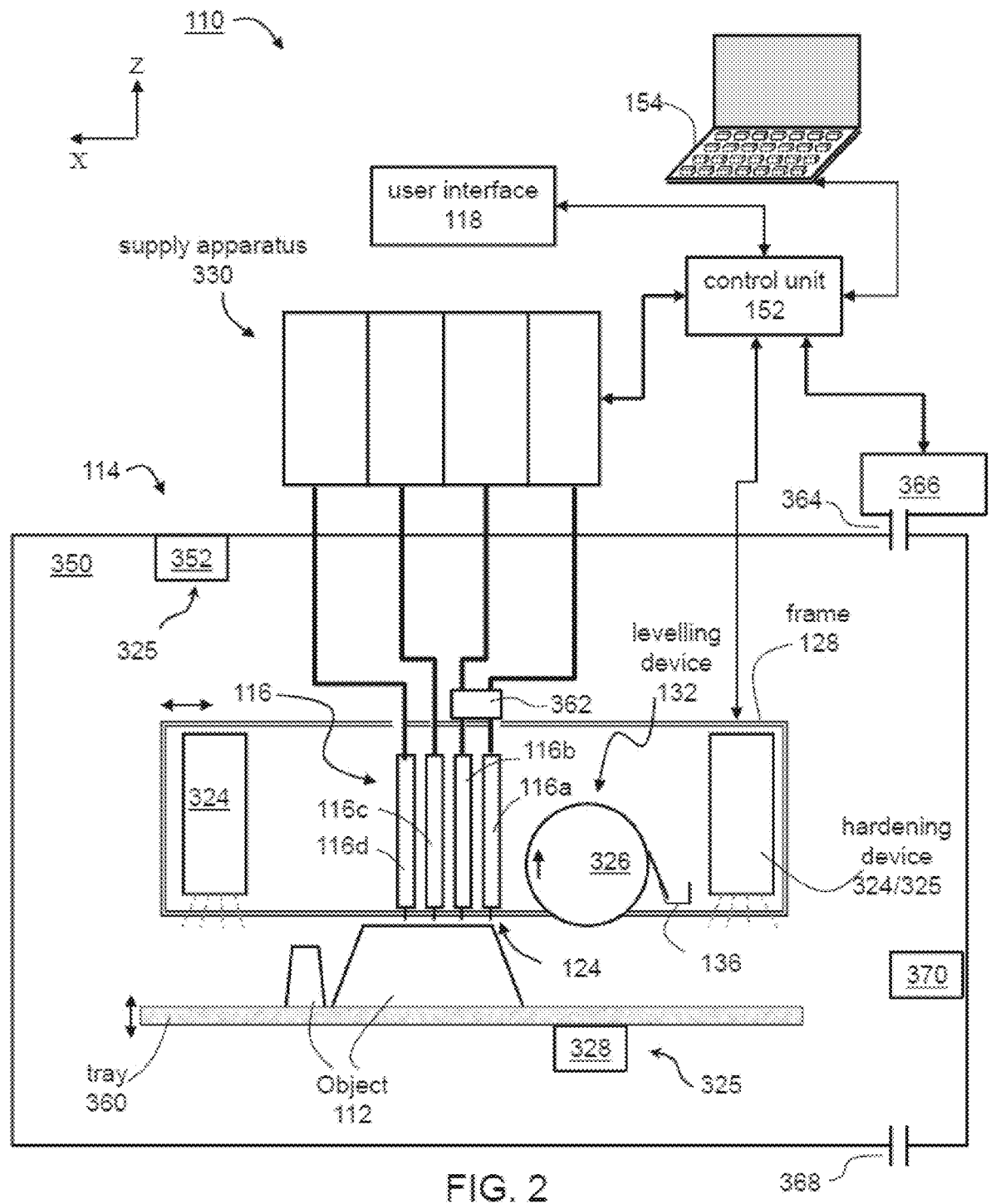
FIG. 2 is a schematic illustration of a system suitable for 3D inkjet printing of an object according to some embodiments of the present invention.

The Printing System:

FIG. 2 is a schematic illustration of a system 110 suitable for 3D inkjet printing of an object 112 according to some embodiments of the present invention. System 110 comprises a printing apparatus 114 having a printing unit 116 which comprises a plurality of printing heads. Each head preferably comprises an array of one or more nozzles 122, as illustrated in FIGS. 3A-C, through which a liquid (uncured) building material 124 is dispensed. Preferably, apparatus 114 is a three-dimensional inkjet printing apparatus. FIGS. 3A-B illustrate a printing head 116 with one (FIG. 3A) and two (FIG. 3B) nozzle arrays 22. The nozzles in the array are preferably aligned linearly, along a straight line. In embodiments in which a particular printing head has two or more linear nozzle arrays, the nozzle arrays are optionally and preferably can be parallel to each other. In some embodiments, two or more printing heads can be assembled to a block of printing heads, in which case the printing heads of the block are typically parallel to each other. A block including several inkjet printing heads 116a, 116b, 116c is illustrated in FIG. 3C. Printing heads 116 are optionally and preferably oriented along the indexing direction with their positions along the scanning direction being offset to one another.

Each printing head is optionally and preferably fed via a building material reservoir which may optionally include a temperature control unit (e.g., a temperature sensor and/or a heating device), and a material level sensor. To dispense the building material, a voltage signal is applied to the printing heads to selectively deposit droplets of material via the printing head nozzles, for example, as in piezoelectric inkjet printing technology. The dispensing rate of each head depends on the number of nozzles, the type of nozzles and the applied voltage signal rate (frequency). Such printing heads are known to those skilled in the art of solid freeform fabrication.

Preferably, but not obligatorily, the overall number of printing nozzles or nozzle arrays is selected such that half of the printing nozzles are designated to dispense support material formulation(s) and half of the printing nozzles are designated to dispense modeling material formulation(s), i.e. the number of nozzles jetting modeling material formulations is the same as the number of nozzles jetting support material formulations. In the representative example of FIG. 2, four printing heads 116a, 116b, 116c and 116d are illustrated. Each of heads 116a, 116b, 116c and 116d has a nozzle array. In this Example, heads 116a and 116b can be designated for modeling material/s and heads 116c and 116d can be designated for support material. Thus, head 116a can dispense a first modeling material formulation, head 116b can dispense a second modeling material formulation and heads 116c and 116d can both dispense a support material formulation. In an alternative embodiment, heads 116c and 116d, for example, may be combined in a single head having two nozzle arrays for depositing a support material formulation.

Yet it is to be understood that it is not intended to limit the scope of the present invention and that the number of modeling material formulations depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a hardening device 324 which can include any device configured to emit light, heat or any other curing energy that may cause the deposited material to harden. In some embodiments of the present invention hardening device 324 hardening device 324 is embodied as, or comprises, a heating system 325, such as, but not limited to, one or more radiation sources, which can be, for example, an infrared lamp or any other source emitting heat-inducing radiation. Hardening device 324 can optionally and preferably comprise a UV radiation source. In some embodiments of the present invention, hardening device 324 serves for applying a curing condition to the modeling material.

The printing head and hardening device 324 are preferably mounted in a frame or block 128 which is preferably operative to reciprocally move over a tray 360, which serves as the working surface. Apparatus 114 can further comprise a tray heater 328 configured for heating the tray. These embodiments are particularly useful when the modeling material is hardened by heating (exposure to heat). Tray heater 328 can be part of heating system 325.

In some embodiments of the present invention the radiation sources are mounted in the block such that they follow in the wake of the printing heads to at least partially cure or solidify the materials just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward.

In various exemplary embodiments of the invention, apparatus 114 further comprises one or more leveling devices 132. Leveling device 132 serves to straighten, level and/or establish a thickness of the newly formed layer prior to the formation of the successive layer thereon. Leveling device 132 can comprise one or more rollers 326. Rollers 326 can have a generally smooth surface or can have a patterned surface. In some embodiments of the present invention one or more of the layers is straightened while the formulation within the layer is at a cured or partially cured state. In these embodiments, leveling device 132 is capable of reforming the solidified portion of the formulation. For example, when leveling device 132 comprises one or more rollers at least one of these rollers is capable of milling, grinding and/or flaking the solidified portion of the formulation. Preferably, in these embodiments, the roller has a non-smooth surface so as to facilitate the milling, grinding and/or flaking. For example, the surface of the roller can be patterned with blades and/or have a shape of an auger.

In some embodiments of the present invention one or more of the layers is straightened while the formulation within the layer is uncured. In these embodiments, leveling device 132 can comprise a roller or a blade, which is optionally and preferably, but not necessarily, incapable of effecting milling, grinding and/or flaking.

Leveling device 132 preferably comprises a waste collection device 136 for collecting the excess material generated during leveling. Waste collection device 136 may comprise any mechanism that delivers the material to a waste tank or waste cartridge. Optionally, leveling device 132 is a self-cleaning leveling device, wherein cured or partially cured formulation is periodically removed from leveling device 132. A representative Example of a self-cleaning leveling device is illustrated in FIG. 4. Shown in FIG. 4 is a double roller having a first roller 356 that contacts and straightens a layer 358 and a second roller 354 that is in contact with the first roller 356 but not with the layer 358 and which is configured to remove the formulation from the first roller 358. When first roller 356 has a non-smooth surface, second roller 354 preferably is also non-smoothed wherein the pattern formed on the surface of roller 354 is complementary to the pattern formed on the surface of roller 356, so as to allow roller 354 to clean the surface of roller 358.

Apparatus 114 can also comprise a chamber 350 enclosing at least heads 116 and tray 360, but may also enclose other components of system 110, such as, but not limited to, devices 132 and 324, frame 128 and the like. In some embodiments of the present invention apparatus 114 comprises a chamber heater 352 that heats the interior of chamber 350 as further detailed hereinabove. Chamber heater 252 can be part of heating system 325. Chamber 350 is preferably generally sealed to an environment outside chamber 350.

In some embodiments of the present invention chamber 350 comprises a gas inlet 364 and the system comprises a gas source 366 configured for filling said chamber by an inert gas through gas inlet 364. Gas source 366 can be a container filled with the inert gas. The gas can be any of the inert gases described above. Optionally, chamber 350 is also formed with a gas outlet 368 for allowing the gas to exit chamber 350 if desired. Both inlet 366 and outlet 368 are of the present embodiments provided with valves (not shown) so as to controllably allow entry and/or exit of the gas to and from chamber 350. Preferably, a controller 152 generates, continuously or intermittently, inflow and outflow of the inert gas through gas inlet 366 and gas outlet 368. This can be achieved by configuring controller 152 to control at least one of source 366, inlet 364 and outlet 368. Optionally, system 110 comprises a gas flow generating device 370, placed within chamber 350 and configured for generating a flow of the inert gas within chamber 350. Device 370 can be a fan or a blower. Controller 152 can be configured for controlling also device 370, for example, based on a predetermined printing protocol.

In some embodiments of the present invention apparatus 114 comprises a mixing chamber 362 for preparing the modeling material formulation prior to entry of the modeling material formulation into a respective head. In the schematic illustration of FIG. 2, which is not to be considered as limiting, chamber 362 receives materials from different containers, mixes the received materials and introduces the mix to two heads (heads 116b and 116a, in the present example). However, this need not necessarily be the case since in some embodiments chamber 362 can receive materials from different containers, mixes the received materials and introduces the mix only to more than two heads of only to one head. Preferably, the position and fluid communication between mixing chamber 362 and respective head is selected such that at least 80% or at least 85% or at least 90% or at least 95% or at least 99% or the modeling material formulation that enters the respective head or heads (e.g., heads 116b and 116a in the present example) remains uncured. For example, chamber 362 can be attached directly to the printing head or the printing block, such that motion of the printing head is accompanied by motion of the mixing chamber. These embodiments are particularly useful when the formulation undergoes fast polymerization reaction even in the absence of curing radiation.

In use, the dispensing heads of unit 116 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 116 is followed by the curing of the modeling material (s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 116, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

Controller 152 controls fabrication apparatus 114 and optionally and preferably also supply system 330. Controller 152 typically includes an electronic circuit configured to perform the controlling operations. Controller 152 preferably communicates with a data processor 154 which transmits digital data pertaining to fabrication instructions based on computer object data, e.g., a CAD configuration represented on a computer readable medium in a form of, for example, a Standard Tessellation Language (STL) format Standard Tessellation Language (STL), StereoLithography Contour (SLC) format, Virtual Reality Modeling Language (VRML), Additive Manufacturing File (AMF) format, Drawing Exchange Format (DXF), Polygon File Format (PLY) or any other format suitable for CAD. Typically, controller 152 controls the voltage applied to each printing head or nozzle array and the temperature of the building material in the respective printing head.

In various exemplary embodiments of the invention controller 152 controls the heating system 325 to first maintain a first temperature for a first time-period, and then maintain a second temperature for a second time-period, as further detailed hereinabove.

In various exemplary embodiments of the invention controller 152 controls apparatus 114, particularly heads 116, such that model formulations are dispensed by heads 116 according to a predetermined or selected ratio, as further detailed hereinabove.

Once the manufacturing data is loaded to controller 152 it can operate without user intervention. In some embodiments, controller 152 receives additional input from the operator, e.g., using data processor 154 or using a user interface 118 communicating with unit 152. User interface 118 can be of any type known in the art, such as, but not limited to, a keyboard, a touch screen and the like. For example, controller 152 can receive, as additional input, one or more building material types and/or attributes, such as, but not limited to, color, characteristic distortion and/or transition temperature, viscosity, electrical property, magnetic property. Other attributes and groups of attributes are also contemplated.

It is expected that during the life of a patent maturing from this application many relevant components of a ROMP system as described herein will be developed and the scope of the terms ROMP monomer, ROMP catalyst, ROMP activator, and ROMP pre-catalyst, is intended to include all such new technologies a priori.

It is expected that during the life of a patent maturing from this application many relevant components of a FRP system as described herein will be developed and the scope of the terms FRP curable material, FRP curing agent, and FRP co-initiator, is intended to include all such new technologies a priori.

It is expected that during the life of a patent maturing from this application many relevant degradable capsules and other technologies for physically separating components in a modeling material formulation as described herein will be developed and the scope of the terms physical separation and degradable capsule, is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is An example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. More preferably, the alkyl is a medium size alkyl having 1 to 10 carbon atoms. Most preferably, unless otherwise indicated, the alkyl is a lower alkyl having 1 to 4 carbon atoms (C(1-4) alkyl). The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene (or alkenyl) and Alkyne (or alkynyl), as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofuran, tetrahydropyrane, morpholino, oxalidine, and the like. The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

Herein, a "cyclic ring" can be an alicyclic (e.g., cycloalkyl), heteroalicyclic, aromatic (aryl) or heteroaromatic (heteroaryl) ring, as these terms are defined herein.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "cyanurate" describes a

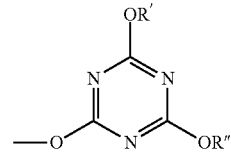

end group or

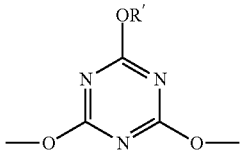

linking group, with R' and R" as defined herein.

The term "isocyanurate" describes a

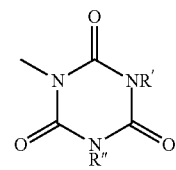

end group or a

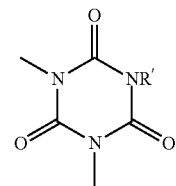

linking group, with R' and R" as defined herein.

The term "thiocyanurate" describes a

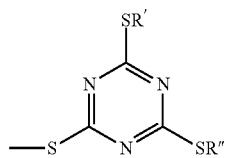

end group or

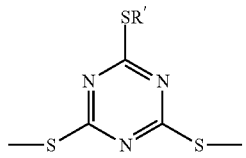

linking group, with R' and R" as defined herein.

The term "isocyanate" describes an —N═C═O group.

The term "isothiocyanate" describes an —N═C═S group.

The term "nitro" describes an —NO$_2$ group.

The term "acyl halide" describes a —(C═O)R"" group wherein R"" is halide, as defined hereinabove.

The term "azo" or "diazo" describes an —N═NR' end group or an —N═N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(═O)—OR' end group or a —C(═O)—O— linking group, as these phrases are defined hereinabove, where R' is as defined herein.

The term "O-carboxylate" describes a —OC(═O)R' end group or a —OC(═O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(═S)—OR' end group or a —C(═S)—O— linking group, as these phrases are defined hereinabove, where R' is as defined herein.

The term "O-thiocarboxylate" describes a —OC(═S)R' end group or a —OC(═S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(═O)—NR'— end group or a —OC(═O)—NR'— linking group, as these phrases are defined hereinabove, with R' and R" as defined herein.

The term "O-carbamate" describes an —OC(═O)—NR'R" end group or an —OC(═O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(═S)—NR'R" end group or a —OC(═S)—NR'— linking group, as these phrases are defined hereinabove, with R' and R" as defined herein.

The term "N-thiocarbamate" describes an R"OC(═S)NR'— end group or a —OC(═S)—NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(═S)—NR'R" end group or a —SC(═S)NR'— linking group, as these phrases are defined hereinabove, with R' and R" as defined herein.

The term "N-dithiocarbamate" describes an R"SC(═S)NR'— end group or a —SC(═S)NR'— linking group, as these phrases are defined hereinabove, with R' and R" as defined herein.

The term "urea", which is also referred to herein as "ureido", describes a —NR'C(═O)—NR"R'" end group or a —NR'C(═O)—NR"— linking group, as these phrases are defined hereinabove, where R' and R" are as defined herein and R'" is as defined herein for R' and R".

The term "thiourea", which is also referred to herein as "thioureido", describes a —NR'—C(═S)—NR"R'" end group or a —NR'—C(═S)—NR"— linking group, with R', R" and R'" as defined herein.

The term "amide" as used herein encompasses C-amide and N-amide.

The term "C-amide" describes a —C(═O)—NR'R" end group or a —C(═O)—NR'— linking group, as these phrases are defined hereinabove, where R' and R" are as defined herein.

The term "N-amide" describes a R'C(═O)—NR"— end group or a R'C(═O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$R'" end group or a —O—[(CR'R")$_z$—O]$_y$— linking group, with R', R" and R'" being as defined herein, and with z being an integer of from 1 to 10, preferably, 2-6, more preferably 2 or 3, and y being an integer of 1 or more. Preferably R' and R" are both hydrogen. When z is 2 and y is 1, this group is ethylene glycol. When z is 3 and y is 1, this group is propylene glycol.

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silyl" describes a —SiR'R"R'" end group or a —SiR'R"— linking group, as these phrases are defined hereinabove, whereby each of R', R" and R'" are as defined herein.

The term "siloxy" describes a —Si(OR')R"R'" end group or a —Si(OR')R"— linking group, as these phrases are defined hereinabove, whereby each of R', R" and R'" are as defined herein.

The term "silaza" describes a —Si(NR'R")R'" end group or a —Si(NR'R")— linking group, as these phrases are defined hereinabove, whereby each of R', R" and R'" is as defined herein.

The term "silicate" describes a —O—Si(OR')(OR")(OR'") end group or a —O—Si(OR')(OR")— linking group, as these phrases are defined hereinabove, with R', R" and R'" as defined herein.

The term "boryl" describes a —BR'R" end group or a —BR'— linking group, as these phrases are defined hereinabove, with R' and R" are as defined herein.

The term "borate" describes a —O—B(OR')(OR") end group or a —O—B(OR')(O—) linking group, as these phrases are defined hereinabove, with R' and R" are as defined herein.

As used herein, the term "epoxide" describes a

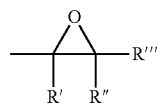

end group or a

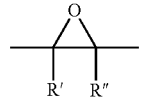

linking group, as these phrases are defined hereinabove, where R', R" and R'" are as defined herein.

As used herein, the term "methyleneamine" describes an —NR'—CH$_2$—CH=CR"R'" end group or a —NR'—CH$_2$—CH=CR"— linking group, as these phrases are defined hereinabove, where R', R" and R'" are as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein. This term encompasses ketones and aldehydes.

The term "thiocarbonyl" as used herein, describes a —C(=S)—R' end group or a —C(=S)— linking group, as these phrases are defined hereinabove, with R' as defined herein.

The term "oxime" describes a=N—OH end group or a=N—O— linking group, as these phrases are defined hereinabove.

Other chemical groups are to be regarded according to the common definition thereof in the art and/or in line of the definitions provided herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Materials and Experimental Methods

Preparation of Curable Compositions:

Curable systems comprising one or more ROMP monomers (monofunctional, difunctional or trifunctional), referred to herein as component (A) and one or more free-radical polymerization (FRP) curable materials, referred to herein as component (C), were prepared by mixing the ROMP monomer(s) (A), the FRP curable material(s) (C) and the FRP initiator (also referred to herein as a radical generator or radical initiator), referred to herein as component (D), and stirring the mixture for 5 minutes at room temperature. A ROMP catalyst, referred to herein as component (B), a ROMP activator (optional) and a ROMP inhibitor (also referred to herein as retarder) were dissolved in a small amount of a solution and added thereafter to the mixture.

"Parts" and "%" as indicated herein refer to weight, unless otherwise indicated.

Herein, the terms "parts" and "phr" are used interchangeably.

Herein throughout and in the art, "phr" refers to parts per hundred. That is, if Mr represents the mass of a polymeric material or of a mixture of monomers for composing a polymeric material, and Mx represents the mass of a component added to the mixture, then the phr of this component is: 100×Mx/Mr.

The following curable compositions were prepared and tested:

Composition 1
ROMP monomers (A): DCPD: 81%, TCPD: 9%,
ROMP catalyst (B): (VC 843)—Ruthenium salicylaldimine catalyst solution 1.2 phr (per 100 grams of the mixture of A and C)/Retarder: triisopropyl phosphate; 0.03 phr (per 100 grams of the mixture of A and C)
FRP monomer (C): Trimethyl propane trimethacrylate (TMPTMA, Sigma-Aldrich): 10%
Radical initiators (D): Trigonox 29C; 0.3 phr, Trigonox B; 0.3 phr (per 100 grams of the mixture of A and C)
Composition 2
ROMP monomers: DCPD: 72%, TCPD: 18%,
ROMP catalyst (B): (VC 843)—Ruthenium salicylaldimine catalyst solution 1.2 phr (per 100 grams of the mixture of A and C)/Retarder: triisopropyl phosphate; 0.03 phr (per 100 grams of the mixture of A and C)
FRP monomer: Trimethyl propane trimethacrylate (TMPTMA, Sigma-Aldrich): 10%
Radical initiators (D): Trigonox 29C; 0.3 phr, Trigonox B; 0.3 phr (per 100 grams of the mixture of A and C)
Composition 3
ROMP monomers (A): DCPD: 78%, ENB: 12%,
ROMP catalyst (B): (VC 843)—Ruthenium salicylaldimine catalyst solution 1.2 phr (per 100 grams of the mixture of A and C)/Retarder: triisopropyl phosphate; 0.03 phr (per 100 grams of the mixture of A and C)
FRP monomer (C): Trimethyl propane trimethacrylate (TMPTMA, Sigma-Aldrich): 10%
Radical initiators (D): Trigonox 29C; 0.3 phr, Trigonox B; 0.3 phr (per 100 grams of the mixture of A and C)
Composition 4
ROMP monomers (A): DCPD: 80%, TCPD: 10%,
ROMP catalyst (B): (VC 843)—Ruthenium salicylaldimine catalyst solution 1.2 phr (per 100 grams of the mixture of A and C)/Retarder: triisopropyl phosphate; 0.02 phr (per 100 grams of the mixture of A and C)
FRP monomer (C): 3,3,5-trimethyl cyclohexanol methacrylate (SR421A, Arkema): 10%
Radical initiators (D): Trigonox 29C; 0.3 phr, Trigonox B: 0.3 phr (per 100 grams of the mixture of A and C)
Composition 5
ROMP monomers (A): DCPD: 82.8%, TCPD: 7.2%,
ROMP catalyst (B): (VC 843)—Ruthenium salicylaldimine catalyst solution 1.2 phr (per 100 grams of the mixture of A and C)/Retarder: triisopropyl phosphate; 0.03 phr (per 100 grams of the mixture of A and C)
FRP monomer (C): Trimethyl propane triacrylate (TMPTA, Sigma-Aldrich): 10%
Radical initiator (D): Trigonox 29C; 0.6 phr (per 100 grams of the mixture of A and C)
Composition 6
ROMP c monomers (A): DCPD: 82.8%, TCPD: 7.2%,
ROMP catalyst (B): C764: 0.002 0 phr/Retarder: P(O$^i$Pr)$_3$ 0.008 phr (per 100 grams of the mixture of A and C)
FRP monomer (C): Trimethyl propane trimethacrylate (TMPTMA, Sigma-Aldrich): 10%
Radical initiator (D): Trigonox 29C; 0.6 phr (per 100 grams of the mixture of A and C)
Composition 7
ROMP monomers: DCPD: 80%, TCPD: 10%,
ROMP catalyst (B): (VC 843)—Ruthenium salicylaldimine catalyst solution 1.2 phr (per 100 grams of the mixture of A and C)/Retarder: triisopropyl phosphate; 0.02 phr (per 100 grams of the mixture of A and C)
FRP monomer (C): Trimethyl propane trimethacrylate (TMPTMA, Sigma-Aldrich): 10%
Radical initiator: Trigonox B (tert-butyl peroxide); 0.6 phr (per 100 grams of the mixture of A and C)
Composition 8
ROMP monomers (A): DCPD: 82.8%, TCPD: 7.2%,
ROMP catalyst (B): (VC 843)—Ruthenium salicylaldimine catalyst solution 1.2 phr (per 100 grams of the mixture of A and C)/Retarder: triisopropyl phosphate; 0.02 phr (per 100 grams of the mixture of A and C)
FRP monomer (C): Trimethyl propane trimethacrylate (TMPTMA, Sigma-Aldrich): 10%
Radical initiators (D): Trigonox 42S; 0.6 phr (per 100 grams of the mixture of A and C)
Composition 9
ROMP monomers: DCPD: 80%, TCPD: 10%,
ROMP catalyst (B): (VC 843)—Ruthenium salicylaldimine catalyst solution 1.2 phr (per 100 grams of the mixture of A and C)/Retarder: Retarder: triisopropyl phosphate; 0.02 phr (per 100 grams of the mixture of A and C)
FRP monomer (C): Trimethyl propane trimethacrylate (TMPTMA, Sigma-Aldrich): 10%
Radical initiator (D): Trigonox 21S; 0.6 phr (per 100 grams of the mixture of A and C)
Composition 10
ROMP monomers: DCPD: 80%, TCPD: 10%, ROMP catalyst (B): C764; 0.020 phr/Retarder: PPh$_3$; 0.5 phr (per 100 grams of the mixture of A and C)
FRP monomer (C): exo-1,7,7-trimethylbicyclo(2,2,1) hept-2-yle methacrylate (SR423D, Arkema): 10%
Radical initiators: Trigonox 21S; 0.6 phr (per 100 grams of the mixture of A and C)
Composition 11
ROMP monomers (A): DCPD: 80%, TCPD: 10%,
ROMP catalyst (B): C764; 0.020 phr/Retarder: P(O$^i$Pr)$_3$; 0.008 phr (per 100 grams of the mixture of A and C)
FRP monomer (C): hydroxypropyl methacrylate (HPMA, Arkema): 10%
Radical initiator (D): Trigonox 29C; 0.6 phr (per 100 grams of the mixture of A and C)
Composition 12
ROMP monomers: DCPD: 56%, TCPD: 24%,
ROMP catalyst (B): C764; 0.020 phr/Retarder: PPh$_3$; 0.5 phr (per 100 grams of the mixture of A and C)
FRP monomer (C): Trimethyl propane trimethacrylate (TMPTMA, Sigma-Aldrich): 20%
Radical initiator (D): Trigonox 29C; 0.6 phr (per 100 grams of the mixture of A and C)
Composition 13
ROMP monomer (A): DCPD: 89.9%
ROMP catalyst (B): (VC 843)—Ruthenium salicycla-ldimine catalyst solution 1.2 phr (per 100 grams of the mixture of A and C)/Retarder: triisopropyl phosphate; 0.02 phr (per 100 grams of the mixture of A and C)
FRP monomer (C): Trimethyl propane trimethacrylate (TMPTMA, Sigma-Aldrich): 10%
Radical initiator (D): Trigonox B; 0.6%
Composition 14
ROMP monomers (A): DCPD: 80%, TCPD: 10%,
ROMP catalyst (B): C764; 0.020 phr/Retarder: P(O$^i$Pr)$_3$; 0.008 phr (per 100 grams of the mixture of A and C)
FRP monomer (C): methacrylate isocyanate (TCI Europe): 10%
Radical initiators (D): Trigonox 29C; 0.3 phr, Trigonox B; 0.3 phr
Composition 15
ROMP monomers (A): DCPD: 60.3%, TCPD: 6.7%,
ROMP catalyst (B): C764; 0.020 phr/Retarder: P(O$^i$Pr)$_3$; 0.008 phr (per 100 grams of the mixture of A and C)
FRP monomer (C): 3,3,5-trimethyl cyclohexanol methacrylate (SR421A, Arkema): 33%
Radical initiators (D): Trigonox 29C; 0.3 phr, Trigonox B; 0.3 phr
Composition 16
ROMP monomers (A): DCPD: 80%, TCPD: 10%,
ROMP catalyst (B): C764; 0.0020 phr/Retarder: P(O$^i$Pr)$_3$; 0.008 phr (per 100 grams of the mixture of A and C)
FRP monomer (C): methacrylate isocyanate (TCI Europe); 10%
Radical initiators (D): Trigonox B; 1.5 phr
Composition 17
ROMP monomers (A): DCPD: 60.3%, TCPD: 6.7%,
ROMP catalyst (B): C764; 0.0020 phr/Retarder: P(O$^i$Pr)$_3$; 0.008 phr (per 100 grams of the mixture of A and C)
FRP monomer (C): 3,3,5-trimethyl cyclohexanol methacrylate (SR421A, Arkema): 33%
Radical initiators (D): Benzophenone; 1 phr Determination of the Total Enthalpy $\Delta H_{ROMP}$ of ROMP Reactions of ROMP Monomer (A):

Small samples of the curable compositions (Composition 1-17) comprising (A) to (C) without including initiator (D) were put into hermetic pans and heated in the DSC chamber to 250° C., speed of heating 10° C./minute. $\Delta H_{ROMP}$ was taken as the overall enthalpy of the exothermic reactions observed during samples heating.

Determination of the Half-Life Parameter $t_{1/2\ CT}$:

The half-life of the radical generators (D) used in the compositions for different curing temperatures (CT) were calculated by using the well-known formulae given under "Results" and data obtained by the supplier of the radical generators (AkzoNobel).

Determination of $t_{c80}$:

Small samples of the curable compositions (1-17) comprising (A) to (C) without including initiator (D) were put into hermetic pans and cured at curing temperature (CT) during a certain time period by using the isothermal DSC method.

Further the samples were cooled to 25° C. and re-heated to 250° C., speed of heating 10° C./minute. The conversion of the ROMP monomer was calculated as ratio of the residual $\Delta H_{rez}$ and the total $\Delta H_{ROMP}$ in accordance with ISO 11357. The curing time at CT was extended until the percent of conversion was equal to 80%. Thus $t_{c80}$ was a time period needed to reach 80% conversion of the ROMP reactions.

Results

The half-life parameter $t_{1/2\ CT}$ data of the tested initiators is presented in Tables 1-4 below.

TABLE 1

The half-life $t_{1/2CT}$ of Trigonox 29C at different curing temperatures CT

| T (° C.) | T(K) | k$_d$ | t$_{1/2}$ (s) | t$_{1/2}$ (min) | t$_{1/2}$ (h) |
|---|---|---|---|---|---|
| 80.00 | 353.50 | 1.08868E−05 | 63668.8 | 1061.1 | 17.7 |
| 90.00 | 363.50 | 3.59158E−05 | 19299.2 | 321.7 | 5.4 |
| 95.00 | 368.50 | 6.36689E−05 | 10886.7 | 181.4 | 3.0 |
| 100.00 | 373.50 | 0.000111151 | 6236.1 | 103.9 | 1.7 |
| 105.00 | 378.50 | 0.000191208 | 3625.1 | 60.4 | 1.0 |
| 110.00 | 383.50 | 0.000324305 | 2137.3 | 35.6 | 0.6 |
| 120.00 | 393.50 | 0.000896106 | 773.5 | 12.9 | 0.2 |
| 130.00 | 403.50 | 0.002354429 | 294.4 | 4.9 | 0.08 |

K$_d$ = A · e$^{-Ea/RT}$
t$_{1/2}$ = (ln2)/Kd
Ea = 127.52 kJ/mole
A = 7.59E+13 s$^{-1}$
R = 8.3142 J/mole · K
T = (273.15 + ° C.) K

TABLE 2

The half-life $t_{1/2CT}$ of Trigonox 21S at different curing temperatures CT

| T (° C.) | T(K) | k$_d$ | t$_{1/2}$ (s) | t$_{1/2}$ (min) | t$_{1/2}$ (h) |
|---|---|---|---|---|---|
| 80.00 | 353.15 | 1.85907E−05 | 37284.7 | 621.4 | 10.4 |
| 90.00 | 363.15 | 6.1694E−05 | 11235.2 | 187.3 | 3.1 |
| 95.00 | 368.15 | 0.000109674 | 6320.1 | 105.3 | 1.8 |
| 100.00 | 373.15 | 0.000191986 | 3610.4 | 60.2 | 1.0 |
| 105.00 | 378.15 | 0.000331134 | 2093.3 | 34.9 | 0.6 |
| 110.00 | 383.15 | 0.000563067 | 1231.0 | 20.5 | 0.3 |
| 120.00 | 393.15 | 0.001563434 | 443.3 | 7.4 | 0.1 |
| 130.00 | 403.15 | 0.004126636 | 168.0 | 2.8 | 0.05 |
| 150.00 | 423.15 | 0.025053069 | 27.7 | 0.5 | 0.01 |
| 190.00 | 463.15 | 0.578695688 | 1.2 | 0.02 | 0.0003 |

K$_d$ = A · e$^{-Ea/RT}$
t$_{1/2}$ = (ln2)/Kd
Ea = 124.90 kJ/mole
A = 1.54E+14 s$^{-1}$
R = 8.3142 J/mole · K
T = (273.15 + ° C.) K

TABLE 3

The half-life $t_{1/2CT}$ of Trigonox 42S at different curing temperatures CT

| T (° C.) | T(K) | $k_d$ | $t_{1/2}$ (s) | $t_{1/2}$ (min) | $t_{1/2}$ (h) |
|---|---|---|---|---|---|
| 80.00 | 353.15 | 2.91368E−06 | 237894.4 | 3964.9 | 66.1 |
| 90.00 | 363.15 | 1.09106E−05 | 63529.4 | 1058.8 | 17.6 |
| 95.00 | 368.15 | 2.05529E−05 | 33725.0 | 562.1 | 9.4 |
| 100.00 | 373.15 | 3.80651E−05 | 18209.5 | 303.5 | 5.1 |
| 105.00 | 378.15 | 6.93588E−05 | 9993.7 | 166.6 | 2.8 |
| 110.00 | 383.15 | 0.000124416 | 5571.2 | 92.9 | 1.5 |
| 120.00 | 393.15 | 0.000382876 | 1810.4 | 30.2 | 0.5 |
| 130.00 | 403.15 | 0.001114355 | 622.0 | 10.4 | 0.2 |
| 150.00 | 423.15 | 0.008112709 | 85.4 | 1.4 | 0.02 |
| 190.00 | 463.15 | 0.257083172 | 2.7 | 0.04 | 0.00074 |

$Kd = A \cdot e^{-Ea/RT}$
$t_{1/2} = (\ln 2)/Kd$
$Ea = 140.78$ kJ/mole
$A = 1.94E+15$ s$^{-1}$
$R = 8.3142$ J/mole · K
$T = (273.15 + °$ C.$)$ K

TABLE 4

The half-life $t_{1/2CT}$ of Trigonox B at different curing temperatures CT

| T (° C.) | T(K) | $k_d$ | $t_{1/2}$ (s) | $t_{1/2}$ (min) | $t_{1/2}$ (h) |
|---|---|---|---|---|---|
| 80 | 353.15 | 8.4011E−08 | 8250660 | 137511.0 | 2291.8 |
| 90 | 363.15 | 3.5432E−07 | 1956287 | 32604.8 | 543.4 |
| 95 | 368.15 | 7.0662E−07 | 980931 | 16348.8 | 272.5 |
| 100 | 373.15 | 1.3834E−06 | 501047 | 8350.8 | 139.2 |
| 105 | 378.15 | 2.6607E−06 | 260515 | 4341.9 | 72.4 |
| 110 | 383.15 | 5.0306E−06 | 137785 | 2296.4 | 38.3 |
| 120 | 393.15 | 1.7131E−05 | 40462 | 674.4 | 11.2 |
| 130 | 403.15 | 5.4895E−05 | 12627 | 210.4 | 3.5 |
| 150 | 423.15 | 0.00047789 | 1450 | 24.2 | 0.4 |
| 190 | 463.15 | 0.0206738 | 34 | 0.6 | 0.01 |

$Kd = A \cdot e^{-Ea/RT}$
$t_{1/2} = (\ln 2)/Kd$
$Ea = 153.46$ kJ/mole
$A = 4.20E+15$ s$^{-1}$
$R = 8.3142$ J/mole · K
$T = (273.15 + °$ C.$)$ K Table 5 below presents the data obtained for Compositions 1-17.

TABLE 5

| Example | Composition | Curing temp. CT (° C.) | $t_{C80}$ (min) | Curing time (min) | Second curing temp. (° C.) | Second curing time (h) | $t_{1/2CT}$ |
|---|---|---|---|---|---|---|---|
| 1 | 1 | 80 | 60 | 60 | 150 | 0.5 | 1061 |
| 2 | 1 | 130 | 3 | 60 | — | | 4.9 |
| 3 | 2 | 90 | 20 | 20 | 150 | 0.5 | 321 |
| 4 | 3 | 90 | 20 | 20 | 150 | 0.5 | 321 |
| 5 | 4 | 90 | 15 | 15 | 150 | 0.5 | 321 |
| 6 | 1 | 150 | 1 | 60 | — | — | 0.81 |
| 7 | 5 | 130 | 3 | 60 | — | — | 1.96 |
| 8 | 6 | 100 | 7 | 1440 | — | — | 103 |
| 9 | 7 | 100 | 10 | 1440 | — | — | 8350 |
| 10 | 8 | 130 | 3 | 360 | — | — | 10.3 |
| 11 | 9 | 130 | 3 | 360 | — | — | 2.8 |
| 12 | 10 | 120 | 5 | 1440 | — | — | 7.4 |
| 13 | 11 | 100 | 7 | 7 | 150 | 0.5 | 103 |
| 14 | 12 | 100 | 7 | 7 | 150 | 0.5 | 103 |
| 15 | 13 | 90 | 15 | 20 | 190 | 1 | 32604 |
| 16 | 14 | 100 | 7 | 7 | 150 | 0.5 | 103 |
| 17 | 15 | 90 | 10 | 15 | 150 | 0.5 | 321 |

Example 2

Additional compositions, I and II, were also tested, as follows. Two formulations, referred to herein as Part A and Part B were prepared and mixed in a mold, and thereafter subjected to curing.

Composition I:

Part A—3.5% Trilene 67, 0.43% Trigonox 29, 0.43% Trigonox B, 86% DCPD, 9.6% CPD trimer;

Part B— 0.06% C764 in TMCHMA.

70% Part A were mixed with 30% B in a mold to obtain cured materials featuring: Impact=10.3 kJ/m$^2$ (105 J/m)

Tg=171° C.

Composition II:

Part A—3.5% Trilene 67, 0.43% Trigonox 29, 0.43% Trigonox B, 86% DCPD, 9.6% CPD trimer Part B— 0.06% C764 in TMCHMA 80% A were mixed with 20% B in a mold to obtain cured materials featuring: Impact=15.2 kJ/m$^2$ (155 J/m)

Tg=178.9° C.

The obtained data is indicative of the exceptional properties obtained for mixed formulations containing ROMP system and FRP system, upon using suitable radical initiators and curing parameters.

These data is further indicative of the properties obtained upon using formulation systems as described herein in 3D inkjet printing processes, as described herein.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of fabricating a three-dimensional object, the method comprising sequentially forming a plurality of layers in a configured pattern corresponding to a shape of the object, thereby forming the object,
wherein forming at least one of said layer comprises:
(i) dispensing by at least one inkjet printing head at least one modeling material formulation, said at least one modeling material formulation comprising:
an unsaturated cyclic monomer polymerizable by ring opening metathesis polymerization (ROMP);
a catalyst or a catalyst system comprising a catalyst for initiating ROMP of said monomer;
a curable material polymerizable by free-radical polymerization (FRP); and
a curing agent for initiating free radical polymerization of said curable material;
(ii) exposing said at least one modeling material formulation to a condition for inducing initiation of ROMP of said monomer by said catalyst;
(iii) maintaining said formulation at a first temperature for a first time period, wherein said first time period is such that at least 80% of said unsaturated cyclic monomer undergo polymerization by said ROMP during said first time period; and
(iv) subsequent to said first time period, exposing the modeling material formulation to a condition for inducing initiation of free-radical polymerization of said curable material by said curing agent, said condition for inducing initiation of said free radical polymerization comprising a second temperature, wherein said second temperature is higher than said first temperature, and wherein said curing agent is a thermally-activatable curing agent that is activated at said second temperature,
to thereby obtain a cured modeling material in said layer.

2. The method of claim 1, wherein said second temperature is:
higher than a glass transition temperature (Tg) of a polymeric material formed upon said exposing to a condition for inducing initiation of ROMP of said monomer during said first time period; and/or
is higher than said first temperature by at least 20° C., or by at least 30° C., or by at least 40° C., or by at least 50° C.; and/or
is higher than 100° C., or higher than 120° C., or higher than 150° C.; and/or
is lower than 200° C., or lower than 190° C., or lower than 180° C., or lower.

3. The method of claim 2, wherein said first temperature ranges from 25° C. to about 200° C., or from 25° C. to about 150° C.

4. The method of claim 1, wherein said curing agent is such that its half life at said first temperature, $t_{1/2\ CT}$, and a time period in which 80% of said unsaturated cyclic monomer undergo polymerization by said ROMP at said first temperature (CT), $t_{c80}$, satisfy 2.5 times $t_{c80} < t_{1/2\ CT} < 1000$ times $t_{c80}$, or 10 times $t_{c80} < t_{1/2\ CT} < 100$ times $t_{c80}$.

5. The method of claim 1, wherein said curing agent has a one-minute half-life temperature of less than 183° C., or less than 170° C., or less than 160° C.

6. The method of claim 1, wherein said curing agent comprises a peroxide, preferably a non-cyclic peroxide.

7. The method of claim 1, wherein said at least one modeling material formulation is characterized by a viscosity of no more than 35 centipoises at a temperature of said inkjet printing head during said dispensing.

8. The method of claim 1, wherein prior to said exposing said catalyst system is such that said catalyst does not initiate ROMP of said monomer.

9. The method of claim 1, wherein said formation of each of said layers comprises dispensing at least two modeling material formulations by at least two inkjet printing heads, each head jetting one of said at least two modeling material formulations, the method further comprising selecting a ratio between said at least two modeling material formulations; and wherein said dispensing is according to said ratio.

* * * * *